United States Patent [19]
Recks et al.

[11] 3,909,800

[45] Sept. 30, 1975

[54] MICROPROGRAMMED PERIPHERAL PROCESSING SYSTEM

[75] Inventors: John A. Recks, Chelmsford, Mass.; Edwin J. Pinheiro, Edina, Minn.

[73] Assignee: Honeywell Information Systems Inc., Waltham, Mass.

[22] Filed: Dec. 18, 1973

[21] Appl. No.: 425,769

[52] U.S. Cl. ........................................ 340/172.5;

[51] Int. Cl.$^2$ ........................ G06F 3/00; G06F 15/20; G06F 13/00; G06F 9/16

[58] Field of Search ........................ 340/172.5; 444/1

[56] References Cited

UNITED STATES PATENTS

| | | | |
|---|---|---|---|
| 3,377,619 | 4/1968 | Marsh | 340/172.5 |
| 3,588,831 | 6/1971 | Figueroa | 340/172.5 |
| 3,654,617 | 4/1972 | Irwin | 340/172.5 |
| 3,713,107 | 1/1973 | Barsamian | 340/172.5 |
| 3,713,108 | 1/1973 | Edstrom | 340/172.5 |
| 3,736,567 | 5/1973 | Otan | 340/172.5 |
| 3,753,236 | 8/1973 | Flynn | 340/172.5 |
| 3,766,526 | 10/1973 | Buchanan | 340/172.5 |
| 3,766,532 | 10/1973 | Liebel, Jr. | 340/172.5 |
| 3,771,136 | 11/1973 | Heneghan | 340/172.5 |

OTHER PUBLICATIONS

IBM Technical Disclosure Bulletin, "Communication Line Microcontroller," Vol. 14, No. 6, November 1971, pp. 1879–1882.

*Primary Examiner*—Raulfe B. Zache
*Assistant Examiner*—James D. Thomas
*Attorney, Agent, or Firm*—Faith F. Driscoll; Ronald T. Reiling

[57] ABSTRACT

A microprogrammed peripheral processor includes a read only memory store containing a plurality of microprograms and two way branching apparatus in addition to return address register storage. Additionally, the peripheral processor includes apparatus for storing one or more control bytes of information. These bytes include a read/write director byte coded to specify operations to be performed by different work microprogram routines being executed by the processor for the type of command specified. The coding of this control byte is initially specified by the particular command code designating the type of operation the processor is to execute. During the execution of the command, the processor establishes communication between director routines and execution routines by referencing the director byte and the return register storage.

28 Claims, 39 Drawing Figures

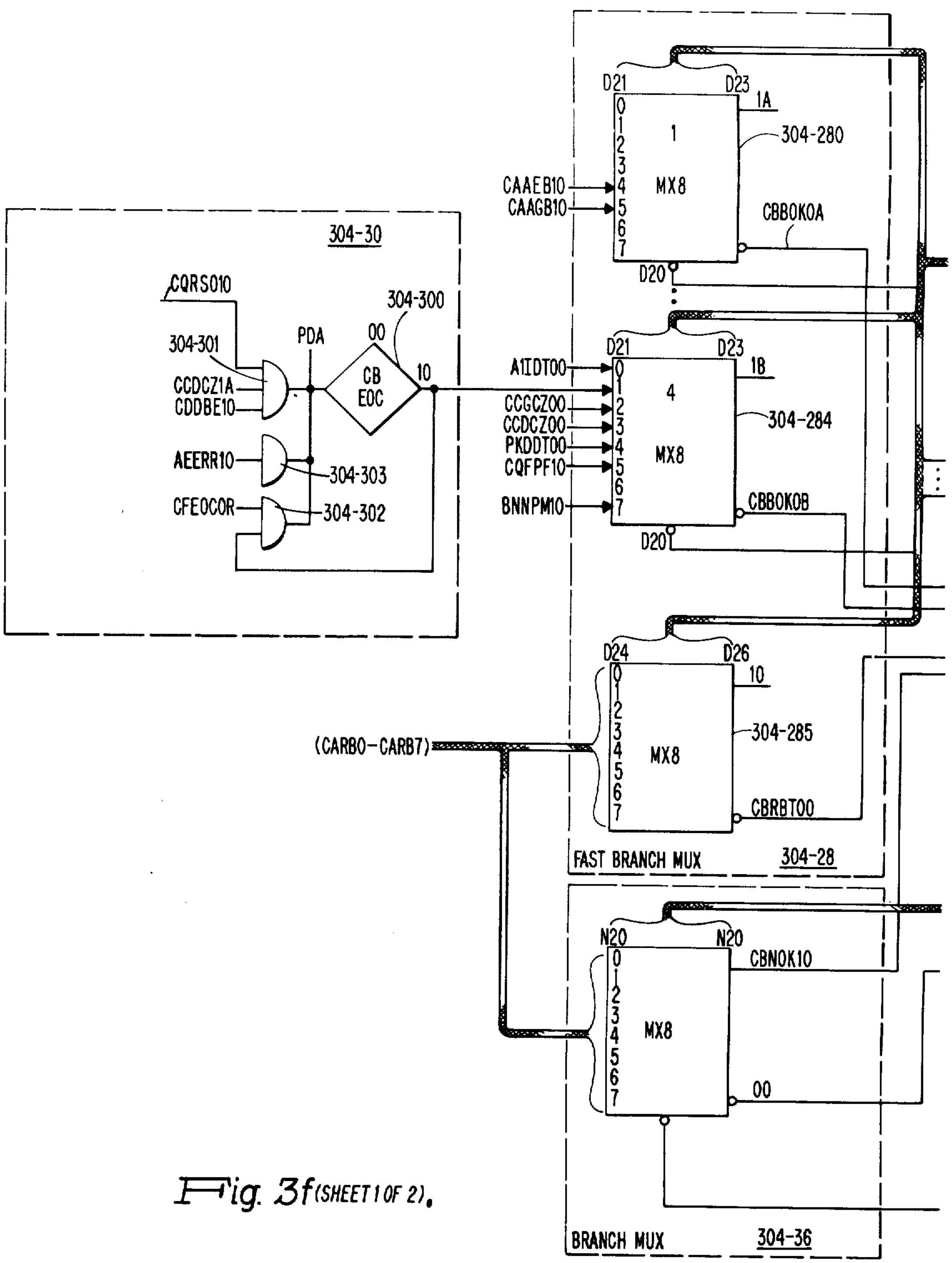
Fig. 3f (SHEET 1 OF 2).

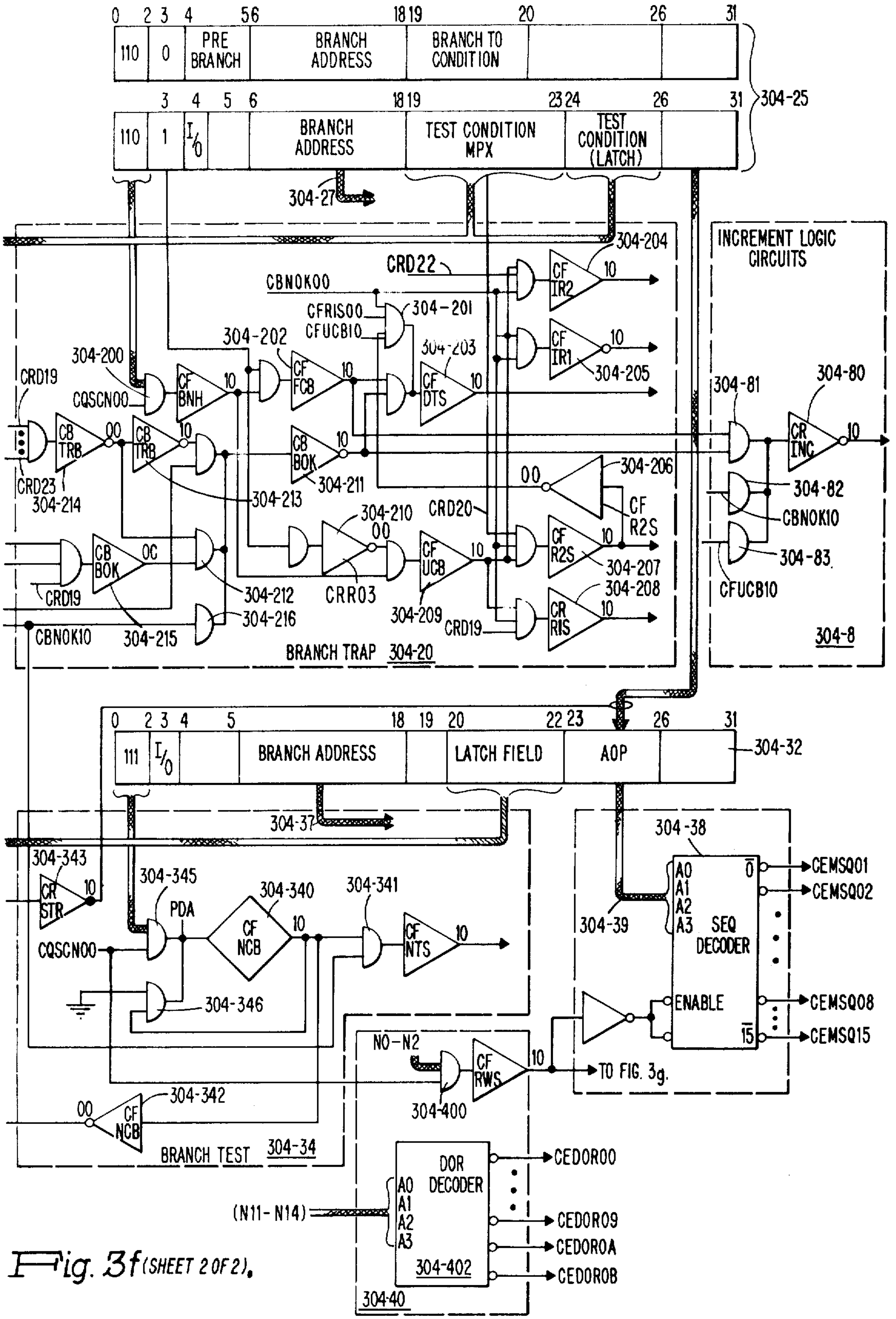
Fig. 3f (SHEET 2 OF 2).

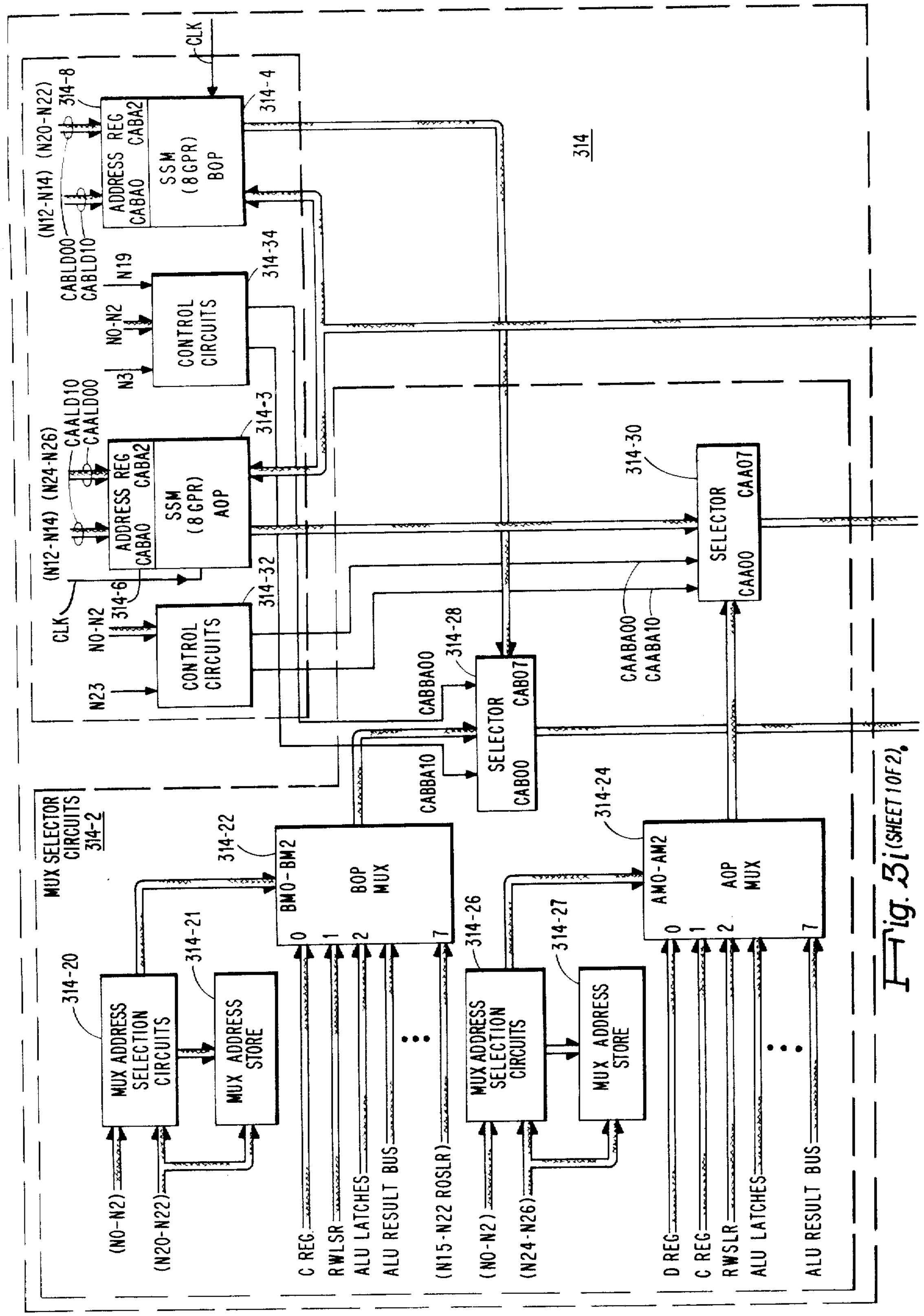
Fig. 3i (SHEET 1 OF 2).

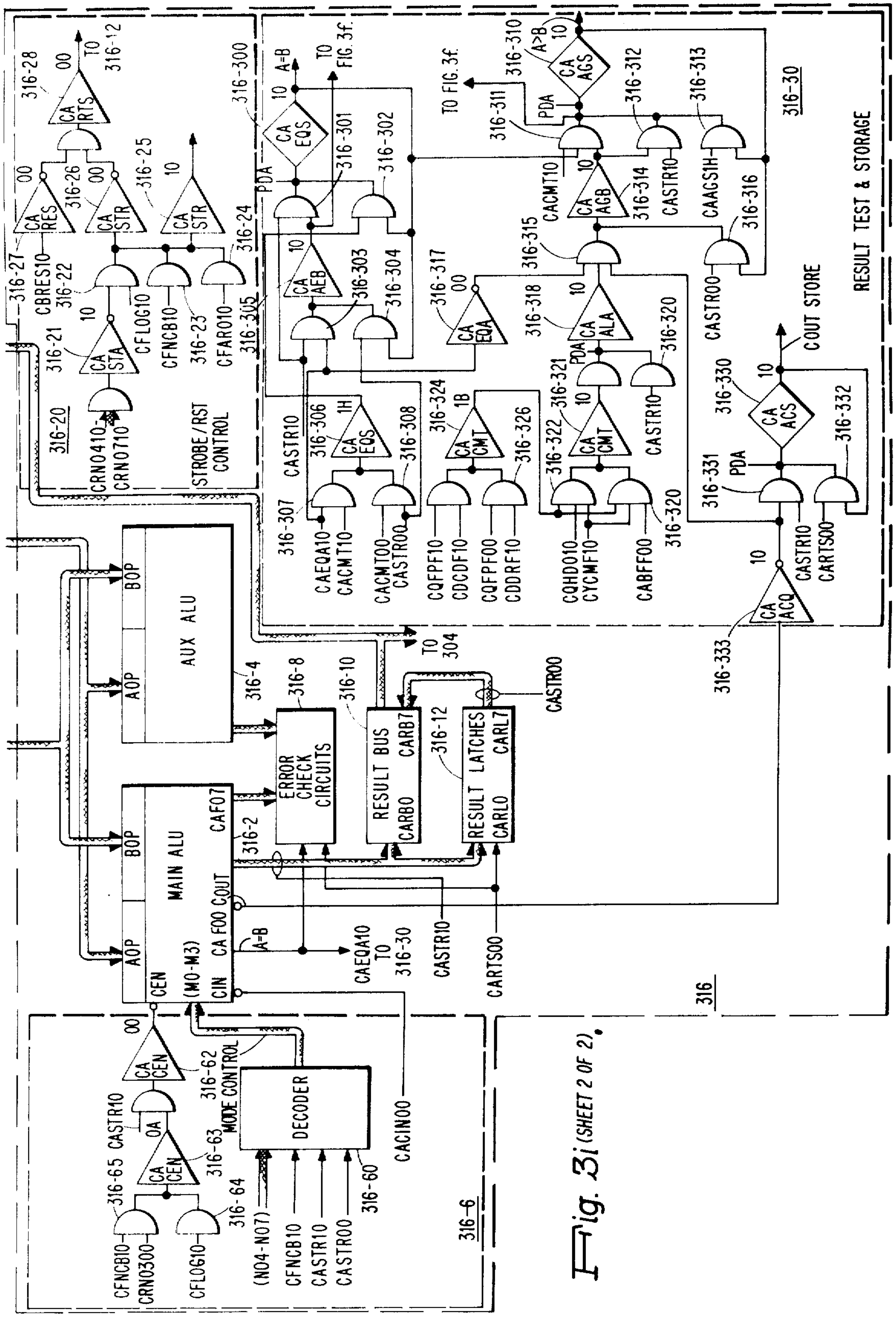
Fig. 3i (SHEET 2 OF 2)

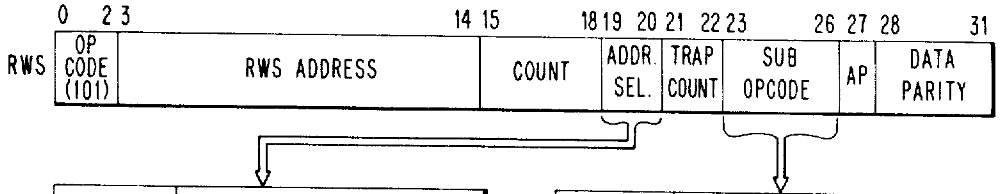

| | TABLE 1 |
|---|---|
| BIT 19, 20 | FUNCTION |
| 00 | NONE |
| 01 | USE CURRENT RWSAR AS RWS ADDRESS |
| 10 | USE 7 ROSLR BITS AND 4 LCN BITS AS RWS ADDRESS |
| 11 | USE 11 ROSLR BITS AS RWS ADDRESS |

| | TABLE 2 |
|---|---|
| BIT 23—26 | SUB OPCODE |
| 0000 | |
| 0001 | WRITE COUNT / HA / RO (AM) |
| 0010 | WRITE HA / RO (DM) |
| 0100 | READ COUNT / HA / RO |
| 0101 | SEARCH COUNT $\overline{\text{1ST PASS}}$ |
| 0110 | SEARCH COUNT 1ST PASS |
| 0111 | LOAD PARAMETER TABLE |
| 1000 | READ RWS (FIRMWARE) |
| 1001 | WRITE RWS FROM C REG. |
| 1010 | WRITE RWS FROM D REG. |
| 1011 | WRITE RWS FROM RWSLR |

Fig. 4a.

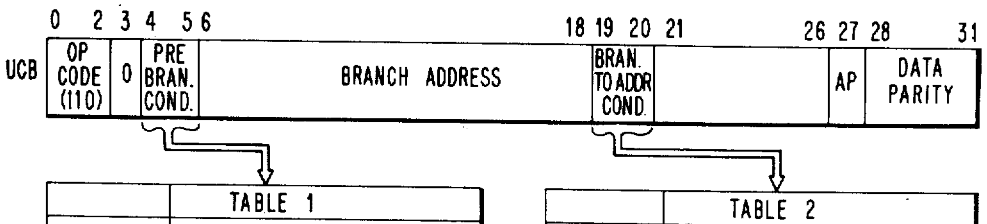

| | TABLE 1 |
|---|---|
| 4,5 | FUNCTION |
| 00 | BRANCH W/O ANY ADDR. REG. SET |
| 01 | BRANCH W ROS RET ADDR REG 2 SET |
| 10 | BRANCH W ROS RET ADDR REG 1 SET |
| 11 | ILLEGAL |

| | TABLE 2 |
|---|---|
| 19,20 | FUNCTION |
| 00 | BRANCH TO ADDR. SUPPLIED BY ROS |
| 01 | BRANCH TO RET ADDR. REG 2 |
| 10 | BRANCH TO RET ADDR REG 1 |
| 11 | ILLEGAL |

Fig. 4b.

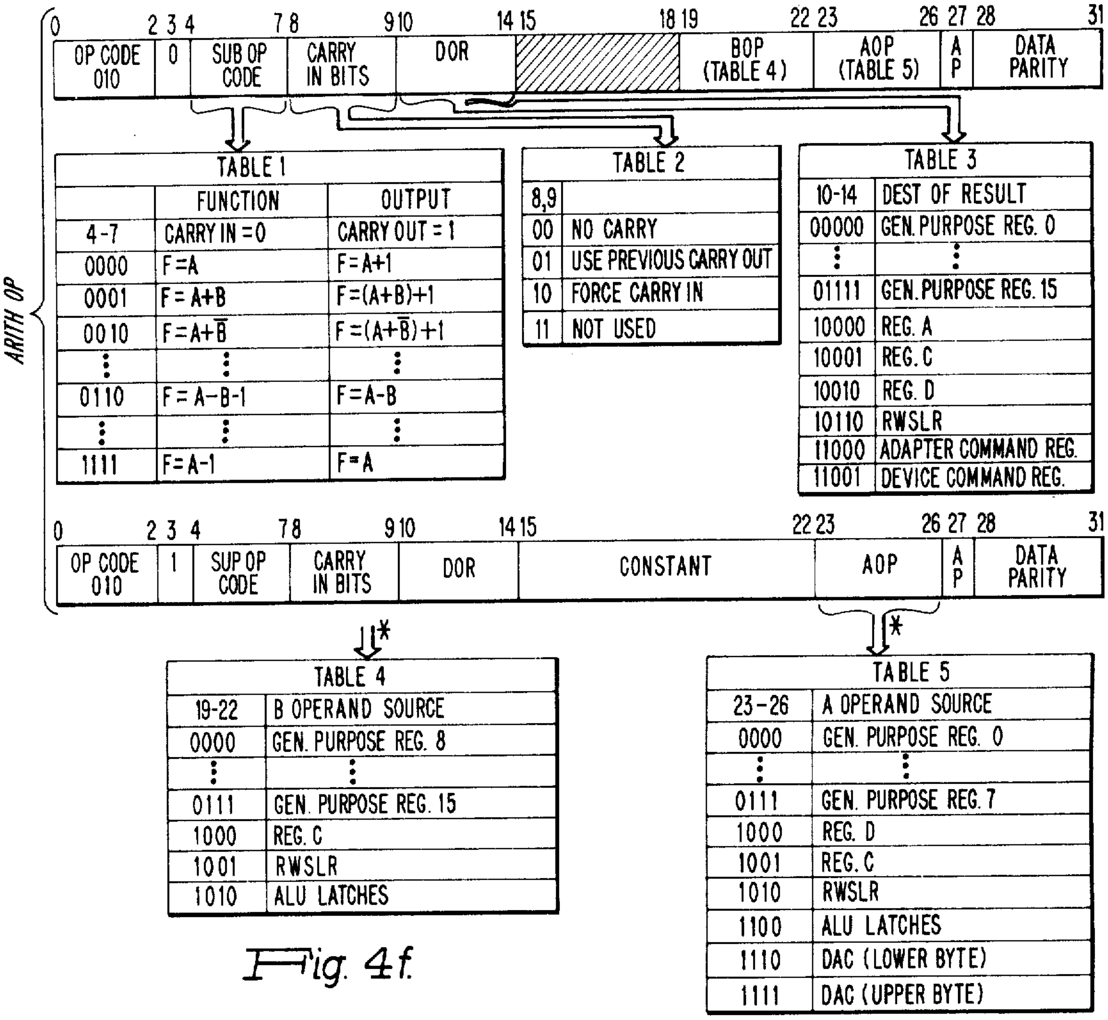

TABLE 1

| | FUNCTION | OUTPUT |
|---|---|---|
| 4-7 | CARRY IN = 0 | CARRY OUT = 1 |
| 0000 | F=A | F=A+1 |
| 0001 | F=A+B | F=(A+B)+1 |
| 0010 | F=A+$\overline{B}$ | F=(A+$\overline{B}$)+1 |
| ⋮ | ⋮ | ⋮ |
| 0110 | F=A-B-1 | F=A-B |
| ⋮ | ⋮ | ⋮ |
| 1111 | F=A-1 | F=A |

TABLE 2

| 8,9 | |
|---|---|
| 00 | NO CARRY |
| 01 | USE PREVIOUS CARRY OUT |
| 10 | FORCE CARRY IN |
| 11 | NOT USED |

TABLE 3

| 10-14 | DEST OF RESULT |
|---|---|
| 00000 | GEN. PURPOSE REG. 0 |
| ⋮ | ⋮ |
| 01111 | GEN. PURPOSE REG. 15 |
| 10000 | REG. A |
| 10001 | REG. C |
| 10010 | REG. D |
| 10110 | RWSLR |
| 11000 | ADAPTER COMMAND REG. |
| 11001 | DEVICE COMMAND REG. |

TABLE 4

| 19-22 | B OPERAND SOURCE |
|---|---|
| 0000 | GEN. PURPOSE REG. 8 |
| ⋮ | ⋮ |
| 0111 | GEN. PURPOSE REG. 15 |
| 1000 | REG. C |
| 1001 | RWSLR |
| 1010 | ALU LATCHES |

TABLE 5

| 23-26 | A OPERAND SOURCE |
|---|---|
| 0000 | GEN. PURPOSE REG. 0 |
| ⋮ | ⋮ |
| 0111 | GEN. PURPOSE REG. 7 |
| 1000 | REG. D |
| 1001 | REG. C |
| 1010 | RWSLR |
| 1100 | ALU LATCHES |
| 1110 | DAC (LOWER BYTE) |
| 1111 | DAC (UPPER BYTE) |

Fig. 4f

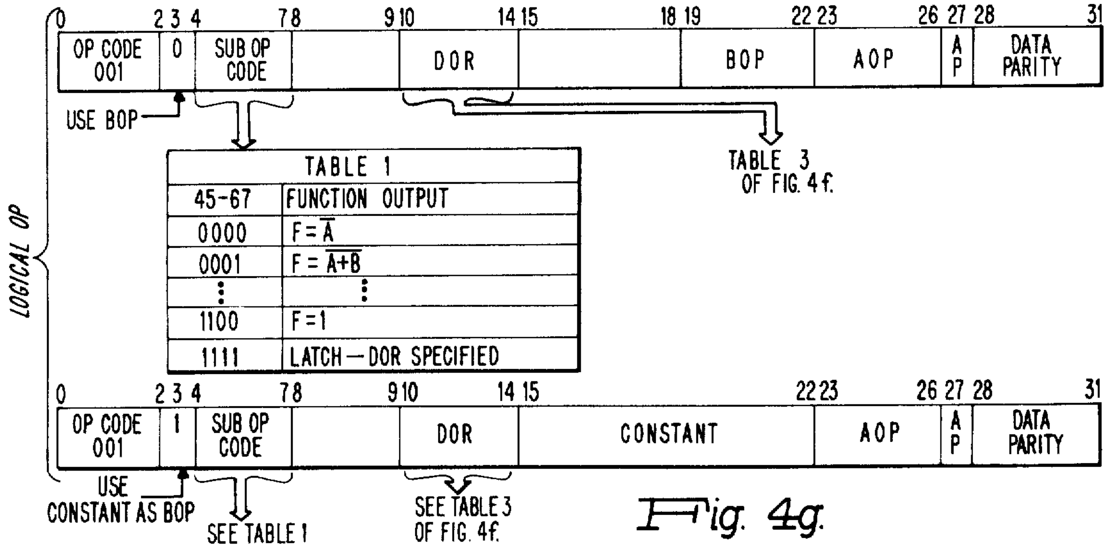

TABLE 1

| 45-67 | FUNCTION OUTPUT |
|---|---|
| 0000 | F=$\overline{A}$ |
| 0001 | F=$\overline{A+B}$ |
| ⋮ | ⋮ |
| 1100 | F=1 |
| 1111 | LATCH—DOR SPECIFIED |

Fig. 4g

| | 0 | 1 | 2 | 3 | 4 | 5 | 6 | 7 |
|---|---|---|---|---|---|---|---|---|
| WORK BYTE 1 (GPR6) | ORIENTED | PREV. FLAG TOG. | HA-RO GAP | HDR TO KEY GAP | KEY TO DATA GAP | DATA TO HDR GAP | KL=0 | PREV. LOW COMP. |

| | 0 | 1 | 2 | 3 | 4 | 5 | 6 | 7 |
|---|---|---|---|---|---|---|---|---|
| WORK BYTE 2 (GPR7) | ALLOW WRT RO-1 | ALLOW WRT CKD | ALLOW WRT R, D | | INDEX PULSE COUNT | DEV. WRITE PER. | ON ALT TRACK | OVERFLOW RECORD SENSED |

| | 0 | 1 | 2 | 3 | 4 | 5 | 6 | 7 |
|---|---|---|---|---|---|---|---|---|
| READ/WRITE DIRECTOR (GPR3) BYTE | PSI XFER=1 | IGNORE K, D READ ERROR | RTN AFTER COUNT FIELD | RTN WHEN IN DATA ORIENT. | INDEX ENCOUNT BY READ EX. | SET TERM AT PSI | A=B | HIT |

STATUS SEARCH BITS (bits 6 and 7)

Fig. 7.

MICROPROGRAMMED PERIPHERAL PROCESSING SYSTEM

RELATED APPLICATIONS

1. "Microprogrammable Peripheral Processing System" invented by John A. Recks, Frank V. Cassarino, Jr., Edward F. Getson, Jr., Karl F. Laubscher, Albert T. McLaughlin and Edwin J. Pinheiro, filed on Dec. 18, 1973, Ser. No. 425,760 and assigned to the same assignee named herein.

2. "Improved Search Processing Apparatus" invented by John A. Homberg, Albert T. McLaughlin, John J. Melus, Edwin J. Pinheiro, John A. Recks and George Rittenburg, filed on Dec. 18, 1973, Ser. No. 425,763 and assigned to the same assignee named herein.

BACKGROUND OF THE INVENTION

FIELD OF USE

This invention relates to data processing systems and more particularly to microprogrammed processors for executing commands for operating a peripheral system.

PRIOR ART

As is well known, peripheral subsystems of data processing systems have become increasingly important and have increased in complexity so as to be able to perform many of the functions which were heretofore performed by input/output processing units or controllers. Moreover, peripheral subsystems are required to handle a plurality of devices each having different characteristics.

Because of the increase demands upon the peripheral subsystems, the control stores of microprogrammable peripheral processors have steadily increased in both size and width. Moreover, the branching apparatus associated with such control stores have increased greatly in complexity. One reason is that the processor is required to execute sequences of multiple branching operations in order to test the command code under a given set of conditions in order to sequence to the appropriate routine during the processing of each type of command. Thus, prior art microprogrammable peripheral processors have been found to be costly as a result of the increase in storage requirements and sequencing hardware. Moreover, when such processors are required to handle additional devices having characteristics different from those handled previously, they must undergo a complete redesign.

Accordingly, it is a primary object of the present invention to provide an improved method and apparatus for a microprogrammable peripheral processor.

It is a further object of the present invention to provide an improved microprogrammable peripheral processor for handling commands involving the operation of a plurality of devices having different operational characteristics.

It is a more specific object of the present invention to provide an improved method and apparatus for peripheral subsystems which provides increased flexibility and results in a cost reduction for the peripheral subsystem.

SUMMARY OF THE INVENTION

The above and other objects are achieved in a preferred embodiment of the present invention which includes a microprogrammable peripheral processor having general register storage and a read only control store for storing at least two general classes or types of microprograms. The first class includes director microprogram routines which specify the functions that the different commands are to perform. The second class includes the execution routines which set up the various portions of the processor for execution of the command. The processor invokes these routines through the use of branching apparatus including at least one return register and via branch on condition microinstructions. The commands are coded to fetch predetermined director bytes which are stored in the general purpose register storage. Thereafter, the different execution microprogram routines reference these bytes of information in order to determine which operations are to be performed.

The above arrangement enables the director routines to be specialized to handle various occurrences relating to the execution of a particular command. This in turn enables the execution routines to operate efficiently utilizing a minimum of microinstructions. Specifically, the execution routines do not have to continually execute test instructions to determine the type of command being executed because the director routines have previously established the conditions for performing the command.

Additionally, the present invention allows devices having different characteristics to utilize the same director routines and branch to the appropriate execution routine as a function of the device characteristics. Hence, the system of the present invention can easily accomodate changes in device types which could arise from different customer needs or because of requirements of having to emulate different systems.

Also, the present invention facilitates the addition of new commands to a system. In particular, when the peripheral processor is required to execute new commands, this requires only an addition of new director microprogram routines to the control store without requiring changes to be made to the normally time constrainted execution routines.

The above and other objects of the present invention are achieved in the illustrative embodiment described hereinafter. Novel features which are believed to be characteristic of the invention, both as to its organization and method of operation, together with further objects and advantages will be better understood from the following description when considered in connection with the accompanying drawings. It is to be expressly understood, however, that these drawings are for the purpose of illustration and description only and are not intended as definition of the limits of the present invention.

BRIEF DESCRIPTION OF THE DRAWINGS

FIG. 3*f* shows in greater detail the different branch circuits of FIG. 3*e*.

FIG. 3*i* shows in greater detail the ALU section 316 of FIG. 2.

FIGS. 4*a* through 4*g* shows the different microinstruction formats executed by the processor of the present invention.

FIG. 7 illustrates the coding of several control bytes in accordance with the present invention.

FIGS. 11*a* through 11*e* are flow diagrams of a first type of execution routine.

TABLE OF CONTENTS

Figure 1:
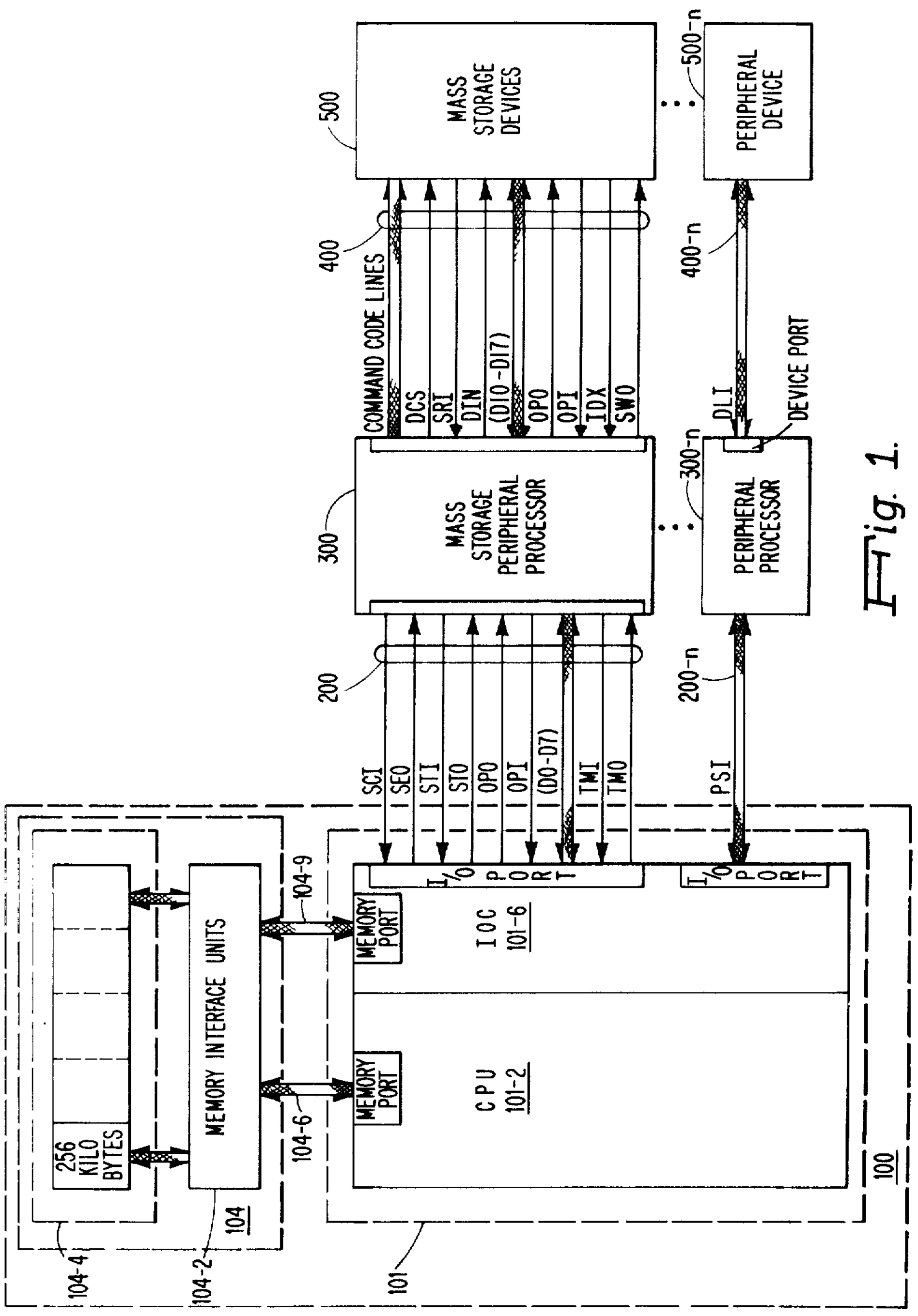
FIG. 1 is a diagramatic illustration of a data processing system incorporating the principles of the present invention.
Figure 3A:
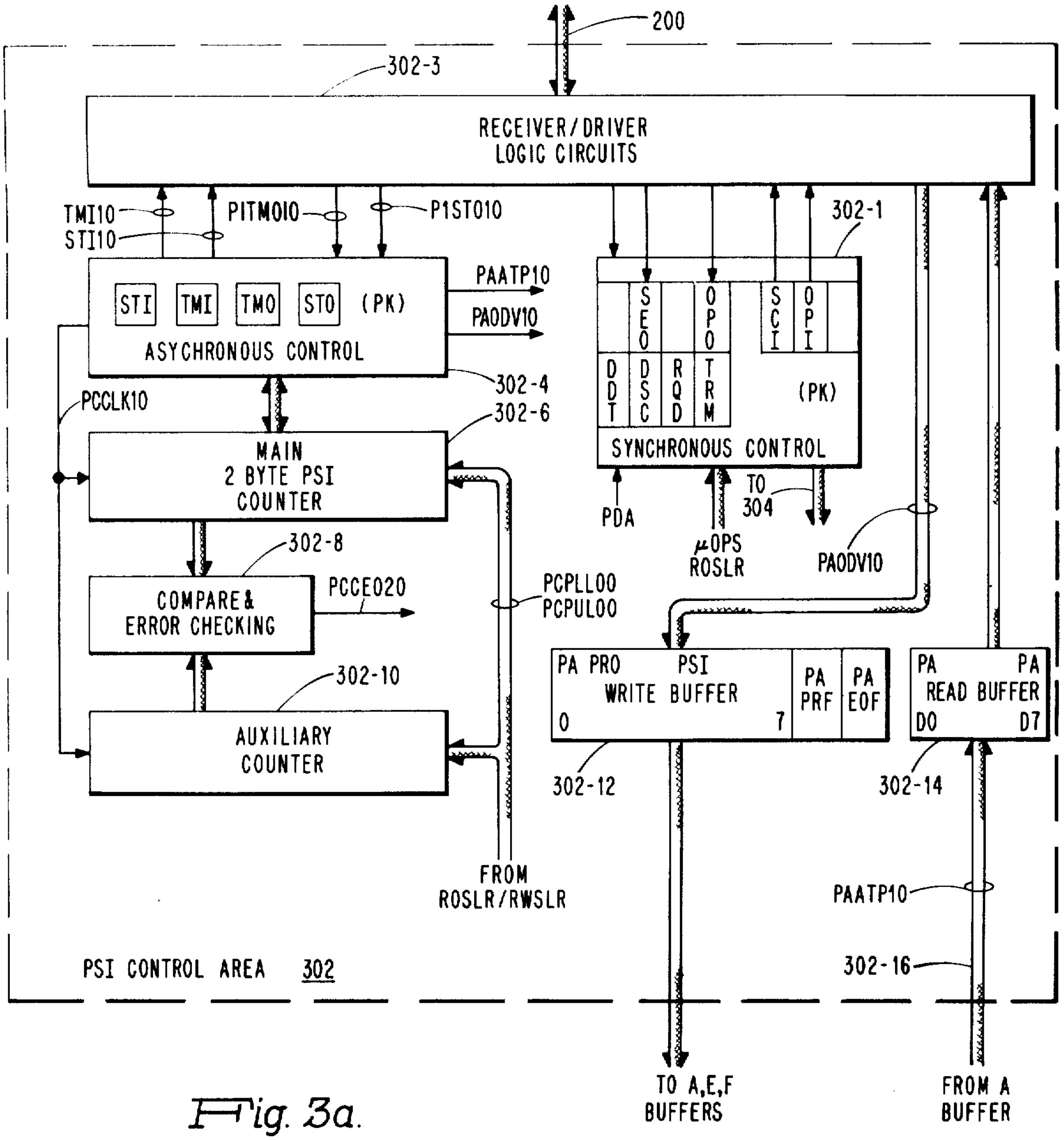
FIG. 3*a* shows in greater detail the PSI controls area of FIG. 2.
Figure 3B:
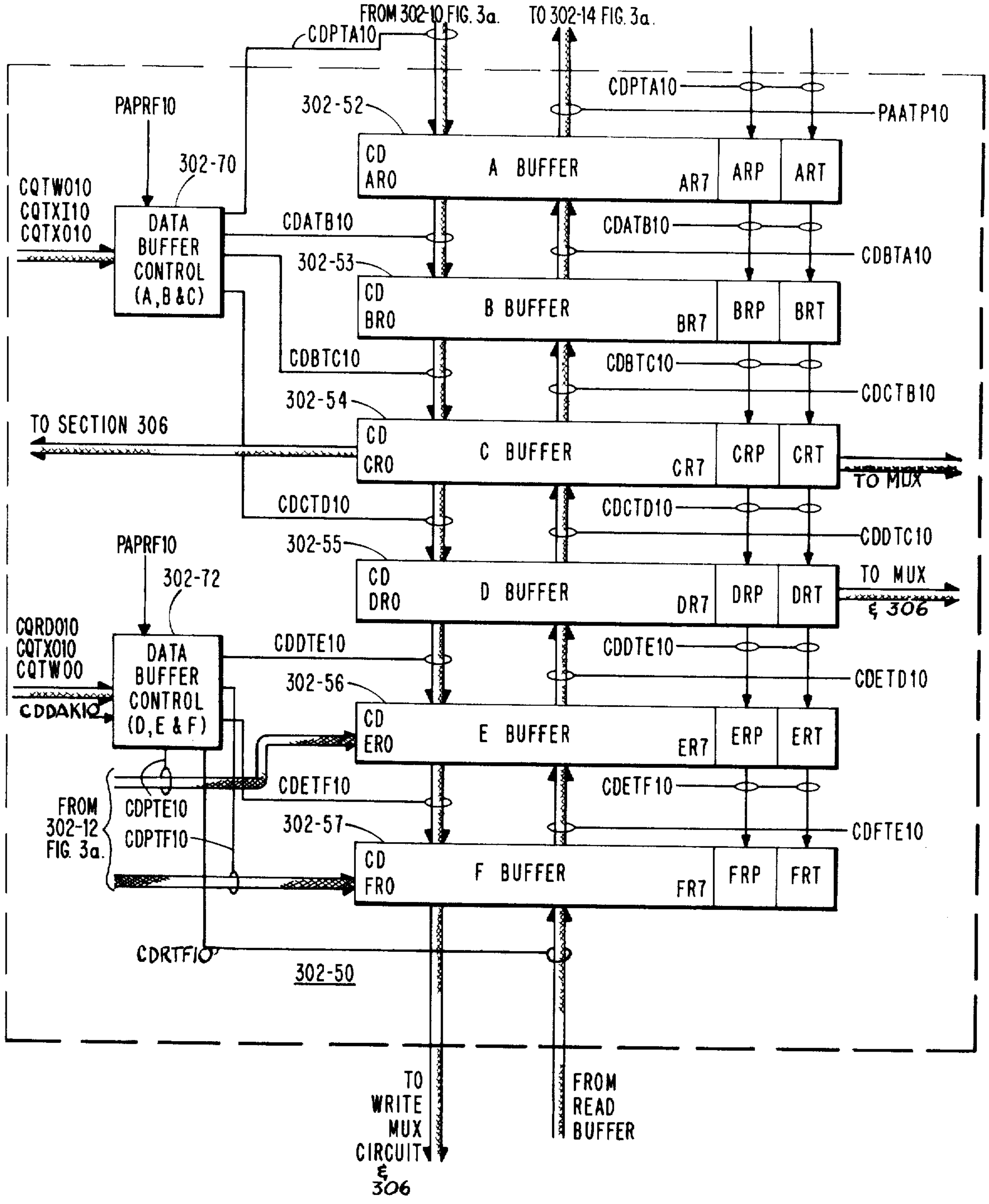
FIG. 3*b* shows in greater detail the Data Buffer Registers and Control Area 302–50 of FIG. 2.
Figure 3C:
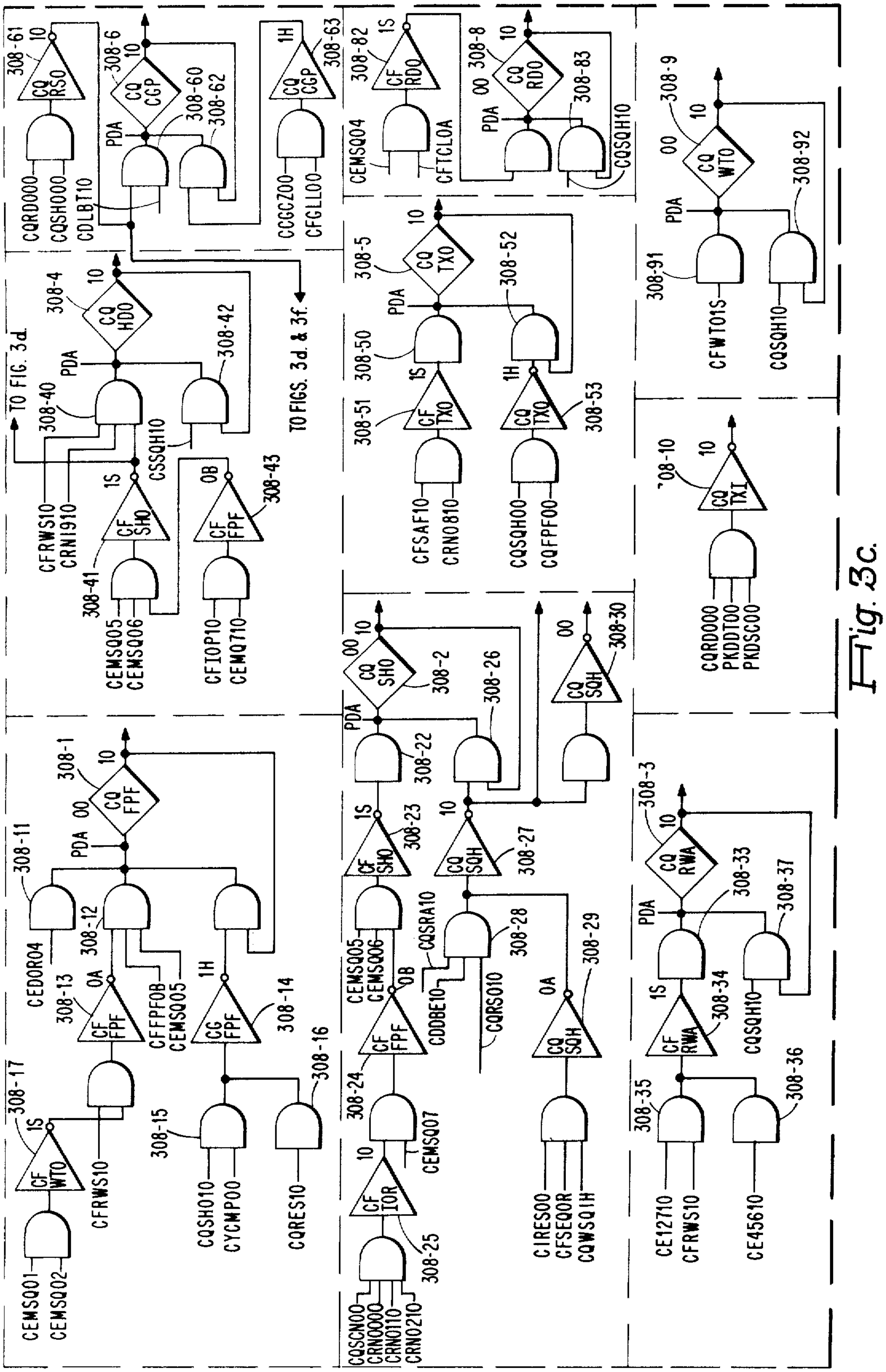
FIG. 3*c* shows in greater detail the control sequence storage of section 308 of FIG. 2.
Figure 3D:
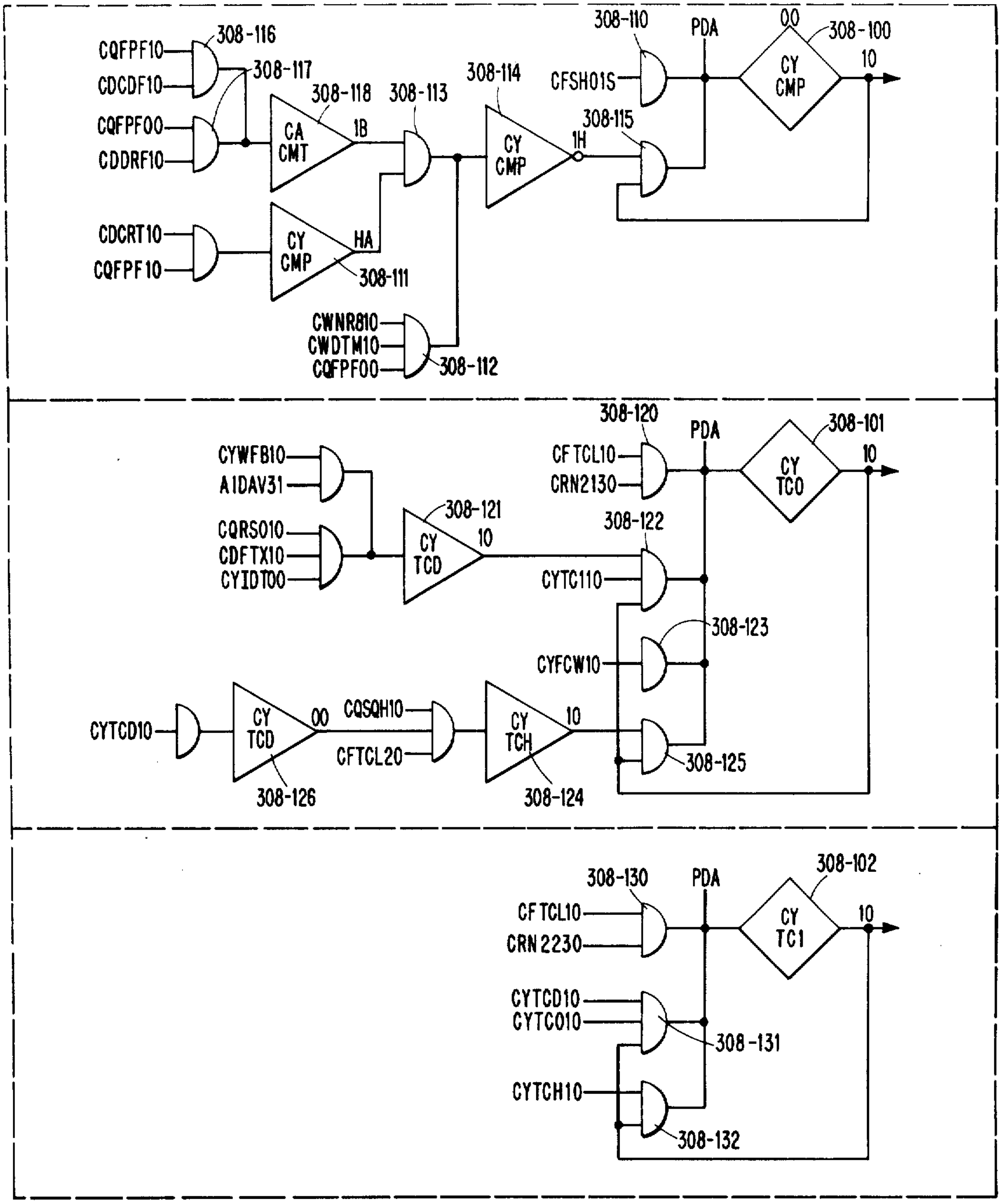
FIG. 3*d* shows in greater detail the counter controls of section 308 of FIG. 2.
Figure 3E:
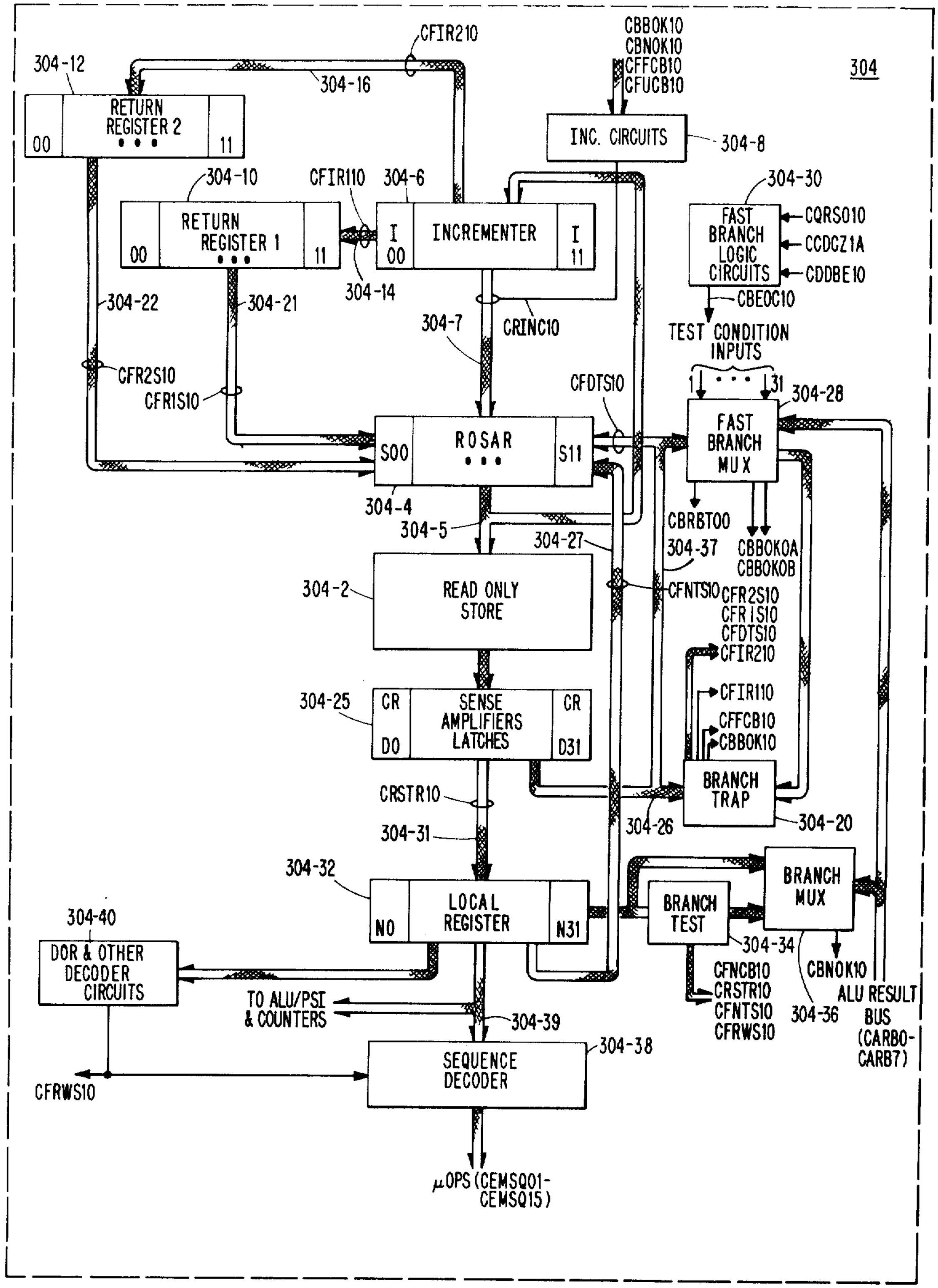
FIG. 3*e* shows in block form the read only storage controls section 304 of FIG. 2.

General Description of Overall System of FIG. 1
Peripheral Subsystem Interface Lines
Device Level Interface Lines
General Description of Mass Storage Processor
Detailed Description of Mass Storage Processor Sections
- PSI Controls Section 302 and Buffer Section 302-50
- High Speed Sequence Controls Section 308
- Read Only Storage Controls Section 304
- Microinstruction Formats
- Detailed Description of the ROS Circuits of FIG. 3*e*
- Read/Write Storage Section 306
- General Register Section 314 and Arithmetic Logic Unit Section 316
- Data and Gap Counter Section 318
- Device Level Interface Control Section 310

Control Bytes
Microprogram Routines
Description of Operation of the Preferred Embodiment
Appendix

GENERAL DESCRIPTION OF OVERALL SYSTEM OF FIG. 1

The present invention finds application primarily in a data processing system which includes an input/output subsystem in which a peripheral processor controls the operation of a plurality of peripheral devices in response to commands received from an input/output channel. This type of system can for the purposes of the present invention be considered conventional in design. Therefore, the system will be described only to the extent necessary in understanding the operation of the present invention. Also, for ease of reference, definitions of certain terms used herein are summarized in an appendix included herein.

Referring now to FIG. 1, there is shown a system which incorporates the microprogrammable peripheral processor of the present invention. The system includes a central processor complex (CPC) which includes those units used for addressing main storage for retrieving or storing information for performing arithmetic and logical operations upon data, for sequencing instructions in the order desired and for initiating communications between main storage and external devices. The main units of the central processor complex 100 includes a central processing unit (CPU) 102, a main memory subsystem 104 and an input/output controller (IOC) 106. The CPU executes instructions of one or more programs stored in the main storage subsystem 104. The TOC is that part of the system involved in the execution of commands used to carry out an input/output operation. An input/output operation is defined by a channel program. The program includes a plurality of instructions called commands. The operation is executed by a "channel". The channel includes the IO facilities, a hardware link between the IOC and peripheral processor termed a physical channel, and a logical channel. The logical channel is a collection of facilities in a peripheral processor which is required to execute an I/O operation defined by a channel program. Since channels are well known in the prior art, their operation will not be described in further detail herein.

A peripheral subsystem interface (PSI) 200 provides a transfer and control link for exchanging information between a mass storage peripheral processor 300 and the IOC 106. The exchange is accomplished by controlling the logical states of various signal lines in accordance with pre-established rules implemented through a sequence of signals termed "dialog". The interface includes a Service Code In line 200-1, a Service Enabled Out line 200-2, a Strobe In line 200-3, a Strobe Out line 200-4, a Terminate In line 200-4, a Terminate Out line 200-6, and an Operational In line 200-7, an Operational Out line 200-8, and data bus lines DO-DO7. The descriptions of the interface lines are given in greater detail in the section to follow.

PERIPHERAL SUBSYSTEM INTERFACE LINES

| Designation | Description |
|---|---|
| DO-7, DP | The data path lines are on one byte wide bidirectional path (eight bits + parity) that extends between the MSP and the IOC. The nature of the information on the data lines (i.e. data, service code, etc.) is determined by the dialog. |
| SCI | The service code in line extends from the MSP to the IOC. When set, SCI indicates that the MSP has a service code sequence to send to the IOC. This line is fully interlocked with a Service Enable out line. The MSP only transfers the service code sequence when the SEO line is high. The SCI line becomes high only when the SEO line is low. |
| SEO | The service enable out line extends from the IOC to the MSP and indicates when the IOC is ready to receive a service code sequence. The line is fully interlocked with the SCI line. |

PERIPHERAL SUBSYSTEM INTERFACE LINES—Continued

| Designation | Description |
|---|---|
| OPI | The operational in line extends from the MSP to the IOC. This line indicates the operational state of the MSP to the IOC. When activated, the OPI line indicates that the MSP is operational and capable of communicating with the IOC. When deactivated, it means that the MSP is powered down or is in a state that makes it incapable of responding to signals on the PSI. |
| OPO | The operational out line extends from the IOC to the MSP. This line indicates the state of the IOC. When activated, it indicates that the IOC is operational and capable of communication with the MSP. When deactivated, it signals that the IOC is powered down or is in a state that makes it incapable of responding on the PSI. |
| STI | The strobe in line extends from the MSP to the IOC. This line in conjunction with a strobe out line controls data transfers on the interface. For a read operation (i.e. data from the MSP), the STI line can only be set when the STO/TMO is reset. The STI line indicates to the IOC that data is present on the data lines. To obtain data the IOC responds by setting either the STO line or TMO line which resets the STI line. When the IOC detects the fall of the STI line, it takes the data from the lines. For a write operation, the roles of lines STO and STI are reversed. The IOC raises line STO when it puts data on the data lines. When the MSP detects the rise of line STO and it is ready to receive the data, it raises either line STI or line TMI. When the MSP detects the fall of line STO, it takes the data from the data lines. |
| STO | The strobe out line extends from the IOC to the MSP. This line is used by the IOC to indicate its participation in the dialog on the interface For a read operation, STO is raised by the IOC when it detects the rise of STI (or TMI) and it is ready to obtain the data. On a read operation, STO cannot be raised if STI and TMI are both logical ZERO. When the MSP detects the rise of STO, it lowers STI (or TMI). Upon detecting the fall of STI (or TMI), the IOC takes the data from the data lines. If necessary, the IOC can hold up the dialog at this point by delaying the fall of STO. When it is ready to proceed, it lowers STO, indicating to the MSP that the data has been taken and that the data lines can now be altered. If the IOC terminates the current dialog, it will do so by raising TMO instead of STO for the last byte to be transferred. For a write operation, the STO line indicates to the MSP that the IOC has data ready for it. The IOC puts the data on the data lines and raises STO. The STO line may not be activated for a write operation unless the STI and TMI lines are reset. The STO line must be reset when STI (or TMI) is activated. When the MSP detects the fall of STO, it may then take the data. If necessary, the MSP can hold up the dialog at this point by delaying the lowering of STI (or TMI). When ready, the MSP lowers STI (or TMI) indicating to the IOC that the data lines can be now altered. |
| TMO | The terminate out line extends from the IOC to the MSP. This line is used by the IOC to end the current dialog. For a write operation, TMO can indicate one of the following conditions: (1) For a data transfer, TMO implies that a byte being transferred is the last byte of a field and the data count is exhausted. Since data chaining is transparent to the MSP, TMO rises only when the count of the last data chained CCE in the data chain array is exhausted. (2) For a command or IOC instruction transfer, TMO indicates that the transfer is complete with a byte being sent on the current transfer and that no more bytes are forthcoming. During a write operation, TMO can only rise if STI and TMI are low, and will fall when the IOC detects the rise of STI (or TMI). For a read operation, TMO is used in one of the following ways: (1) In a data transfer, TMO indicates that a byte being transferred exhausts the data count. Since data chaining is transparent to the MSP, TMO will only rise when the count associated with the last data chained CCE of the data chain array is exhausted. (2) In a service code sequence, TMO will be used in one of the following ways: 1. The IOC may raise TMO to stop the transfer of the sequence immediately (e.g. after detecting an error); 2. The IOC has received the maximum number of status bytes it can handle and the MSP is to stop any further transmission of status bytes in this service code sequence. In a read operation, TMO will be used in one of the above ways by being sent instead of STO. During a read operation TMO can only rise if STI (or TMI) is high, and will fall when STI (or TMI) falls. This line must be reset to a logical ZERO state when not in use. |
| TMI | The terminate in line extends from the MSP to the IOC. This line is used by the MSP to end current dialog. For a write operation, TMI is sent instead of STI and can indicate one of the following conditions: 1. For a data transfer, TMI indicates that a byte being received is the last byte the MSP will accept for this transfer sequence (e.g., media is exhausted), or that the MSP is temporarily suspending the data transfer sequence. 2. For a command transfer, TMI indicates that a byte being received is the last byte required by the MSP. For a read operation, TMI is sent instead of STI and indicates one of the following conditions: 1. For a data transfer, TMI indicates that a byte being transferred is the last byte available from the media for this data transfer sequence, or that the MSP is temporarily suspending the data transfer sequence. The suspended sequence may be resumed by using the service code "Initiate Data Transfer - Resume". However, it is important to note that a service code that causes Command Pointer movement (for this same logical channel) will indicate termination of the data transfer (cannot be resumed), since the Move Pointer service code implies that execution of that CCE is complete. Thus, if the MSP intends to resume a data transfer that it is suspending, it should not send any Move Pointer service codes for that logical channel until after the transfer is resumed. 2. For a service code sequence, TMI indicates that the byte(s) being transferred is the last byte in the service code sequence. TMI must be set to logical ZERO when not in use. |

As seen from FIG. 1, the IOC 106 is capable of controlling a plurality of physical channels designated 200-1 through 200-n which connect the IOC with one of a number of peripheral processors 300 through 300-n. Each peripheral processor exchanges information with each of its associated peripheral devices over a device level interface (DLI) according to specific dialog sequences. The various lines which comprise the device level interface and descriptions are set forth in the table herein to follow.

DEVICE LEVEL INTERFACE LINES

| Designation | Description |
|---|---|
| DCP, DC0-DC5 | The command code lines carry encoded commands from the mass storage processor (MSP) to the mass storage device (MSD) for decoding and execution. |
| D1P, D10-D17 | The nine bidirectional lines are used to transfer data, address, control and status information between the MSP and a MSD. |
| DCS | A Device Command Strobe line when at a logical ONE signals when the signals on the command codes lines are valid for sampling. |
| OPI | An Operational In line which signals that the MSD is existent, powered up and capable of communication with the MSP. |
| IDX | An index mark line when at a logical ONE for 2 microseconds indicates the beginning of a logical track. |
| OPO | An operational out line which signals that the MSP is existent, powered up and capable of communication with the MSD. |
| DIN | A device initialize line which causes a MSD to place all its storage elements in an initalized state. |

DEVICE LEVEL INTERFACE LINES
–Continued

| Designation | Description |
|---|---|
| SRI | A serial read in line which during a write operation signals the MSP that the MSD is executing a write command. The MSD activates this line upon receipt of a write command and does not reset it until the trailing edge of DCS. During a read operation, this line contains the information read from the media. The read signal is produced by the heads, amplified and converted into digital form before applied to the SRI line. It contains a pulse for each transition recorded on the medium. This line is also used as a strobe to control interface dialog when information is transmitted over the bidirectional data lines. |
| SWO | A serial write out line transmits the information to be written. It contains a single logical ONE pulse for each transition to be recorded on the medium. This line is also used as a strobe to control interface dialog when information is transmitted over the bidirectional data lines. |

The device level interface provides for the exchange of data and control information between a peripheral processor and connected peripheral devices. It will be obvious that the interface lines are only common to a specific type of device. The specific interface disclosed connects a mass storage device 500 to the mass storage peripheral processor 300 as shown in FIG. 1. Just as the IOC 106 is capable of exchanging data and control information between a plurality of peripheral processors, each peripheral processor can exchange data and control information between it and a plurality of peripheral devices. For simplicity, only a single peripheral device is illustrated as being connected to each peripheral processor of FIG. 1.

Continuing on with the general description of FIG. 1, it is seen that the memory subsystem 104 includes a memory interface unit 104-2 and a main memory 104-4. As shown, the main memory subsystem can have from 1 to 4 memory ports, each port providing a storage capacity of 256 kilobytes. The memory interface unit 104-2 includes the logic and control circuits required for establishing communication between a memory port and the CPU and IOC. For the purposes of the present invention these units can be considered conventional in design. In the preferred embodiment the main memory subsystem 104-4 utilizes a MOS semiconductor memory. As seen from FIG. 1, the main memory subsystem comprises 1 to 4 main memory units each coupled with the processor subsystem via a corresponding one of the cables 104-6 through 104-9 as shown. In the processor itself, a memory port connects a memory unit. Each main memory unit includes a memory controller or main store sequencing unit and up to eight memory subunits. Each subunit includes four sections, each of which includes a 8K by 10 bit memory array. Each main memory controller is operative to perform the necessary read/write memory operations required for accessing a word of information which comprises for 9 bit bytes of information.

Before beginning a description of the invention utilized in the mass storage processor 300 of FIG. 1, first a discussion of the manner in which information appears on a storage system in which the present invention is used will be given. This description is given by way of example only and should not be construed as a limitation of the present invention.

Information is generally stored along circumferential tracks on a rotating device such as a disk, in records comprising a number of information fields. These fields include a count field, a key field and a data field. Normally, an index mark indicates the physical beginning of each track and all tracks on a disk pack are synchronized by the same index mark. Each track is headed by a home address field for address identification and a track descriptor record (record RO) for indicating the physical condition of the track. Each of the fields of information recorded on a track are separated by gaps. The gap lengths vary depending upon the storage device, location within the record, format, bit density and the record length.

An address marker indicates the beginning of each record for control purposes. Each address marker is preceded by a synchronization area which includes a plurality of synchronization signals used to synchronize the timing circuits used in the performance of a read operation. The various terms defined above are also given in a glossary of terms section which is appended as a portion of this specification. The significance of these fields will be described later in connection with FIGS. *5a* and *5b*.

GENERAL DESCRIPTION OF MASS STORAGE PROCESSOR 300

Figure 2:
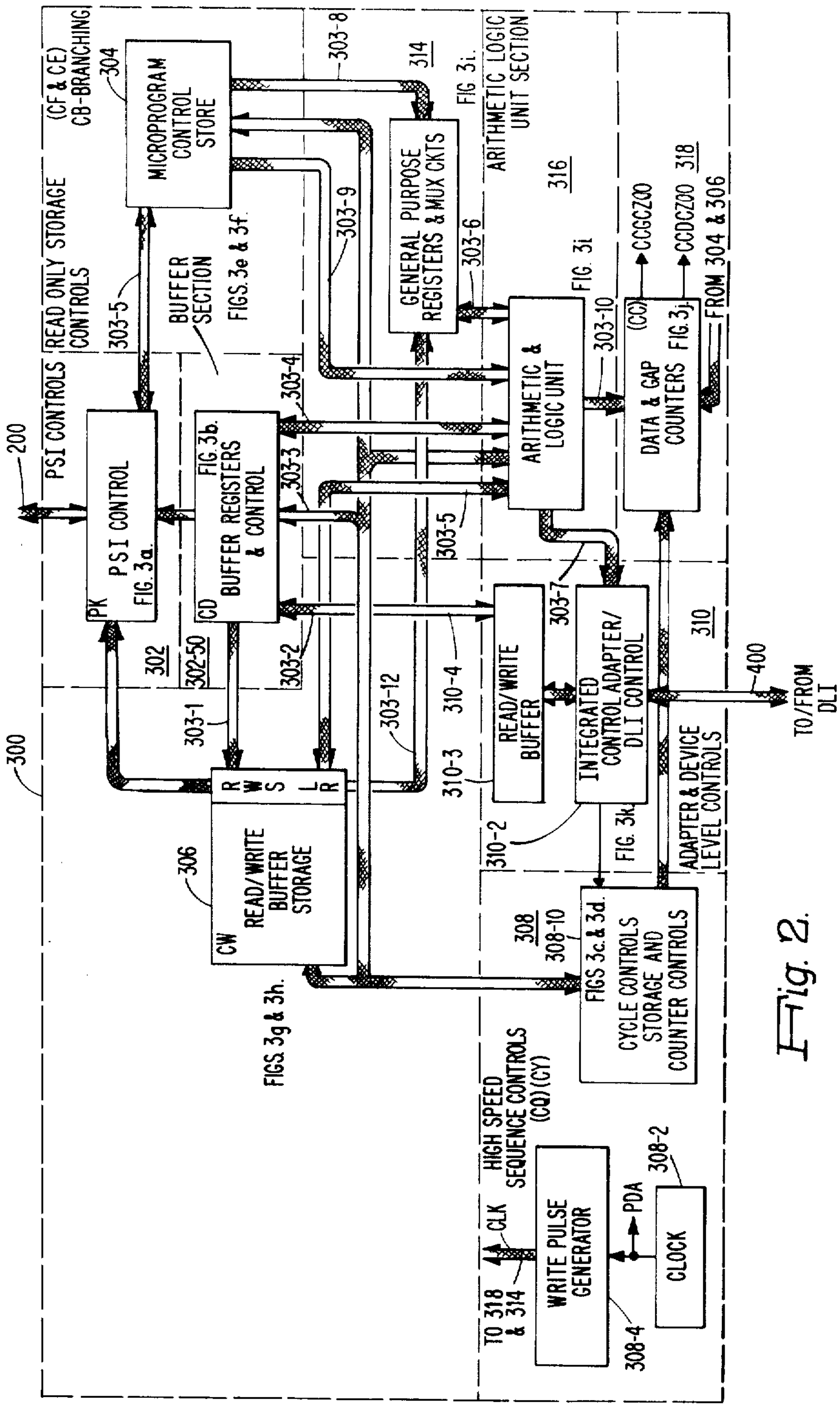
FIG. 2 shows in greater detail the peripheral processor 300 of FIG. 1.

FIG. 2 is a more detailed yet simplified diagram of a peripheral processor constructed in accordance with the principles of the present invention. Referring to the Figure, it is seen that the major sections of the processor 300 include: A Peripheral Subsystem Interface (PSI) Controls Section 302; a General Purpose Register section 314; an Arithmetic and Logic Unit (ALU) section 316; a Read Only Storage Control section 304; a High Speed Sequence Controls section 308; a Device Level Interface (DLI) Controls section 310; a Read Write Buffer Storage (RWS) section 306; and a Counter section 318.

The PSI controls section 302 includes logic circuits and buffer registers necessary to connect the processor with one byte wide asynchronous PSI interface 200 and sustain the required data and control dialog necessary for communication with the IOC. As seen from FIG. 2, this section couples to the various sections for receiving data and control signals via transfer conductor paths 303-1 through 303-5. The section 302 is divided into two areas: a PSI control area 302-1 and a buffer register and control area 302-50. These areas are described in greater detail herein. The ALU section 316 in addition to coupling to the Buffer section 302-50 also couples to the Buffer Storage section 306 and General Purpose Registers section 314 via paths 303-5 and 303-6 respectively. The ALU section 316 performs all logic, arithmetic and register transfers within the processor. The various modes of operation for the ALU are established by signals applied via conductor path 303-9 from the read only storage controls section 304. As described in greater detail herein, the section 316 includes a pair of identical arithmetic and logic units, conventional in design, designated as a main ALU and an auxiliary ALU, and their associated control and error checking logic circuits. Both ALUs are constructed of two 4 bit MSI ALUs which are interconnected to produce an 8 bit output. Depending upon the states of the input signals applied to the carry enable, carry in and mode control input terminals of the ALUs, the ALUs can be made to perform 16 logic or 32 different arithmetic operations upon the pair of operands being operated upon. Both ALUs operate upon the same operands simultaneously and the error checking circuits compare the results of both ALUs. The general purpose registers section 314 includes 16, 8 bit wide general purpose registers and provides storage for information required during a particular operation (e.g. command codes, ALU operands etc.). Additionally, the section includes 16, 8 input multiplexer-selector circuits, conventional in design, from which the contents of any one of 8 other sources can be applied to the ALUs as one of the operands. In a preferred embodiment, the general purpose registers correspond to storage locations of an addressable solid state scratch pad memory, conventional in design. The registers are addressable by the control store section 304 and the buffer storage section 306 via paths 303-8 and 303-12 respectively.

The gap and data counter section 318 also couples to the ALU section 316 via conductor path 303-10. This section includes data counter logic circuits and gap counter circuits provide primary count control during read, write and search operations. The data counter circuits provide a count of the number of bytes being operated upon. The gap count logic circuits provide orientation information by giving an accurate indication of the gap length between fields of a data record being read (e.g. the gap length between the header and key fields, the gap length between the key and data field, etc.). Each of the two counters, as explained in greater detail herein include a main and an auxiliary counter, together with decrementing and checking logic circuits. Each counter is constructed of four synchronous 4 bit binary counter chips which are connected to form a 16 bit counter. Both counters of the data counter are loaded by a microinstruction with the same count specified by the contents of either the ROSLR or RWSLR. Both counters are decremented and the states of both counters are compared by error checking circuits. When the circuits detect a non comparison, they cause an error indication to be set. Similarly, both counters of the gap counter are loaded via the ALU section 316 with same count derived from a constant field of a microinstruction. When enabled, the counters are decremented by clock pulse signals from a clock 308-2 (i.e. the counter is decremented by one every 600 nanoseconds). Error checking circuits check the counters for proper operation in the same manner as the operation of the data counter is checked.

The read only storage controls section 304 provides storage for resident control and diagnostic microprograms (i.e. 4K, 32 bit words of storage). The section, as described in greater detail herein, has a control store which includes two sections. One section is used for native operations and the other section is used for emulation of foreign systems. In the preferred embodiment, control store is unalterable and is constructed of programmable read only memory (PROM) chips, conventional in design. Obviously, the control store can also be constructed of random access memory (RAM) chips, conventional in design. Thus it can be loaded with microinstructions by external means, such as a tape cassette device.

The section 304 also includes associated addressing, control, decoding and parity logic circuits. Additional address storage circuits are included by enable branching between three levels of microinstruction subroutines.

The read/write storage section 306 couples via conductor paths 303-1, 303-5 and 303-12 to the other sections as shown in FIG. 2. This section includes a read/-write alterable storage of 1.5K X10 bits used for storing device parameter bytes in addition to providing temporary storage for control and data handling operations (e.g. status and address information).

The Device Level Interface Controls section 310 includes an integrated control adapter designated as block 310-2 which couples to paths 310-4 and 400. The adapter includes logic circuits and buffer registers required to establish an interface with disk storage devices of the system for controlling device operations and generating required dialogue sequences over the bus 400. That is, the section enables the selection of the designated disk device and execution of the various commands. The buffer registers provide an interface between the asynchronous operated device/adapter circuits and the synchronous operated mass storage processor logic circuits.

DETAILED DESCRIPTION OF MASS STORAGE PROCESSOR SECTIONS

Now, the above described sections will be described in greater detail with reference to FIGS. 3*a* through 3*k*.

PSI CONTROLS SECTION 302 AND BUFFER SECTION 302-50

The PSI Control Area 302 and Buffer Register and Control Area 302-50 are shown in greater detail in FIGS. 3*a* and 3*b* respectively.

Referring to FIG. 3*a*, it is seen that this area includes a plurality of receiver/driver logic circuits 302-3 which operate to provide digital control and data signals to interface 200. The receiver/driver circuits can be considered conventional in design and comprise a pair of differentiala amplifier circuits. Also, these circuits may take the form of the driver/receiver circuit invented by Nelson W. Burke disclosed in a patent application titled "Bidirectional Line Driver-Receiver Circuit" bearing Ser. No. 863,087, assigned to the same assignee named herein.

As seen from FIG. 3*a*, a read buffer 302-14 and a write buffer transfer information between the interface driver circuits and receiver circuits and the data buffers of the buffer section 302-50.

The read buffer 302-14 includes a plurality of amplifier latching circuits, conventional in design. During read operations, the output signals from the A Buffer of section 302-50 applied via a bus 302-16 are loaded into the read buffer 302-14 when a control signal PAATP10 is switched to a binary ONE. As explained herein, this signal is generated by asynchronous circuits included in this block 302-4. Briefly, this block includes a plurality of latching amplifier circuits capable of being set and reset by the IOC via signals applied to various lines of the interface 200. For example, the asynchronous logic circuits signal the IOC of data stored in the read buffer by setting lines STI or TMI. The read buffer 302-14 stores bytes until the IOC resets one of the lines STO or TMO which in turn resets corresponding ones of the latching circuits.

The write buffer 302-12 includes a plurality of register stages, conventional in design. The buffer 302-12 receives input signals which are stored in the buffer in response to an output Data Valid signal PAODV10 being switched to a binary ONE. This signal is generated by asynchronous logic circuits when the IOC forces strobe output signal PISTO10 from a binary ONE to a binary ZERO. The contents of the write buffer are selectively loaded into the A, E or F buffers as a function of their availability of section 302-50 by controls signals generated by control circuits 302-70 and 302-72 in response to signal PAPRF10.

The PSI control area 302-1 also includes synchronous control logic circuits included within 302-12. The synchronous control circuits include a plurality of flip-flops which can be settable by micro-operation signals from the read only storage controls section 304 applied via an input bus designated 302-14 in FIG. 3*a*. Also, the circuits can be set from signals applied via interface 200. For example, the micro-operation signals can initiate activity on the peripheral subsystem interface 200 by setting one of the three sequence flip-flops included in this section. That is, a microinstruction can cause a setting of a request data flip-flop, ROD, conditioning the interface 200 to receive data bytes from the IOC. Also, micro-operation signals from another instruction can cause a do data transfer flip-flop, DDT, to condition the interface 200 to transfer data bytes to the IOC. Another microinstruction can produce micro-operation signals which condition a do service code flip-flop, DSC, to condition the interface 200 for signaling a transfer of service code or command information to the IOC. The other flip-flops include a terminate flip-flop, TRM, a service code in flip-flop, SCI, a service enable out flip-flop, SEO, an operational out flip-flop, OPO, and an operational in flip-flop, OPI, some of which are also set and reset by micro-operations signals for controlling the transfer of command and data bytes via interface 200. The operation of these flip-flops will be described in greater detail as is required for an understanding of the present invention.

Each of the flip-flops included within the synchronous control section 302-12 receives PDA clocking signals from a central clock or timing source 308-2 included in section 308. The clock can be considered conventional in design and can for example include circuits such as those disclosed in U.S. Pat. No. 3,725,871 which is assigned to the same assignee named herein.

It is also seen that section 302-1 includes a 2 byte or 16 bit decrementing counter which includes four, four bit binary counter stages, conventional in design. This counter is used by the asynchronous control logic circuits of block 302-4 to determine when a terminate in flip-flop TMI is to be set. An auxiliary counter 302-10 is also included to enable compare circuits of block 302-8 to detect the occurrence of a counter failure. That is, the auxiliary counter 302-10 and main counter 302-6 are both loaded in response to an I/O microinstruction from the same source (e.g. through the ALU section 318 from either the control store of section 304 or buffer storage of section 306) and both are decremented by a clocking signal PCCK10 from the circuits of control 302-4. The compare circuits of block 302-8 check to determine whether both counters are at the same state when one of the counters has been decremented to zero. In the event they do not, the circuits cause the setting of an error indication. When both counters have been decremented to zero, the circuits of block 302-8 switch a count equal zero signal PCCE020 to a binary ZERO. This indicates that the required number of bytes have been transferred (i.e. no error indicated). For further information as to the types of circuits which can be used to implement the counters, registers and other units described herein, reference may be made to the publication titled "The Integrated Circuits Catalog for Design Engineers" by Texas Instruments Inc. dated 1972.

From FIG. 3*b*, it is seen that area 302-50 includes six registers 302-52 through 302-57, herein referred to as registers A through F, and associated control logic circuits included within blocks 302-70 and 302-72. Each register includes 11 stages: nine for storing the eight data bits and parity bit of a byte, one for storing a marker or register full indicator bit and one for storing a terminate out indicator bit. Data and control information bytes are transferred between the read and write buffers of area 302-1 and a write multiplexer circuit and a read buffer, parallel by bit or bytes serial. The direction of transfer and path is determined by the stages of flip-flops included within the High Speed Sequence Controls section 308. As explained herein, these flip-flops are preset to certain states by microinstructions and the input signals applied by the flip-flops to the circuits of the control blocks 302-70 and 302-72 condition the circuits for such transfers.

The types of modes of operation which can be specified are as follows. The first mode (a no sequence active mode — NSA) represents the static state of the processor in which no data transfers to/from the disk units or to/from the IOC take place. The circuits of block 302-70 and 302-72 are conditioned such that registers 302-52, 302-53 and 302-54 are operatively coupled to the PSI and registers D, E and F are operatively coupled to the device adapter 310-2. The states of a pair of signals CQTXI10 and CQTXO10 generated by a Transfer In and a Transfer Out flip-flops included in the sequence control circuits establish the direction of the byte transfers for the groups of registers A through C and D through F. For example, the directions of transfer for the states of these signals as follows:

1. CQTXIOO[1] = PSI → REG. A → reg. B → reg. C → wait for processor (firmware) action;
2. CQTXI10[1] = reg. C → reg. B → reg. A → wait for PSI action;
3. CQTX000[1] = Device Adapter → reg. F → reg. E → reg. D wait for processor (firmware) action; and
4. CQTX010[1] = reg. D → reg. E → reg. F → raise request line → wait for Device Adapter action.

Other modes, submodes, are derived by utilizing the states of these two signals as follows:

1. CQTXI00 & CQTXO00 — Normal state of the processor. In this mode, bytes are transferred from the PSI and/or device adapter into the processor.
2. CQTXI00 & CQTXO10 — In this mode, control information bytes are transferred to the device adapter and/or device.
3. CQTXI10 & CQTXO00 — In this mode, information such as service code bytes, status bytes are transferred to the IOC.
4. CQTXI10 & CQTXO10 — In this mode, the transfers of modes 2 and 3 are combined.

Another mode is a write operation mode which is established by the state of a control signal CQWO10 generated by a write operation sequence flip-flop included in the sequence control circuits. When signal CQWTO10 is switched to a binary ONE, it forces signal CQTXO10 and CQTXI00 to a binary ONE and a binary ZERO respectively. These signals condition the registers to transfer bytes from the PSI to the device adapter or to the read/write store etc.

The next mode is a read mode of operation which is established by the state of a signal CQRD010 generated by a Read Operation sequence flip-flop included in the sequence control circuits. The signal CQRDO10 together with signal PADDT10 from the PSI control area 302-1 causes the signals CQTXI10 and CQTXO00 to be switched to a binary ONE and a binary ZERO respectively. This allows bytes to be shifted from the device adapter through registers 302-57 through 302-52 to the PSI.

A further mode is a search operation mode which is established by the state of a signal CQSH010 generated by a search operation sequence flip-flop included in the sequence control circuits. The signal CQSHO10 conditions the RWS section during search operations allowing bytes transferred through the registers from the device adapter or the PSI to the ALU section 316 to be written into the read/write storage section 306.

The control blocks 302-70 and 302-72 as seen from FIG. 3b generates the signals required to transfer bytes between registers at the appropriate time (i.e. when the registers are empty). The signals shown are generated in accordance with the following Boolean expressions. The "+" sign and "." sign designate "or" and "and" operations respectively.

1. CDPTA10 = CQTXI00 · CDPTE00 · CDPTF00 · PAPRF30 · CDARF00. This is a PSI to A register transfer signal which is forced high when the Transfer In flip-flop is in a reset state (i.e. signal CQTXI00 = 1) when there is no transfer from the PSI to either the E or F registers (i.e. signals CDPTE00 and CDPTF00 = 1), the A register is not full (i.e. signal CDARF00 = 1) and the write register is full (i.e. signal PAPRF30 = 1).
2. PAPRF10 = PKVSP10 · PAOVD10 + PAPRF10 · PKVSP10 · CDPTX20. This is the register full indicator for the PSI write register which sets whenever PAODV10 comes high and there is a valid sequence in progress (i.e. PKVSP10 = 1). This indicator resets when PTX comes high which transfers the contents of the write register into the A, E or F registers.
3. PAATP10 = [(PKDSC00 · PKVSP10 + PKSEO1A · PKVSP10) PKSTO20 · PKTMO20 · PKADV10 · PKSTI20 · PKTMI20 · PKDDT10] + PAATP10 · PKVSP10 · CDARF00. This is a transfer contents of A register into the PSI read register. It comes high only during read operations (i.e. data transfers to the IOC). It comes high whenever the PSI is in a read mode (i.e. PKDDT10 signal), there is no strobe cycle in progress, the sequence is valid, the PSI counter is other than zero and there is a valid byte in the A register (i.e. signal PKADV10 = 1). It stays set long enough to insure that signals PKSTI10, PKTMI10 and PKATP30 are set and the full indicator for the A register is reset (i.e. CDARF00 = 1).
4. CDATB10 = CQTXI00 · CDBRF00 + CDBTC10. The A register to B register transfer signal comes high when input transfer signal CQTXI00 is a ZERO and the B register is empty (i.e. signal CDBRF00 = 1). It also comes high when a B register to C register transfer signal comes high (i.e. signal CDBTC10 = 1).
5. CDBTA10 = CDARF00 · CDFTA00 · CQTXI10 · CFARL20. This is a B register to A register transfer signal which comes high when the transfer in sequence flip-flop is set (i.e. signal CQTXI10 = 1), the A register is empty (i.e. signal CDARF00 = 1) and there is no transfer being made from the F register or ALU (i.e. signals CDFTA00 and CFARL20 = 1).
6. CDBTC10 = CQTXI00 · CFCRL20 · CDCRF00 + CDCTD10 · CQTXI00. This is the B register to C register transfer signal which comes high when the transfer in sequence flop is reset (i.e. signal CQTXI00 = 1) and the B register is empty (i.e. signal CDBRF00 = 1). The signal is high when the contents of the C register are transferred to the D register on write operations (i.e. signals CDCTD10 and CQTXI00 = 1).
7. CDCTB10 = CDABE10 · CDFTB00 · CQTXI10. This is a C register to B register transfer signal which is high when the transfer in sequence flop is set (i.e. signal CQTXI10 = 1), the A, B or both registers are empty (i.e. signal CDABE10 = 1) and there is no transfer being made from the F to the B register (i.e. signal CDFTB00 = 1).
8. CDCTD10 = (CDDRF00 + CDFRF10) · CYWFB10. This is a C register to D register transfer signal which is high only during write operations.
9. CDDTC10 = (CDARF00 + CDB F00 + CDCRF00) CQRDO10. This is a D register to C register transfer signal which is high during a read operation (i.e. signal CQRDO10 = 1) when the A, B or C registers are empty.
10. CDDTE10 = CQTXO10 · CDPTE00 · CDIDE10. This is a D register to E register transfer signal which is high when the transfer out sequence flop is set (i.e. signal CQTXO10 = 1), the E, F or both registers are empty (i.e. signal CDIDE10 = 1) and there is no transfer being made from the PSI to the E register (i.e. signal CDPTE00 = 1).
11. CDETD10 = CQTXO00 · CDDRF00 · CFDRL20 + CDDTC10. This is an E register to D register transfer signal which is high when the transfer out sequence flop is reset (i.e. signal CQTXO00 = 1) and the F register is empty (i.e. signal CDDRF00 = 1). The signal is high when the contents of the D register are transferred to the C register during read operations (i.e. signal CDDTC10 = 1).
12. CDETF10 = CQTXO10 · CDEFA10 · CDPTF00. This is an E register to F register transfer signal which is high when the transfer out sequence flop is set (i.e. signal CQTXO10 = 1), the F register is empty (i.e. signal CDEFA10 = 1) and there is no transfer being made from the PSI to the F register (i.e. signal CDPTF00 = 1).
13. CDFTE10 = (CQTXO00 · CDERF00 + CDETD10) · CDFTA00 · CDFTB00. This is an F register to A register transfer signal which comes high when the transfer out sequence flop is reset (i.e. signal CQTXO00 = 1), the E register is empty (i.e. signal CDERF00 = 1) and there are no transfers being made from the F register to the A or B registers (i.e. signals CDFTA00 and CDFTB00 = 1). The signal is high during the transfer of the contents of the E register to D register (i.e. signal CDETD10 = 1).
14. CDRTF10 = CDDAK10 · CQTXO00 · CDFRF00. This is a read data to F register transfer signal which is high when a data acknowledge signal from the device adapter is high, the transfer out sequence flop is reset (i.e. signal CQTXO00 = 1) and the F register is empty (i.e. signal CDFRF00 = 1).

HIGH SPEED SEQUENCE CONTROLS SECTION 308

This section includes the timing circuits of blocks 308-2 and 308-4 in addition to the circuits together with associated circuits. As mentioned, the clock 308-2, conventional in design generates the clocking pulse signal for the processor. The generator 308-4, conventional in design, generates write pulse signals of the correct polarity and phase from the PDA signals. These CLK pulses are applied to the register circuits and counter circuits of sections 314 and 318 and condition them for write and loading operations respectively. The various sequence and cycle circuits are shown in greater detail in FIGS. 3*c* and 3*d*. The sequence flip-flops of this section shown in FIG. 3*c* are settable by firmware at the start of an operation and reset by hardware at the completion of the operation. The control signals derived from the microinstructions have either a "CE" or "CF" prefix.

As seen from FIG. 3*c*, the hardware sequence circuits include a gate and inverter circuit 308-10, flip-flops 308-1 through 308-9 with associated gating circuits 308-11 through 308-92 arranged as shown. The flip-flop 308-1 is a first pass/format flop which is set to a binary ONE during search operations/write operations. The flip-flop 308-2 is a search flip-flop which is set to a binary ONE during search operations. The flip-flop 308-3 is a read/write storage allow flop which is set to a binary ONE and enables hardware control over reading, writing and incrementing of the read write storage of section 306. The flip-flop 308-4 is a search header operation flop which when set to a binary ONE enables the ALU section to compare all ONE bytes in a search argument of a key field of a record during search key operations.

The flip-flop 308-5 is the transfer out sequence flop which as mentioned controls the direction of byte transfers through registers D, E, and F. When set to a binary ONE, it enables transfer of bytes from the D to E and E to F registers and causes the switching of the CDDAK10 signal notifying the device adapter that there is a byte in the F register when the full flop is set to a binary ONE. When reset, it enables the transfer of bytes from the F to E and E to D registers. The gate and inverter circuit 308-10 generates the transfer in signal. As mentioned, this signal controls the transfer of bytes through registers A, B and C. When set to a binary ONE, it enables bytes to be transferred from the A to B and B to C registers. It is set during read operations (i.e. signal CORDO00 = 0) or when either the do data transfer or do service code circuits are enabled (i.e. signal PKDDT00 or signal PKDSC00 = 0).

The flip-flop 308-6 is a count gap flop which is set to a binary ONE during read/search operations when processing a last check byte (i.e. when either signal CORDO00 or CQSH000 = 0 and signal CDLBT10 = 1). It is also set during write operations by circuits not shown. The flip-flops 308-8 is a read operation flop which is set to a binary ONE during read operations. The flip-flop 308-9 is a write operation flop which is set to a binary ONE during write operations.

Certain ones of the signals generated by the above circuits are applied to the circuits of the hardware cycle counter which FIG. 3*d* discloses in greater detail. It is seen that the counter includes flip-flops 308-100 through 308-102 and associated input circuits 308-110 through 301-132 arranged as shown.

The flip-flop 308-100 is a compare cycle flop which is set to a binary ONE by firmware (i.e. signal CFSHO1S = 1) during a search operation. It is reset to a binary ZERO when a punctuation bit signal is sensed (i.e. signal CWNR810 = 1) and the first pass flop is not set (i.e. not first pass). It is also reset when a terminate out bit is sensed in the C register (i.e. signal CDCRT10 = 1).

The flip-flops 308-101 and 308-102 are connected to form a two stage trap counter. During a write operation (i.e. signals CYWFB10, AIDAV31 and CYFCW10 = 1), the counter inhibits decrementing of the data counter of section 318 and "traps" sync bytes or address and sync bytes. During a read operation, the counter inhibits the transfer of sync or leading bytes of a field of a record being read from being sent to the PSI (i.e. signals CQRSO10, CDFTX10 and CYIDT00 = 1) but allows them to be written into the read-write storage section 306 as required (e.g. flag byte read during a read count operation).

Read Only Storage Controls Section 304

FIG. 3*e* shows section 304 in block diagram form. It is seen that the section includes a read only memory 304-2, addressable via an address register 304-4 which applies a 12 bit address via a path 304-5. The same address is applied to an incrementer register 304-6. The register 304-6 conventional in design, enables its contents to be incremented by one and loaded into register 304-4 via path 304-7 in response to increment control signal CRINC10 being forced to a binary ONE by control circuits of block 304-8.

Additionally, the contents of register 304-6 are applied to a pair of return registers 304-10 and 304-12 via paths 304-14 and 304-16 respectively. The contents of the register 304-6 are selectively loaded into the return registers in response to one of a pair of signals CFIR110 and CFIR210 being forced to a binary ONE by the branch trap circuits of block 304-20. Similarly, the contents of return registers 304-10 and 304-12 are selectively loaded into address register 304-4 via paths 304-21 and 304-22 in response to one of a pair of signals CFRIS10 and CFR2S10 being forced to a binary ONE by branch trap circuits 304-20.

When addressed, the store 304-2 applies signals to the sense latching amplifier circuits of a register 304-25 which are in turn applied to the branch trap circuits 304-20 for decoding and to address register 304-4 via paths 304-26 and 304-27 respectively. When the branch trap circuits 304-20 decode a branch microinstruction and the test condition is satisfied, they force a signal CFDTS10 to a binary ONE and the contents of an address field are loaded into register 304-4.

Additionally, a portion of the contents from circuits 304-25 are applied to the multiplexer selector circuits of a fast branch MUX block 304-28 which also receives a plurality of test condition input signals on input terminals 1-31, one of which is applied from logic circuits of block 304-30 and input signals from the ALU section (i.e. bus signals CARB0-CARB7). The circuits of MUX block 304-28 generate output signals representative of conditions being tested which are applied to the branch trap block 304-20. This block will be described in greater detail in connection with FIG. 3*f*.

The contents of circuits 304-25 are selectively applied to the flip-flop stages of local register 304-32 via a path 304-31 and loaded into the register when circuits included in a branch test block 304-34 force a strobe signal CRSTR10 to a binary ONE. Portions of the contents of register 304-32 are applied to the branch test block 304-34 and to a multiplexer selector in a included ina branch MUX block 304-36. Additionally, the mux block receives signals from the ALU as indicated. Also, register 304-32 loads an address into the address register 304-4 via a path 304-37 when the branch test block forces a signal CFNTS10 to a binary ONE. Circuits included within a sequence decoder 304-38 generate the micro-operation control signals in response to the signals applied via a path 304-39 from register 304-32.

Microinstruction Formats

Before describing the various blocks of FIG. 3*e*, in greater detail, the different types of microinstructions and their formats will be described with reference to FIGS. 4*a* through 4*g*.

Referring to FIG. 4*a*, there is shown a read/write store (RWS) microinstruction word which is used to control the address and data path of information to be read from or written into the read/write storage section 306. As seen from the Figure, this microinstruction word has an op code of 101 specified by bits 0 through 2. Bits 13 and 14 form a field which indicates the location in the read/write buffer storage for reading out or writing into a single byte. In the case for more than a single byte read/write operation, the contents of this location specify a starting address. The next field is a count field which includes bits 15 through 18. This field is used primarily for read/write or search count or header address operations which require either the reading or writing of information continuously from or to respectively the read/write buffer storage section. For example, the four bit count specified by this field can be loaded into the low order byte position of the data counter contained within section 318 while the rest of the stages of the counter are filled with zeros by the hardware. Bits 19 and 20 serve as an address select field which can specify three ways by which the firmware can generate a read/write storage address. These ways are set out in the associated table. It is seen from this table that when this field is set to 01, the hardware utilizes the contents of the read/write storage address register without referencing the RWS address field of the microinstruction. When the field is set to 10, The firmware generates the read/write store address by loading a four bit cirrent logical channel number (LCN) into bit positions 2 through 5 of a read/write store address register; the remainder of the address bits are taken from the RWS address field contained in the microinstruction. When this field is set to 11, the entire RWS address designated by the RWS address field of the microinstruction contained in the read only store local register is used.

Bits 21 and 22 serve as a trap count field and are used to specify the number of bytes which are to be masked in order to perform in various modes of operation. Bits 23 through 26 constitute a four bit field which is used to designate particular sequences required for read/write or search operations involving the storing of information into the scratch pad store of the read/write storage section. The table indicates the type of operations which are specified by different codings of the B sub op code bits.

FIG. 4*b* shows the format of an unconditional branch microinstruction. The microinstruction is one of two "fast branch" microinstructions which requires that the bits of the microinstruction be decoded from the sense amplifier latches in order to enable generation of a next microinstruction word address within one clock pulse time period. As implied from the name, this microinstruction is used to specify a non test branch operation for the purpose of calling in another micro program or routine. The op code bits 0 through 2 as shown in FIG. 4*b* are coded as 110. Bit 3 is set to a binary ZERO to specify that this is an unconditional fast branch operation. Bits 4 and 5 correspond to a "prebranch condition" field which is used to specify the setting of a return address before the unconditional branch. More specifically, the read only storage control section 304, as mentioned, includes two branch return registers (i.e. return address register 1 and return address register 2) which are used to keep track of addresses when branching from one routine to another. As indicated by the table in FIG. 4*b*, when bits 4 and 5 are set to 00, branching occurs without requiring any return register to be set to a particular address. When the bits 4 and 5 are set to 10, the branching hardware is operative to increment by one the current address found in ROSAR (304-4) and store it into return address register 1 before branching to a new address. After the routine branch to has been completed, the contents of return address register 1 are used to return to the first or original routine. When bits 4 and 5 are set to 01, the return address register 2 is loaded with the address of the microinstruction after it has been incremented by 1. This address register provides a second level of branch return. As indicated by the same table, it is undesirable to set bits 4 and 5 to 11 because this will result in loading the same address into both address registers 1 and 2.

As indicated by the FIG. 4*b*, bits 6 through 18 constitute a 12 bit branch address wherein bit 18 is the least significant bit and bit 6 constitutes an odd parity bit. Bits 19 and 20 constitute a "branch to address condition" field which specifies the conditions indicated in the table. When these bits are set to 00, the store will branch to a location defined by the branch address of the microinstruction. When bits 19 and 20 are set to 01, the store branches to an address contained in return address register 1 while it will branch to the address contained in return address register 2 when these bits are set to 10. Similarly, bits 19 and 20 will not be set to 11 since this is defined as an illegal condition. Bits 21 through 26 normally contain all zeros since they constitute an unused field. The rest of the bits are as indicated.

Figure 4C:
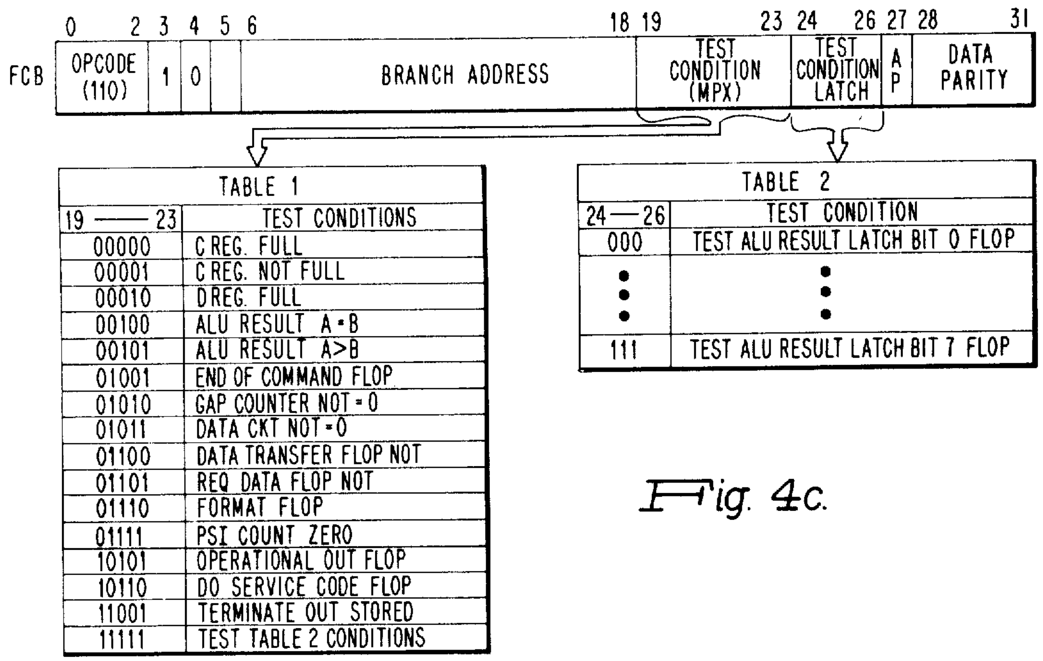

FIG. 4*c* shows the format of the second fast branch microinstruction which corresponds to a fast conditional branch (FCB) microinstruction. As shown, it has the same op code as the unconditional branch microinstruction but has bit 3 set to a binary ONE. Bit 4 serves as a set return address register 1 field. When this bit is set to a binary ONE and the test result is positive, the contents of the read only store address register are incremented by one and stored in the return address register 1. The store then branches to the location specified by the branch address field of the fast conditional branch microinstruction. Bit 5 is a reset test flop field bit which when set causes certain test flops to be reset after completion of the test. One of these flip-flops corresponds to an end of command flip-flop described herein.

Bits 6 through 18 constitute a branch address field while bits 19 through 23 constitute a multiplex test condition field. The test conditions are defined as indicated in Table 1 of FIG. 4*c*. There can be up to 31 flip-flops which are capable of being tested. The table indicates some of the more pertinent flip-flops. The test is made to determine whether or not flip-flop is in its binary ONE or set state. When this field is set to all ones, this indicates that none of the 31 test flops are to be tested but that one of the latches which receive the ALU result bus signals defined by bits 24 through 26 are to be tested. Bits 24–26 constitute a test condition latch field which is coded as indicated by Table 2. As explained herein, this field enables the contents of any one of the eight bit registers delivered through the ALU section to be tested on a bit by bit basis.

Figure 4D:
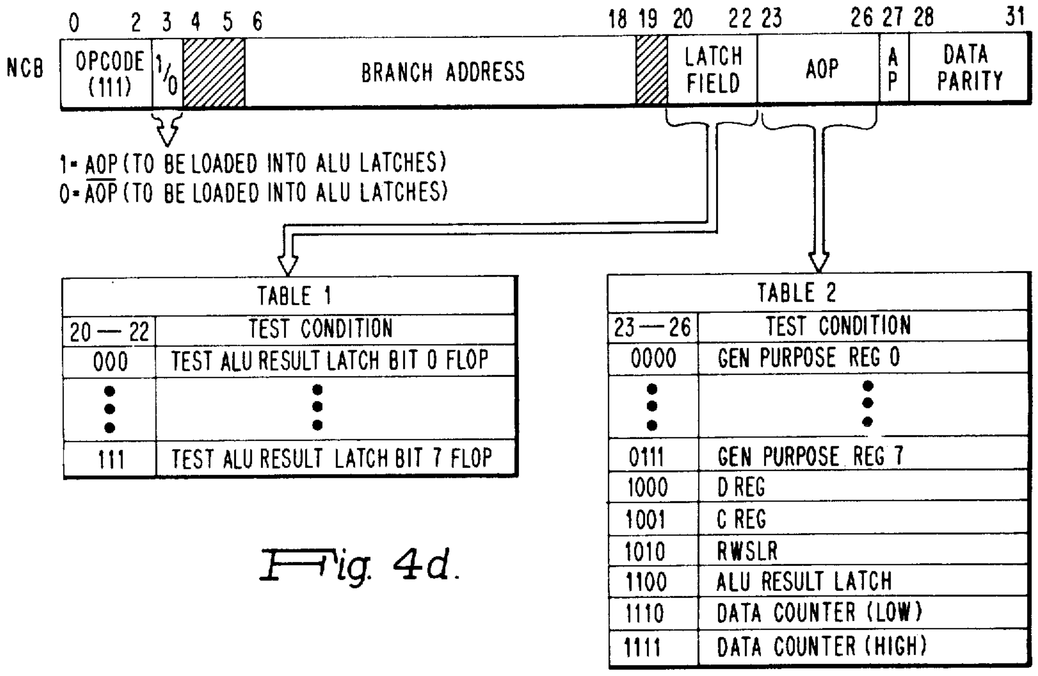

FIG. 4*d* illustrates the format of a normal conditional branch (NCB) microinstruction. Unlike the fast conditional branch and unconditional branch microinstructions, this microinstruction is decoded at the output of the read only store local register and requires an interval of two clock pulse periods to obtain the results of the test. The normal conditional branch microinstruction enables the testing of any bit position (binary ONE and binary ZERO states) of a register specified by the A operand field of the microinstruction. As seen from FIG. 4*d*, this microinstruction has an op code of 111. Bit 3 indicates whether the binary ONE or binary ZERO of outputs of the registers specified by the A operand field are to be tested. Bits 4, 5 and 19 are unused fields and therefore set to binary ZEROS. Bits 6 through 18 constitute a branch address field while bits 20 through 22 constitute a latch field. As seen from the Figure, these bits when coded as indicated by Table 1 define the bit position of the ALU selected register to be tested. Bits 23 through 26 constitute the A operand (AOP) field which defines as indicated by Table 2 any one of 16 registers whose contents can be stored in the ALU latches.

Figure 4E:
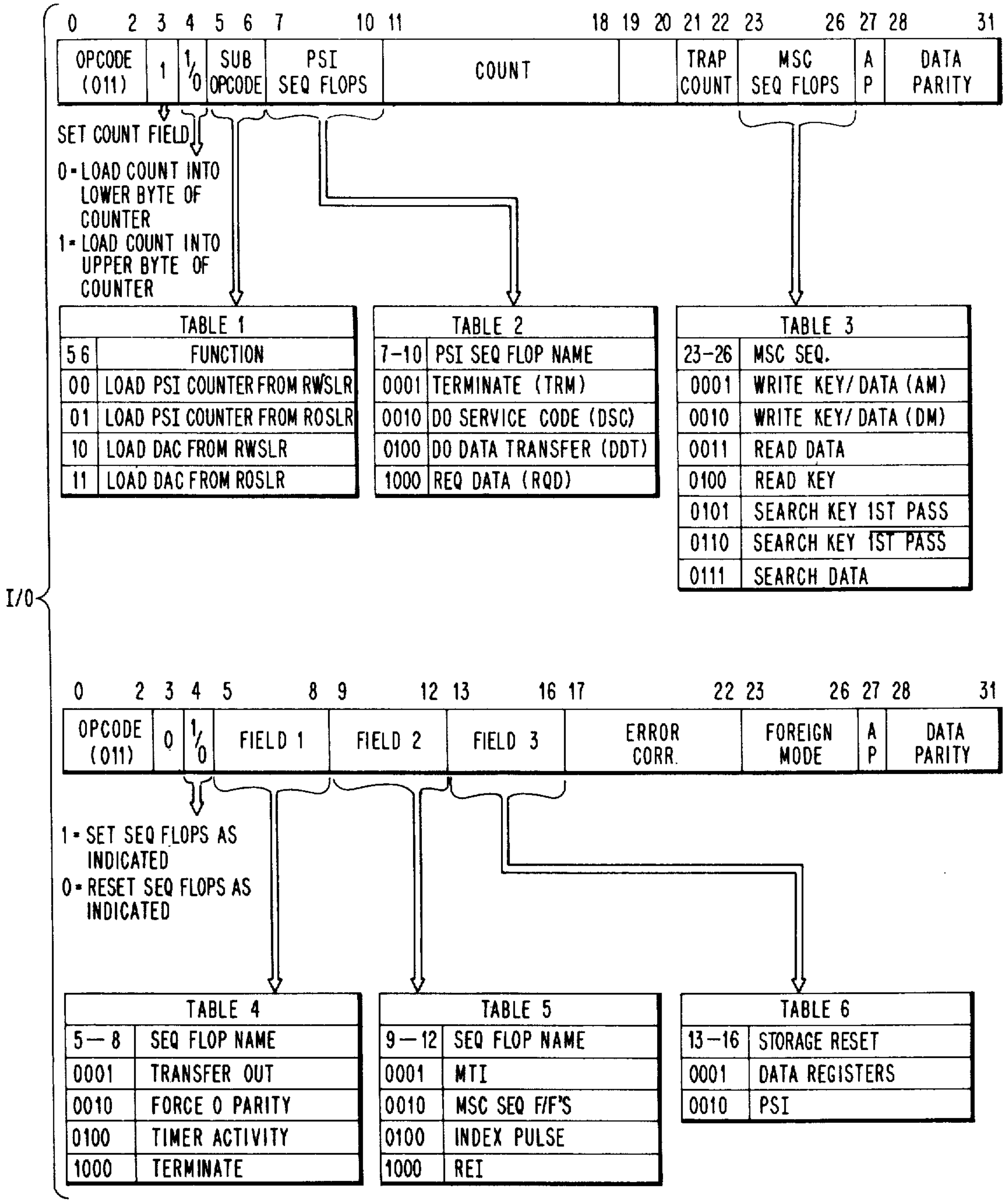
Figure 5B:
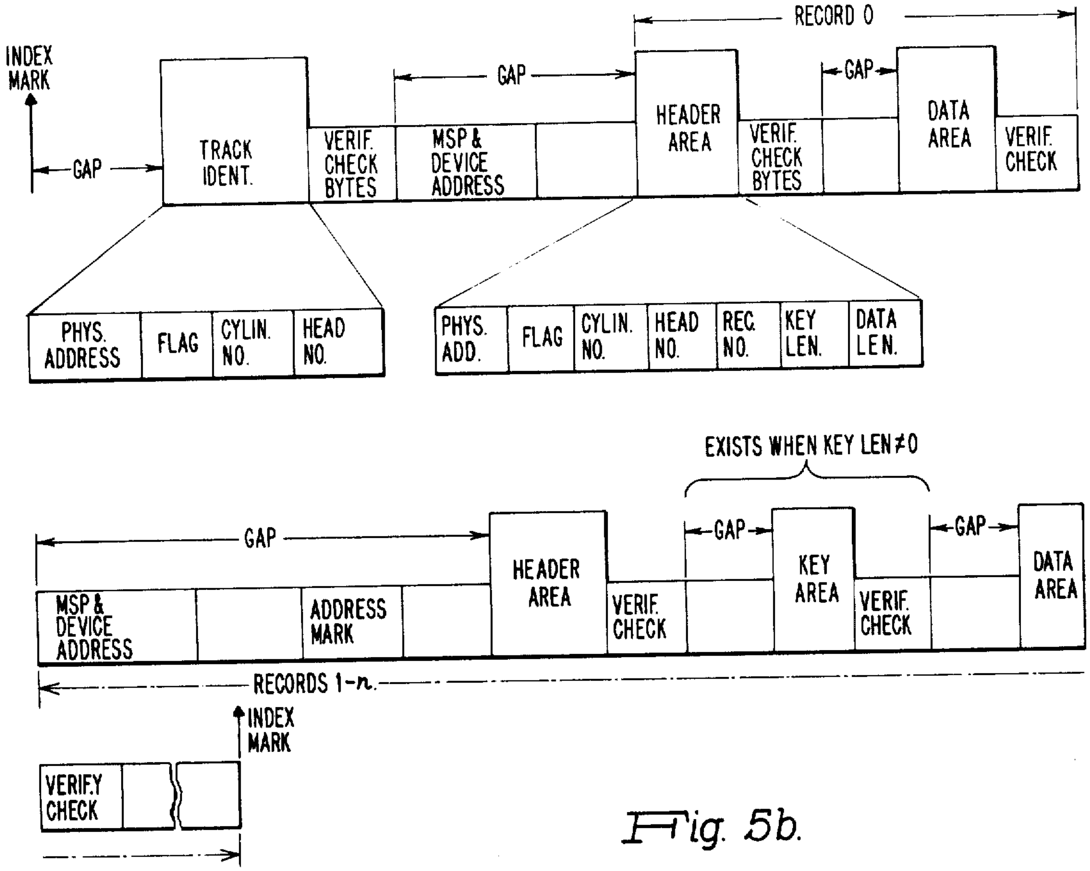
FIGS. 5*a* and 5*b* show the format of the records stored on the mass storage device.
Figure 5A:
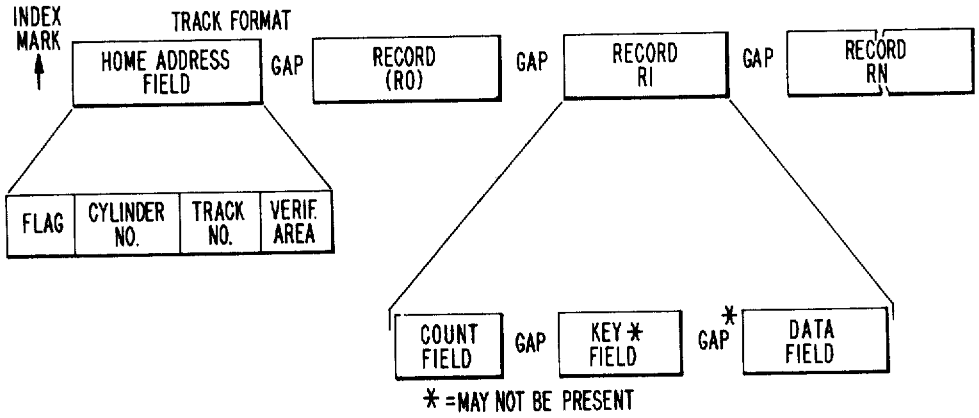

FIG. 4*e* shows the formats of an input/output, (i.e. I/O) microinstruction. This microinstruction is used to condition the mass storage processor, PSI, and device adapter circuits to handle those operations requiring information transfers to/from the device adapter and IOC interfaces. As seen from FIG. 4*e*, this microinstruction word has an op cod 011. Bit 3 corresponds to a set counter bit which when set to a binary ONE causes either an input/output counter or data counter to be loaded with either the contents of this count field which comprises bits 11 through 18 or from the RWSLR. This operation occurs for input/output operations such as a service code sequence, a write date sequence, a read data sequence, a search key or data sequence etc. When this bit is set to a binary ZERO, none of the aforementioned counters are loaded with information but only the sequence flip-flops are set as indicated by Tables 1 through 6 of FIG. 4*e*. Bit 4 is used when a count field is used (i.e. Bit 3 is a binary ONE). This bit is used to indicate to the processor which byte of the two byte PSI or data counters is to be loaded with the count specified by the count field. In the instance where two bytes are loaded into the counters, this requires two I/O microinstruction words. Every time the low order byte positions of a counter are loaded, the upper order byte positions of the same counter are all reset to binary ZEROS. When bit 4 is a binary ZERO, it indicates that the low order byte positions of the counter are loaded with the count field of the I/O microinstruction. Conversely, when bit 4 is a binary ONE, the upper byte positions of the counter are loaded with the microinstruction count field. When bit 3 of this microinstruction is set to a binary ZERO, this signals the processor which flip-flops in Fields 1 through 3 and those in the error correction and foreign mode fields are to be set or reset. When bit 4 is set to a binary ONE, those flip-flops designated by these fields are set to binary ONES. When bit 4 is a binary ZERO, those flip-flops designated by the fields are reset to their binary ZERO states. Bit 4 has no significance when the fields are coded to contain all zeros. Tables 4 through 6 set forth representative codes for certain ones of the flip-flops contained within the mass storage processor.

Bits 5 and 6 specify a sub op code field when the count field is used (i.e. bit 3 is a binary ONE). The op code field defines wnich one of the counters (i.e. PSI byte counter or data counter) is to be loaded with the source of the count to be loaded (i.e. from the read/-write storage local registers or read only store local register). Table 1 defines the various codings for these bits and corresponding functions. Bits 7 through 10 define a PSI sequence flop field when bit 3 is set to a binary ONE. These flip-flops, as mentioned above, set up the data paths for the PSI apparatus to handle data transfers between the IOC and mass storage processor. Table 2 illustrates the codes for designating different ones of these four flip-flops. While the coding of bits 7 through 10 illustrate the setting of a single flop, they can be modified to set more than a single sequence flop with a single microinstruction. Bits 11 through 18 designate a count field which is used by the processor to load either the PSI counter or data counter. When loading the two byte wide counters, either the PSI or sequence flops are set only when a count is being loaded into the upper byte stages of the counter. As indicated by FIG. 4*e*, bits 19 and 20 are unused bits when bit 3 is a binary ONE. Bits 21 and 22 serve as a trap count field when bit 3 is a binary ONE. This count field indicates the number of bytes to be trapped by the processor during a read, a write or a search operation. Depending upon the particular record format being processed, this field will be set to specify the correct number of bytes to be trapped. Bits 23 through 26 define a sequence flop field when the 3 is a binary ONE. The sequence flip-flops are set to predetermined states which in turn establish the path for accomplishing bidirectional transfers of information through the various registers of the MSP. The codings for these fields are as indicated in Table 3 of FIG. 4*e* and some of these flip-flops were previously discussed above.

When bit 3 is set to a binary ZERO, bits 5 through 26 are utilized as indicated by Tables 4 through 6.

FIG. 4*f* illustrates two formats for microinstructions used for specifying different arithmetic operations. The arithmetic operation microinstructions include an op code 010. Bit 3 is used to indicate different formats of the microinstruction. Bits 4 through 7 constitute a sub op code field which defines up to 16 different arithmetic operations some of which are logical operations.

Table 1 indicates certain ones of the arithmetic operations coded by bits 4 through 7. These operations are well known and therefore will not be described in greater detail herein. For further information, reference may be made to the aforementioned text published by Texas Instuments Inc. Bits 8 and 9 serve as a carry in field and are coded in accordance with Table 2 to specify three different carry in conditions for performing various arithmetic operations. Bits 15 through 18 are not used when bit 3 is a binary ZERO and therefore these bits are binary ZEROS. Bits 10 through 14 are coded as indicated by Table 3 to specify the destination of the result produced by an arithmetic operation. Bits 19 through 22 constitute a B operand (BOP) constant field which indicate the source of the B operand in accordance with Table 4. Similarly, bits 23 through 26 indicate the source of the A operand in accordance with Table 5. It will be noted from FIG. *4f* that when bit 3 is a binary ONE, bits 15 through 22 are used as the B operand.

FIG. *4g* illustrates two formats for microinstructions used for specifying different types of logical operations. The logical operation microinstructions include an op code 001. The state of a format bit 3 when a binary ZERO indicates that one of the registers designated in the table is to be the source of the B operand. When bit 3 is a binary ONE, the eight bit constant field of the microinstruction is the B operand. Bits 4–7 of a sub op code field designate the logical operation to be performed by the ALU upon the A and B operands. Table 1 indicates some of the type operations. However, the aforementioned text published by Texas Instruments may be consulted for more information.

Bits 15 through 18 are not used when bit 3 is a ZERO. Bits 10–14 constitute a destination of ALU result field and is coded to specify one of the registers in the table indicated for receiving the result generated by the ALU. All codes, except 11110 and 11111, cause the result to be delivered to the designated register as well as storing it in the ALU latches. With codes 11110 and 11111, the result is not transferred to a register but is only stored in the ALU latches.

As mentioned above, bits 19–22 define the source of the B operand to the ALU when bit 3 is a ZERO. Bits 15–22 define the B operand when bit 3 is a binary ONE. Also, bits 8 and 9 are not used in this type microinstruction. Similarly, bits 23–26 define the source of the A operand to the ALU.

DETAILED DESCRIPTION OF THE ROS CIRCUITS OF FIG. 3*e*

With reference to FIG. 3*f*, certain ones of the circuits of FIG. 3*e* will now be described in greater detail. Referring to this Figure, it is seen that the branch trap block 304-20 includes the circuits 304-200 through 304-215 which are arranged as shown. As mentioned, these circuits generate the required signals during the execution of the two fast instructions which are directly applied to the circuits by sense amplifier latches 304-25. The signals produced by the branch trap circuits are generated in accordance with the following Boolean statements.

1. CFDTS10 (ROS DATA TO ROSAR) = CFUCB10 · CBNOK00 · CFR1S00 · CFR2S00 + CFFCB10 · CBBOK10.
2. CFFCB10 (Fast Conditional Branch) = CFBNH10 · CRD0310.
3. CFIR110 (incrementer to return Reg 1) = CFUCB10 · CBNOK00.
4. CFIR210 (incrementer to return Reg 2) = CBNOK00 · CFUCB10 · CRD2210.
5. CFR1S10 (return Reg 1 to ROSAR) = CFUCB10 · CRD1910 · CBNOK00.
6. CRF2S10 (return Reg 2 to ROSAR) = CFUCB10 · CRD2010 · CBNOK00.
7. CBBOK10 (branch OK for FCB) = $\overline{\text{CBBOKOC}}$ · $\overline{\text{CBTRB00 + CBTRB10 · CBRBT00 + CBNOK10}}$.
8. CBBOKOC (FCB Test conditions) = CBBOKOA · CRD1900 · CBBOKOB.
9. CFUCB10 (Unconditional Branch) = CFBNH10 · CRD0300.

The signals CBBOKOA, CBBOKOB and CBRST00 are derived from corresponding ones of the multiplexer selector circuits 304-280 through 304-285 included within the fast branch MUX block 304-28. These circuits receive a number of input signals from various parts of the processor and these signals representative of certain test conditions are sampled and the results of the sampling are applied to the branch trap circuits 304-20 as shown. One of the inputs applied to multiplexer circuit 304-284 is signal CBEOC10 which is generated by a flip-flop 304-300 included within the fast branch logic circuits of block 304-30. As shown, this block includes this flip-flop together with associated gating circuits 304-301 through 304-302 arranged as shown.

Other test signals include an index pulse not received signal A1IDTOO generated by the adapter section 310 in response to index pulse signal from line IDX, a gap counter not equal zero signal CCGCZ00 from section 318, a data counter not equal zero signal CCDZ00 from section 318, a data termination flop not set signal PKDDT00 from section 302, and first pass/format flop set signal CQFPF10 from the high speed sequence controls section 308. It will also be noted that circuit 304-208 receives an A equal B signal CAAEB10 and an A greater than B signal CAAGB10 from the ALU section 316.

It is also seen from FIG. 3f that the branch test circuits of block 304-34 include the circuits 304-340 through 304-344 which are arranged as shown. These circuits are operative to generate branch signals in response to a normal condition branch microinstruction stored in read only store local register 304-32. Additionally, these circuits generate signals for enabling sequence decoder circuit 304-38 which is operative to decode bits 23 through 26 of the normal condition branch microinstruction which are applied via path 304-39. The multiplexer selector circuits included within branch MUX block 304-36 provide a branch signal CBNOK10 in response to sampling one of the latches of the ALU section as specified by latch field bits 20 through 22. Additionally signal CBNOK10 is applied to the circuits included within increment logic circuit block 304-8. As shown, this block includes circuits 304-80 through 304-83. These circuits force a signal CRINC10 to a binary ONE in accordance with the following Boolean statement:

CRINC10 (increment ROSAR) = (CBNOK00 · CFUCB00 · CRRES00) · (CFFCB00 + CBBOK00).

Read/Write Storage Section 306

Figure 3G:
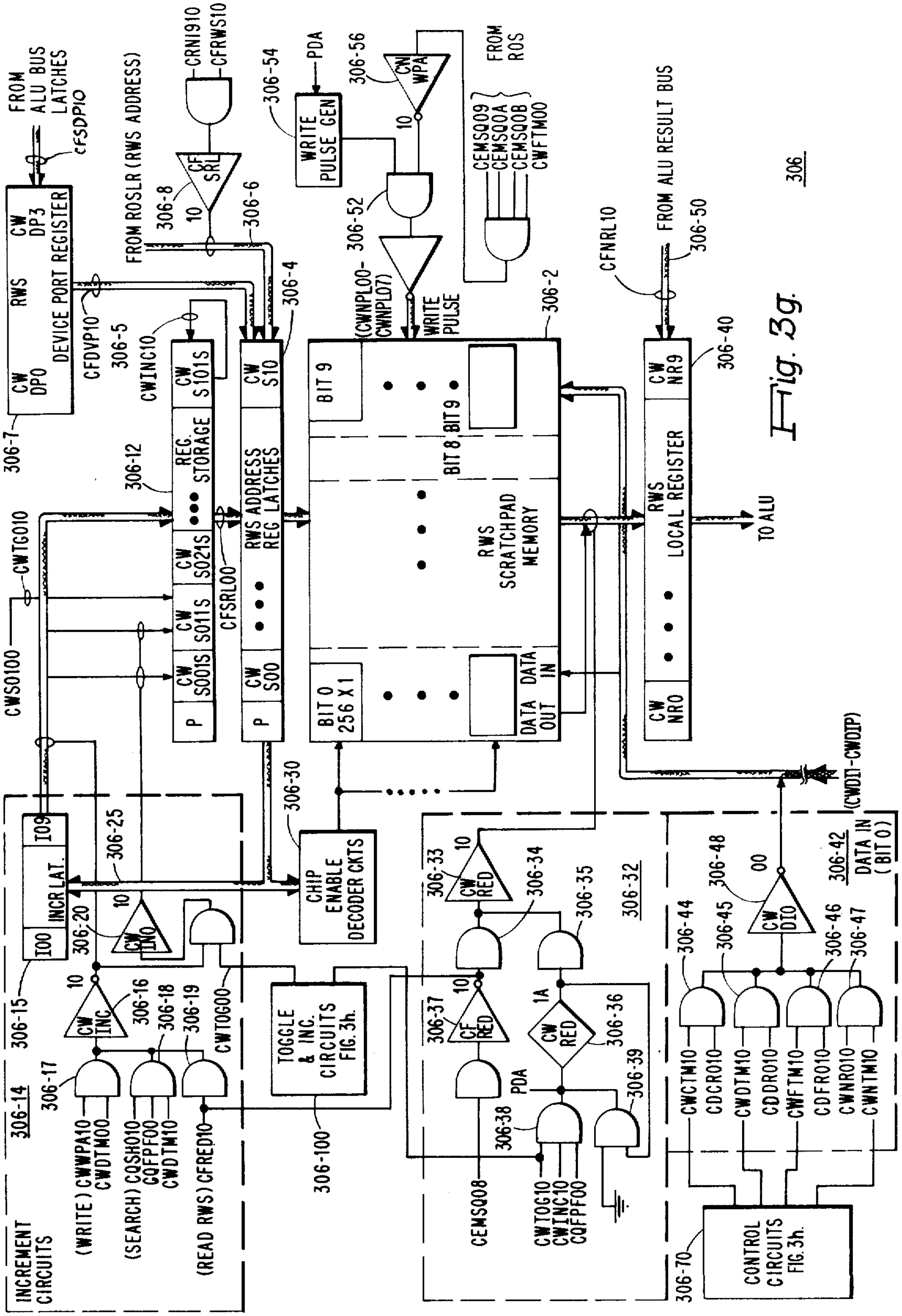
FIG. 3*g* shows in greater detail various portions of the Read Write Buffer Storage Section 306 of FIG. 2.
Figure 3H:
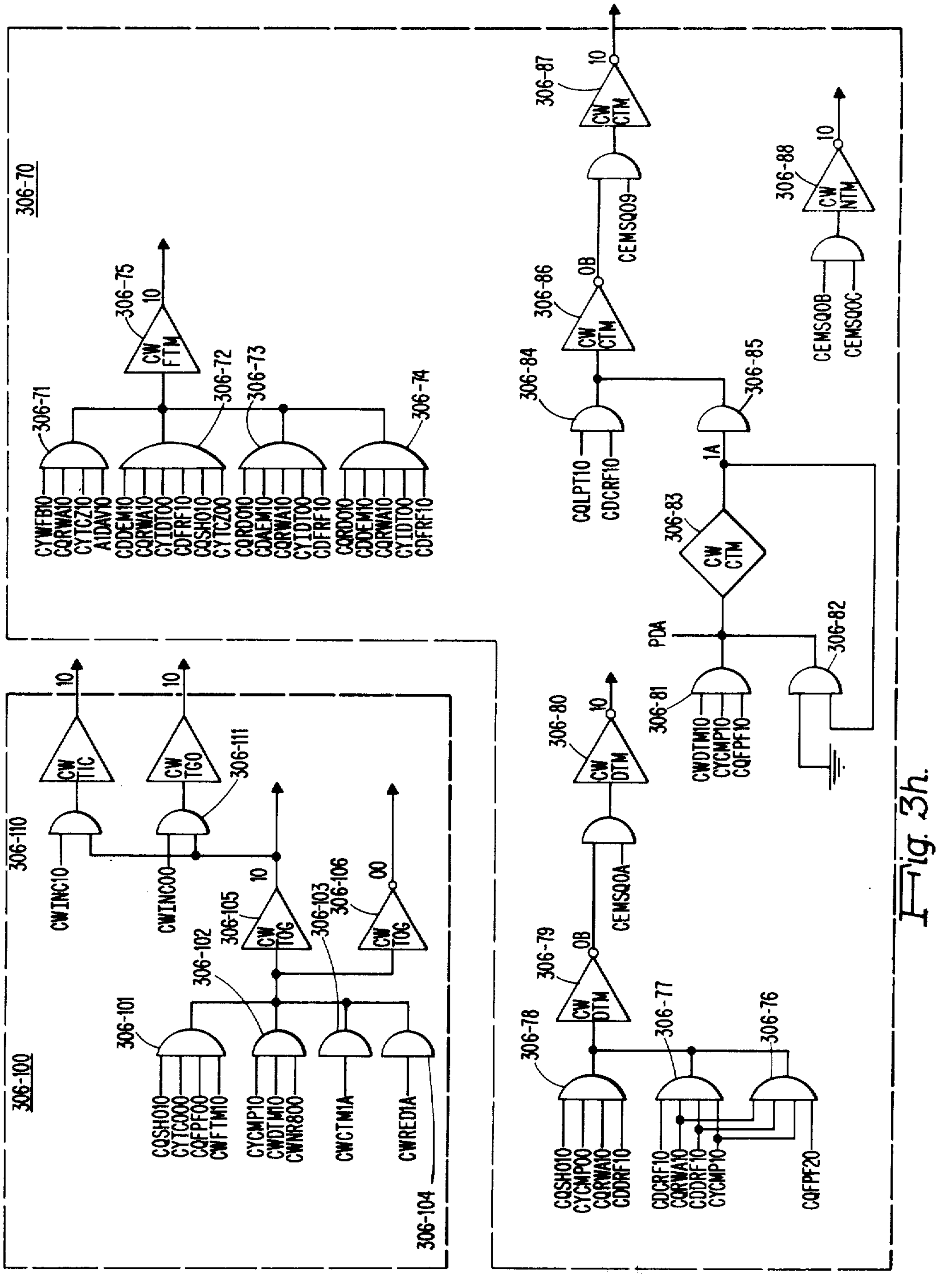
FIG. 3*h* shows in greater detail the control logic circuits 306–70 and toggle 1 increment circuits 306–100 of section 306 FIG. 3*g*.

FIGS. 3*g* and 3*h* show in greater detail the read/write storage section 306. As seen from the Figure, it includes a scratch pad memory 306-2 constructed from a number of 256×1 bit arrays, conventional in design, arranged as indicated. The memory 306-2 is addressed via an address register 306-4 which includes a number of amplifier latches. The register 306-4 can be loaded from the ROSLR via a bus 306-6 in response to a control signal CFSRL10 generated by an AND gate and amplifier circuit 306-8. Similarly, predetermined bit positions of the register 306-4 can be loaded with a LCN bits from a RWS device port register 306-7 a path 306-5 in response to a control signal CFDVP10. As seen from FIG. 3g, register 306-7 is loaded from the ALU bus latches of Section 316. When signal CFSRL10 is a binary ZERO, register 306-4 can be loaded via a path 306-10 with an address supplied by register storage 306-12. This register receives an address from circuits of a block 306-14 after the address from register 306-4 applied via a path 306-20 has been incremented by ONE and applied thereto when an increment signal CWINC10 and an increment only signal CWIN010 are both forced to binary ONES. The circuits 306-16 through 306-19 force signal CWINC10 to a binary ONE during all write operations, during search operations and read operations, in accordance with the expression:

CWINC10 = CWWPA10 · CWDTM00 + CQSH010 · CQFPF00 · CWPTM10 + CRFED10.

The circuit 306-20 forces signal CWIN010 to a binary ONE during search operations when signal CWTOG10 is a binary ZERO and CWINC10 is a binary ONE.

The high order three address signals from address register 306-4 are applied to chip enable decoder circuits 306-30 which generates enabling signals for each row of arrays. When the circuits of block 306-32 force read signal CWRED10 to a binary ONE, the byte contents of an addressed location are loaded into an output local register 306-40. The circuits 306-33 through 306-39 of block 306-32 force signal CWRED10 to a binary ONE when the sequence decoder of section 304 generates signal CEMSQ08 and when flip-flop 306-36 forces signal CWRED1A to a binary ONE.

The block 306-42 shows a representative stage of the DATA IN circuits used in entering a bit of information into an addressed location. The circuits include AND gates 306-43 through 306-47 and amplifier circuits 306-48 arranged as shown. Gates 306-44 through 306-46 are used to store information from the C, D and F registers of the Buffer Section. Gate 306-47 is used to store information from local register 306-40. The various transfer signals are generated by the circuits of block 306-70 which will be described in connection with FIG. 3*h*. Also shown, the local register 306-40 can be loaded from the ALU section via a path 306-50 when the read only store forces a signal CFNRL10 to a binary ONE.

During a write portion of a memory cycle, a gate and inverter circuit 306-52 is enabled to apply a write pulses generated by write pulse generator 306-54 which drives a set of eight driver inverter circuits (e.g. CWWPL00 - CWWPL07) causing the information to be written into an addressed location. The circuit 306-52 is enabled when another gate and inverter circuit 306-56 forces a write pulse allow signal to a binary ONE.

FIG. 3*h* shows the circuits 306-71 through 306-88 of block 306-70 for generating the various transfer control signals CWDTM10, CWCTM10, CWFTM10 and CWNTM10. The AND gates 306-76 through 306-78 decode the states of certain ones of the sequence flip-flops and condition the inverter circuit 306-79 to force signal CWDTMOB to a binary ZERO for transferring bytes from the D register to the read-write store during other than a first pass search operation. This in turn causes the AND gate and inverter circuit 306-80 to force signal CWDTM10 to a binary ONE. Similarly, the read only store by forcing signal CEMSQUA to a binary ZERO causes a transfer of bytes from the D register in response to the decoding of a OA contained in the sub op code field of a RWS microinstruction.

The circuits 306-81 through 306-86 decode the states of certain ones of the sequence flip-flops to force signal CWCTMOB to a binary ZERO when transferring bytes from the C register to the read-write store during a first pass search operation. Similarly, the read only store forces signal CEMSQ09 to a binary ZERO upon decoding of a 09 in the sub op code field of a RWS microinstruction. This allows the transfer of bytes from the C register to the read write store.

The AND gate and inverter circuit 306-88 enables the writing of the contents of the read-write store local register back into the read write store upon the decoding of either a OB or OC in the sub op code field of a RWS microinstruction. The AND gates 306-71 through 306-74 respectively force transfer signal CWFTM10 to a binary ONE during write count or key operations, bytes trapped by the trap counter during search operations, during read count or key operations when a byte is transferred from the register F.

In addition, FIG. 3h discloses the logic circuits of block 306-100 used to generate toggle signal CWTOG10, a toggle only signal CWTGO10 and a toggle and increment signal CWTIC10. These circuits by generating signal CWTOG10 provide the facility to increment the contents of the RWS address register through 512 memory storage locations within one clock (PDA) time. This arrangement facilitates the storage of information from two sources during search operations. That is, it enables the immediate storage of count and key field bytes from a selected device into a first group of storage locations (0–511) and the storage or search argument bytes from the IOC into a second group of locations (512–1023). The second most significant bit position (CWS01) is "toggled" between two states to logically increment/decrement the memory address by 512 locations since it has a positional value of 512.

The toggle logic circuits of block 306-100 include AND gates 306-101 through 306-104, amplifier circuit 306-105 and inverter circuit 306-106. The toggle signal CWTOG10 is generated in response to decoding the states of certain sequence flip-flops. In particular, AND gates 306-101 through 306-104 respectively force signal CWTOG10 to the proper state for storing a flag byte contained in the F register during a search operation not first pass, for storing a byte contained in the D register during any search operation in the compare cycle when the punctuation bit has not been sensed on a previous read cycle, for storing a byte contained in the C register first pass in the compare cycle and for read out of a search argument byte from the read/write store during a search not first pass operation.

The AND gate and amplifier circuits 306-110 and 306-111 of block 306-100 combine the toggle signal CWTOG10 with increment signals CWINC10 and CWINC00 as shown, to produce toggle only signal CWTG010 and toggle and increment signal CWTIC10. With the increment signal CWINC10 set to a binary ONE, the toggle only signal CWTG010 is held at a binary ZERO preventing the access of the next group of 512 storage locations. The AND gate 306-20 of FIG. 3g forces increment only signal CWIN010 to a binary ZERO when signal CWTOG10 is a binary ONE enabling the address from the increment latches to be loaded into the address register flip-flops. When CWSO110 of the address register is to be toggled to a binary ZERO and the address incremented by one, AND gate 306-110 switches signal CWT1C10 to a binary ONE.

GENERAL REGISTER SECTION 314 AND ARITHMETIC LOGIC UNIT SECTION 316

FIG. 3*i* shows in greater detail sections 314 and 316. As seen from the Figure, the ALU includes a main ALU 316-2 and an auxiliary ALU 316-4 together with their associated mode select, carry-in and carry enable circuits (e.g. circuits of block 316-6) in addition to parity error check circuits 316-8. Since the auxiliary ALU 316-4 only serves to duplicate the operation of the main ALU 316-2 for checking purposes, its associated circuits need not be shown and its operation need not be described.

The main ALU 316-2 is capable of performing 16 logical operations or 32 arithmetic operations in response to applying predetermined combinations of input signals to its carry-in (CIN), carry-enable (CEN) and mode control (M0-M3) input terminals. The ALU is enabled for receiving A and B operand signals by circuits 316-62 through 316-65 which force enable signal CACEN00 to a binary ZERO. When not performing either logic or arithmetic operations, the ALU 316-2 operates in a subtract mode (i.e. normally used during search and error detection operations). That is, the natural state of the ALU in the absence of applying signals to the mode control circuits if $f = A - B - 1$ where $f$ = the result. More specifically, the mode signals applied to the ALU are coded 0110 which condition the ALU to produce the desired result (see FIG. 4*f*). The ALU subtracts the A and B operands by performing a ones complement addition and produces a result corresponding to A−B−1 at stages CAF00 through CAF07. The absence of a carry in signal causes a forced carry-in to be applied to carry-in input terminal Cin. The result is in turn applied to the 316-10 result bus latches 316-10 and result latches 316-12 when sampled in response to a strobe signal CASTR10 generated by the circuits of a strobe/RST control block 316-20. The A=B output terminal of both ALUs are compared by an AND circuit of block 316-8 to verify the comparison.

During a logical operation, the sub op code field of the microinstruction (i.e. CRN0410-CRN0710) is applied to the decoder 316-60 from the ROS local register of section 304. The input signals CRN0410 through CRN0710 together with strobe signals CASTR10 and CASTR00 from control 316-20 condition the decoder 316-60 to generate the appropriate mode control input signals which are in turn applied to inputs M0 through M3. As mentioned above, these signals in turn condition the main ALU to perform the logical operation designated. The A operand (AOP) is applied from the general purpose register location or "hot" register having the address specified in the A op field of the microinstruction word (i.e. bits N23 through N26). The B operand (BOP) is applied from: (1) a general purpose or hot register specified by the B op field of the microinstruction word (i.e. bits N19 through N22) or (2) from an eight bit constant specified by the microprogrammer (i.e. bits 15–22 of the microinstruction word stored in the ROS local register) when the microinstruction op code format indicating bit is a binary ONE. As seen from FIG. 3*h*, these signals are applied via the B operand multiplexer selector circuit included within block 314-2. At this time, bits N0 through N2 of the op code field together with bits 19 through 22 condition a decoder within the block 314-2 to apply the appropriate selection signals to the B operand MUX circuit 314-22.

After performing these specified logical operations, the main ALU 316-2 delivers the result to the result bus circuit 316-10 and to the circuits of a result test and storage block 316-30. As seen from FIG. 3*i*, the circuits 316-30 include a plurality 316-300, flip-flops 416-300, 316-310 and 316-330 together with gating circuits 316-301 through 316-304, circuits 316-311 through 316-325 and circuits 316-331 through 316-333 arranged as shown. The equal store flip-flop 316-300 is set to its binary ONE state when the ALU forces equal signal CAEQA10 to a binary ONE at the same time strobe signal CASTR10 goes to a binary ONE. The flip-flop 316-300 is reset to a binary ZERO when signal CAEQA10 is forced to a binary ZERO during a compare time interval (i.e. when signal CACMT10 is a binary ONE). The A greater than B stored flip-flop 316-310 is switched to its binary ONE state when the equal signal CAEQA10 is a binary ZERO and a carry-out signal CAAC010 is a binary ONE. The flip-flop 316-310 is reset to a binary ZERO when strobe signala CASTR10 is forced to a binary ONE. It will be noted that the output signals from flip-flops 316-300 and 316-310 are recirculated back to circuits 316-305 and 316-314 respectively. Thus, when either flip-flop is reset to a binary ZERO, it causes the appropriate one of the signals CAAEB10 and CAAGB10 also to be forced to a binary ZERO. As mentioned above, it is the signals CAAEB10 and CAAGB10 which are applied to the branching circuits. These signals indicate whether the comparison was successful during a search operation. The carry out store flip-flop 316-330 is set to its binary ONE state when there is carry out generated by the main ALU 316-2.

The result contained in the result bus circuits 316-10 are transmitted to the read only storage control section 304 and to the general register section 314. As mentioned, the result either remains in the result bus circuits for subsequent branch testing or is delivered to one of the 31 registers specified by bits N10 through N14 of a logic or arithmetic type microinstruction (i.e. the DOR microinstruction field — see FIGS. **4*f* and 4*g*). The strobe allows signals produced by control block 316-20 allow resetting of the result circuits 316-12 and error checking circuits 316-8** via a reset signal CARST00. As seen from FIG. 3*i*, these circuits include a plurality of gating circuits 316-21 through 316-28 arranged as shown. The AND gate and inverter circuit 316-21 is operative to generate strobe allow signal CASTA10 which allows storing of the ALU result for all arithmetic, logic and normal conditional branch type microinstructions with the exception of a logic type microinstruction which has bits 4 through 7 set to all binary ONES. This allows delivering the result of a previous microinstruction without destroying stored information. In the case of a logical operation signal CFLOG10 equals a binary ONE, in the case of an arithmetic operation signal CFAR010 equals a binary ONE and in the case of a normal conditional branch operation, signal CFNCB10 is a binary ONE. These signals in turn condition amplifier circuit 316-25 and inverter circuit 316-26 to generate the appropriate strobe signals. The AND gate and amplifier circuit 316-28 is operative to force reset signal CARPF00 to the correct state in response to reset signal CARES00 and strobe signal CASTR00 as shown.

Similar to a logical operation, bits CRN04 through CRN07 together with the strobe signals condition the decoder 316-60 to generate the appropriate mode control input signals during an arithmetic operation. Additionally, a carry in signal CACIN00 is generated from the carry in bits CRN08 and CRN09 of the microinstruction word by circuits not shown and the results applied to the carry in (CIN) terminal. Depending upon the coding of the microinstruction word bits mentioned, the signals applied to the CIN and M0 through M3 terminals specify the particular arithmetic operation to be performed. The A and B operands are derived from the sources mentioned above in connection with the description of a logical operation. Similarly, the result loaded into the result latch circuits 316-12 and applied to the result bus can be delivered or stored for testing as determined by the bits of the DOR field of the microinstruction word.

As mentioned, during a search operation, the ALU performs all arithmetic operations required for processing count, key and data field portions of a record during the respective count, key or data field search operations. The ALU is conditioned to perform the desired logical operation (A—B—1) during which the B operand obtained from the B operand multiplexer selector circuit 314-22 from either the C register or the read/write storage section is compared with the A operand obtained from the A operand multiplexer circuit 314-22 via the D register. Initially, a logic type microinstruction coded to specify a F=1 operation (see FIG. 4*f*) causes the ALU to force equal signal CAEQA10 to a binary ONE. At the same time the strobe signal CASTR10 is forced to a binary ONE which switches equal compare flip-flop 316-300 to a binary ONE. During the search, no further arithmetic or logic microinstructions are executed and therefore, strobe signal CASTR10 remains a binary ZERO. At the completion of the search operation, a FCB microinstruction is used to test the state of signals CAAEB10 and CAAGB10 to determine whether there was a successful comparison. The microinstruction also forces the strobe signal CASTR10 to a binary ONE which resets the ALU circuits.

Considering now the general purpose register and multiplexer circuits of block 314, it is seen from FIG. 3*i* that the general purpose registers are included within two solid state memories 314-3 and 314-4. These memories, conventional in design, are addressable through their respective address registers 314-6 and 314-8. These registers receive signals directly from the read only store local register (i.e. CRN20 through CRN22 and CRN12 through CRN14) which provide the address for the general purpose register. The contents of the address register are then delivered to a selector register whereafter they are applied to the ALU.

The address selection circuits included within block 314-20 decode bits N19 through N22 providing output selection signals BMO through BM2 as inputs to the B operand multiplexer circuits 314-22. The multiplexer output signals from the selected source register are applied to the selector register 314-28 when the control circuits of block 314-34 force signal CABBA00 to a binary ONE. This is done in response to the specific codings of bits N0 through N3 and N19 which determine whether the information from a general purpose register or one of the other registers of the system is to serve as the B operand source. Flip-flops included within a MUX address store block 314-21 retain an indication of bits N20 through N22 for continuous selection of that source during a search operation. In greater detail, it is bit 19 applied to the control circuits 314-34 which determines which one of the allow functions CABBA10 or CABBA00 is to be forced to a binary ONE to select either the addressed general purpose registr or register coupled to multiplexer circuits of block 314-22. In a similar fashion, the multiplexer address selection circuits of block 314-26 apply the control signals AM0 through AM2 to a A operand multiplexer circuits of block 314-24 so as to select one of the registers as the source of the A operand. Also, flip-flops included within the MUX address store 314-27 retain an indication of bits N24 through N26 for further reference during a search operation. The control circuits included within block 314-32 in response to bits N0 through N2 and N23 are operative to generate allow signals CAABA10 and CAABA00 to select the output of an addressed general purpose register or one of the registers coupled to the multiplexer circuits 314-24. When signal CAABA10 is forced to a binary ONE, the contents of an address general purpose register are applied to selector 314-30. Conversely, when allow signal CAABA00 is forced to a binary ONE, the contents of a designated one of the registers is selected and applied to selector 314-30. As mentioned previously, when writing information into a general purpose register of each of the memories 314-2 and 314-4, the addresses are defined by bits N12 through N14 (i.e. by the DOR field of the logic or arithmetic type microinstruction and writing takes place in response to a pulse signal CLK generated by write generator 308-4.

DATA AND GAP COUNTER SECTION 318

Figure 3J:
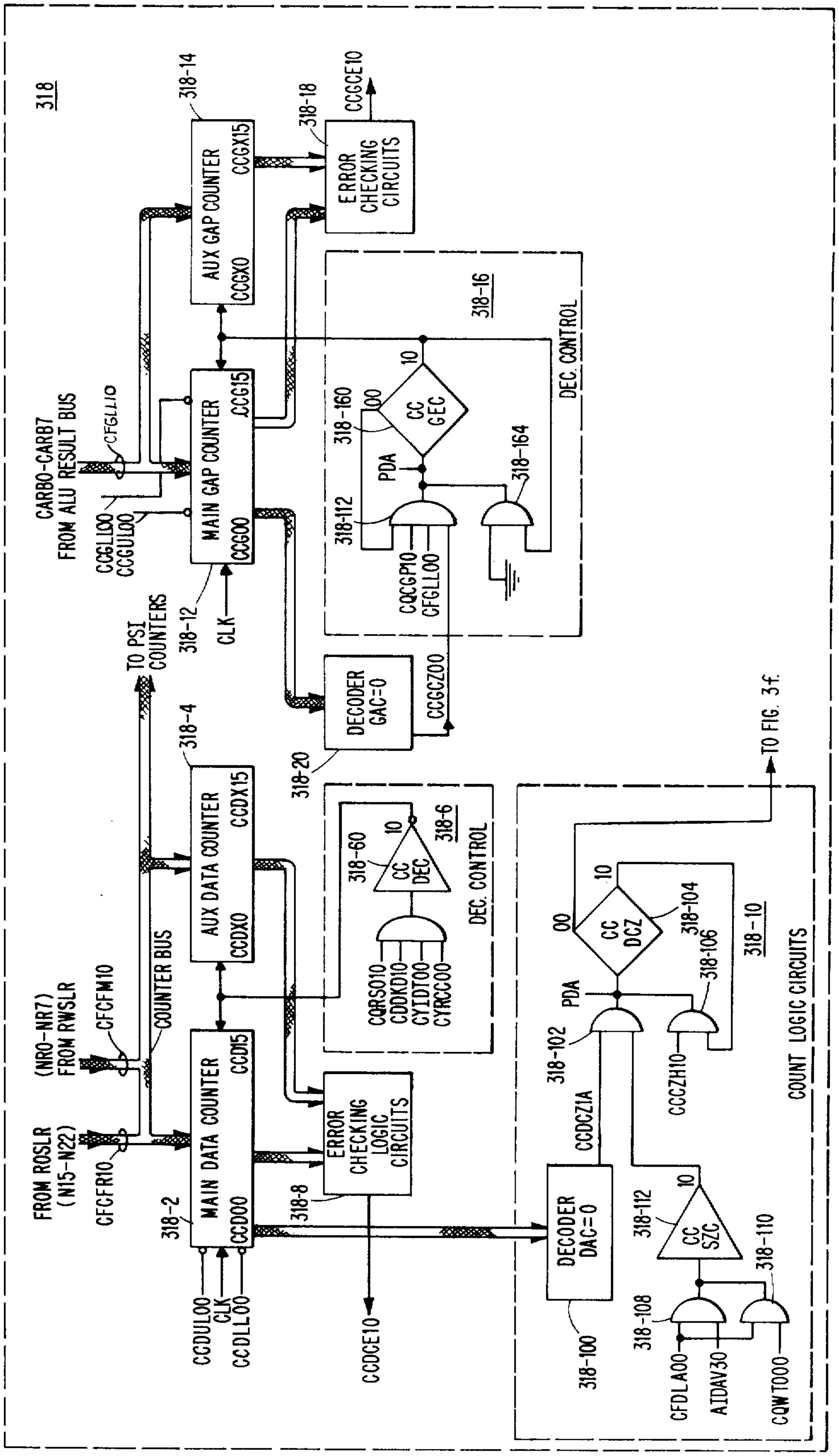
FIG. 3*j* shows in greater detail the data and counter section 318 of FIG. 2.

FIG. 3*j* shows in greater detail the logic circuits which comprise section 318. Referring to that Figure, it is seen that the logic circuits for the data counter (DAC) includes a main counter 318-2 and an auxiliary counter 318-4 together with their decrementing control circuits 318-6 and error checking logic circuits 318-8. Additionally, the section includes count logic circuits arranged to signal when the data counter has been decremented to zero. As shown, these circuits included within block 318-10 include a decoder 318-100, conventional in design, which is operative to force signals CDDCZ1A to a binary ONE when it detects that the data counter has been decremented to zero. This in turn conditions an AND gate 318-102 of flip-flop 318-104 to be switched to its binary ONE state when either one of the AND gates 318-108 or 318-110 cause an amplifier circuit 318-112 to force signal CCSCZ10 to its binary ONE state. The flip-flop 318-104 is reset to its binary ZERO state via an AND gate 318-106 when a hold signal CCCZH10 is forced to a binary ZERO. As briefly described previously, the counters 318-2 and 318-4 are loaded in response to an I/O microinstruction word. Specifically, an eight bit count field is loaded into these counters from the read only storage local register (i.e. bits CRN15 through CRN22) or from the read/write store local register (i.e. from stages CWNR1 through CWNR7). Either of these sets of signals are applied to a counter bus and then loaded into the counters simultaneously in response to pulse signal CLK and signals CCDUL00 (DAC upper load) and CCDLL00 (DAC lower load) being forced low. The specific count fields selected is established by the set count field of the I/O microinstruction word. It is this count field which is operative to cause the generation of signals CFCFR10 and CRCFM10.

During operation, both counters are decremented by a decrement signal CCDEC10 each time a byte is transferred to/from the device adapter. Although decrementing can occur during a write operation, a read/search operation or load operation, the AND circuit which generates the decrement signal for a read/search operation has only been disclosed (i.e. AND gate and amplifier circuit 318-60). The error checking logic circuits 318-8 include a conventional comparator which compares the contents of both counters and in the event a non comparison is detected, these circuits force an error signal CCDCE10 to a binary ONE.

As seen from FIG. 3*j*, this section also includes a main gap counter 318-12, an auxiliary gap counter 318-14 together with decrementing control circuits 318-16 and error checking circuits 318-18. Also, as shown, section 318 includes gap decoder circuit 318-20 which generates an output signal indicating when the main gap counter has been decremented to zero. Both counters 318-12 and 318-14 are loaded simultaneously with an eight bit constant from the AlU result bus in response to the CLK pulse signal when signals CCGLL00 (GAC lower load) and CCGUL00 (GAC upper load) are forced to binary ZEROS. The loading takes place upon the decoding of an arithmetic type microinstruction which causes the generation of signal CFGLL10. This occurs in response to an arithmetic type microinstruction. During operation, both counters are decremented by signal CCGEC10 which is generated by a flip-flop 318-160 which is set via an AND gate 318-162 in response to signal COCGP10 being forced to a binary ONE. The flip-flop 318-60 resets via an AND gate 318-164 at the end of a clock (PDA) pulse time. The contents of both counters are compared by a conventional comparator circuit included within block 318-18 and when a non comparison is detected, the comparator circuit forces an error signal CCGCE10 to a binary ONE.

DEVICE LEVEL INTERFACE CONTROL SECTION 310

Figure 3K:
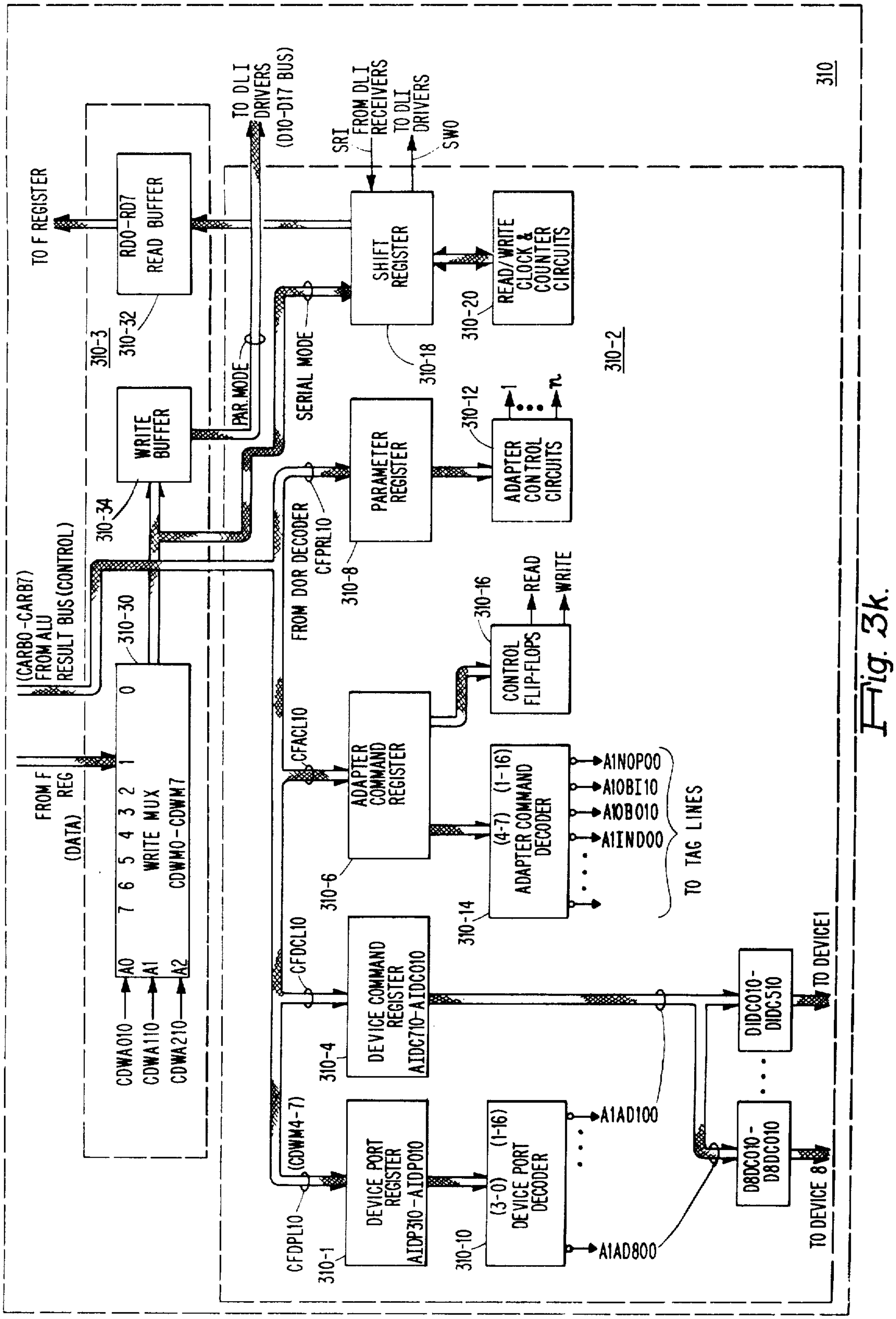
FIG. 3*k* shows in greater detail the adapter and device line controls section 310 of FIG. 2.

With reference to FIG. 3k, the section 310 will be described in greater detail. As discussed previously, this section comprises an integrated control adapter 310-2 and read/write multiplexer and buffer circuits included within block 310-3. As seen from FIG. 3*k*, the adapter 310-2 includes a plurality of registers which enable conditioning of the adapter and a selected device. These registers include a device port register 310-1, a device command register 310-4, and an adapter command register 310-6 and a parameter register 310-8. Each register is enabled in a specific sequence to store information. Specifically, the various registers are enabled for storing signals by control signals CFDPL10, CFDCL10, CFACL10 and CFPRI10. These signals are derived from the decoding of a specific field of a logic type microinstruction by the DOR decoder circuits of section 304. As shown, in response to the control signals, the registers are loaded from the ALU result but of block 310-3. The write multiplexer circuit serves as gating device for all write operations and receives input signals from the various sections of the processor (e.g. from the F register of buffer section 302-50.

The device port register 310-1 is normally the first register loaded in a given sequence and is used to associate a logical channel number with a specific device. That is, the low order four bits applied by the ALU result bus are loaded into the device port register and a device port decoder 310-10 decodes these bits into a number of select signals, only some of which are shown, used to select any one of 12 mass storage devices. The parameter register 310-8 is usually the second register loaded and it is loaded from the read/write storage section with previously stored device parameter byte information required for a particular operation via the ALU. This information byte is decoded by adapter control circuits 310-12 and generate control signals for conditioning the adapter to operate in a given mode. Since details are not relevant to the present invention, they are not given herein.

The device command register 310-4 receives information from the ALU and forwards the information directly to one of the devices specified to execute the command (i.e. selected by device port decoder 310-10. The adapter command register 310-6 is normally the last register loaded in sequence and conditions the circuits within the adapter 310-2 to execute the device command specified. The lower order four bits A1AC4 through A1AC7 are decoded by an adapter command decoder 310-14 which generate signals used to set various tag lines of the interface or specify certain types of operations within the adapter. Bits 0 through 3 are applied to control gating circuits and used to set various control flip-flops included within a block 310-16. These flip-flops establish whether the adapter is to perform a read or write operation in addition to defining other information relative to that type of operation. Since a discussion of such circuits is not relevant to the present invention, it is not included herein.

As also seen from FIG. 3*k*, the adapter includes a shift register 310-18 and associated read/write clock and counter circuits 310-20. When operated in a serial mode, information applied by an interface line SRI from the device is shifted into the shift register 310-18 under the control of a read clock, conventional in design. As shifting occurs, a bit counter included within block 310-20 is incremented by one every other bit interval since normally a synchronization bit brackets each data bit. When the counter has been incremented to a predetermined count, such as a count of six for six bit mode or a count of eight for eight bit mode, it causes the assembled character to be transferred in parallel to a read buffer 310-32. Additionally, this transfer causes the adapter 310-2 to generate a data available signal (A1DAV10 is forced to a binary ONE) which indicates to the processor sequence logic circuits of section 304 that a data byte has been stored in read buffer 310-32 and is ready for transfer into the F register of section 302. Upon sensing the data available signal, the sequence control circuits of section 304 are operative to acknowledge the signal by forcing a data acknowledge signal A1DAK10 to a binary ONE. Thus, it is seen that the generation of signals A1DAV10 and A1DAK10 enable the adapter and processor operations to be synchronized with one another.

In the case of a write operation, the adapter 310-2 upon detecting that data has been stored in the F register is operative to force device strobe signal DXDCS10 to a binary ONE. The command loaded into the device command register 310-4 is decoded and executed. In a similar fashion, the adapter utilizes the signals A1-DAK10 and A1DAV10 for sampling when a byte has been stored in the F register and ready for transfer into a write buffer 310-34 and then into the shift register 310-18 for shifting out a bit at a time onto interface line SWO. Although not shown, the shift register 310-18 includes gating circuits which are arranged to be conditioned by the clock circuits 310-20 to alternate the bit transfers with sync bits. By contrast when the adapter operates in a parallel mode, it transmits and receives information bytes from the write buffer 310-34 and read buffer 310-32 respectively via bus lines D10-D17. In this mode, lines SWO and SRI transmit strobe signals.

CONTROL BYTES

Before describing the operation of the present invention reference is first made to FIG. 7 which sets forth the significance of the various bits of several control bytes used by processor 300. The processor 300 has its operation controlled in accordance with information stored in 3 bytes which correspond to work byte 1, work byte 2 and a read/write director byte illustrated in FIG. 7. The bits of each byte can only be modified and/or tested by the processor when operated under microprogrammed control. Such testing takes place in the processor's ALU.

Considering the bytes of FIG. 7 in greater detail, it is seen that work byte 1, stored in general purpose register 6, includes eight bits which are coded to indicate the conditions designated in FIG. 7. This byte is used and updated by search, read, and write microprogram routines and is used for orientation purposes. The significance of each bit is as follows. Bit 0 is set to a binary ONE to indicate that the operation of the mass storage processor is "oriented" with respect to the information being read from the disk. In general, this bit is set to a binary ONE by header handling microprogram routines and is reset to a binary ZERO state by control type commands which cause a loss in orientation. When bit 0 is set to a binary ONE signaling orientation, bit 1 represents the state of the even/odd bit of a previous header flag byte. In general, when a header field of a record is read, the processor compares the odd/even bit of this byte. Thus, but 1 is set or reset after each header processing operation.

Bit 2 when set to a binary ONE signals the processor that the read/write head of the disk is moving through the home address to record 0 gap during the period when the gap counter does not equal zero. The processor sets this bit to a binary ONE in response to either a read, write or search home address command. Bit 3 when set to a binary ONE signals the processor that the disk read/write head is moving through the header to key gap during the interval when the gap counter does not equal zero. This bit is set to a binary ONE by the processor upon completion of header routines when there has been no error detected.

Bit 4 when set to a binary ONE signals the processor that the disk head is moving through a key to data gap during the interval when the gap counter does not store a count of zero. This bit is set by key handling microprogram routines and by header routines when the key length of a record is zero. Bit 5 when set to a binary ONE signals the processor 300 that the disk read/write head is moving through the data to header gap during the interval when the gap counter does not store a count of zero. This bit is set to a binary ONE by data handling microprogram routines. Bit 6 when set to a binary ONE signals the processor 300 that the current record being read has a key length of zero. Lastly, bit 7 is used by search microprogram routines which will not be discussed herein.

As seen from FIG. 7, work byte 2, stored in general purpose register location 7, also contains eight bits coded to represent the conditions designated. This byte is used and updated by search, read and write routines. It primarily stores command chaining information for use by write microprogram routines. The processor resets this byte to binary ZEROS at the initiation of a channel program and after completed execution of control commands. In greater detail, the significance of each bit of this byte is as follows. Bit 0 when set to a binary ONE signals the processor 300 that a write record 0 command is allowed. This bit is normally set to a binary ONE by either a search or write home address command. Bit 1 when set to a binary ONE signals the processor 300 that write count, key and data commands are allowed. Bit 2 when set to a binary ONE signals the processor 300 that write key and/or data commands are allowed. Thus, it is seen that the first three bits are used to check commands sequencing or chaining.

Bit 3 is a spare bit while bit 4 when set to a binary ONE signals the processor 300 that an index mark has been detected on the track being read. In general, this bit is set to a binary ONE and used by multitrack microprogram routines to determine upon which index mark, track switching should occur. Bit 5 when set to a binary ONE state signals the processor 300 that the device is in a write permit mode which allows the disk to be written. Bits 6 and 7 respectively are used to signal the processor that data has been repositioned to another track and that an overflow record has been sensed.

As seen from FIG. 7, the read/write director byte, normally stored in general purpose register 3, also contains eight bits having the significance indicated. This byte is used by common read execution and write execution routines to provide direction as to which specific operations are to be performed by these routines for the particular commands being executed by the processor 300. In the case of both read and write operations, the bits of the director byte are established by the particular director routine and thereafter monitored by the execution routines which proceed in accordance with the coding of the director byte.

In greater detail, the significance of each bit is as follows. When bit 0 is set to a binary ONE state, this signals the processor 300 that the PSI section is to be conditioned for a transfer of bytes to/from the IOC. When bit 1 is set to a binary ONE, this signals the processor 300 that the execution routine is to ignore errors detected in key and data fields. Bit 2 is a return after count field bit which when set to a binary ONE signals the processor 300 to return to a calling director routine after the read/write disk head passes or skips over the count field of a record. Bit 3 is a return in data orientation bit which when set to a binary ONE signals the processor to return to the calling director routine when the read/write disk head is in the key to data gap or in the header to data gap (i.e., when the key length equals zero). It will be noted that bits 2 and 3 are mutually exclusive; and when neither bit is set to a binary ONE the read execution routine will return to the calling director routine only after having read the data field of a record.

Bit 4 is an index pulse found bit which when set to a binary ONE signals that the processor's read execution routine has found an index pulse during the search for a header field of a record. Bit 5 is a set termination at PSI bit which when set to a binary ONE indicates that the PSI terminate flip-flop is to be set to a binary ONE. It will be appreciated that this bit is only set to a binary ONE when bit 0 is set to a binary ONE.

Bits 6 and 7 are used in conjunction with search operations and indicate when a record was located which contains a search argument equal to the search argument sent by the IOC and when a search operation is successful.

Microprogram Routines

Figure 8:
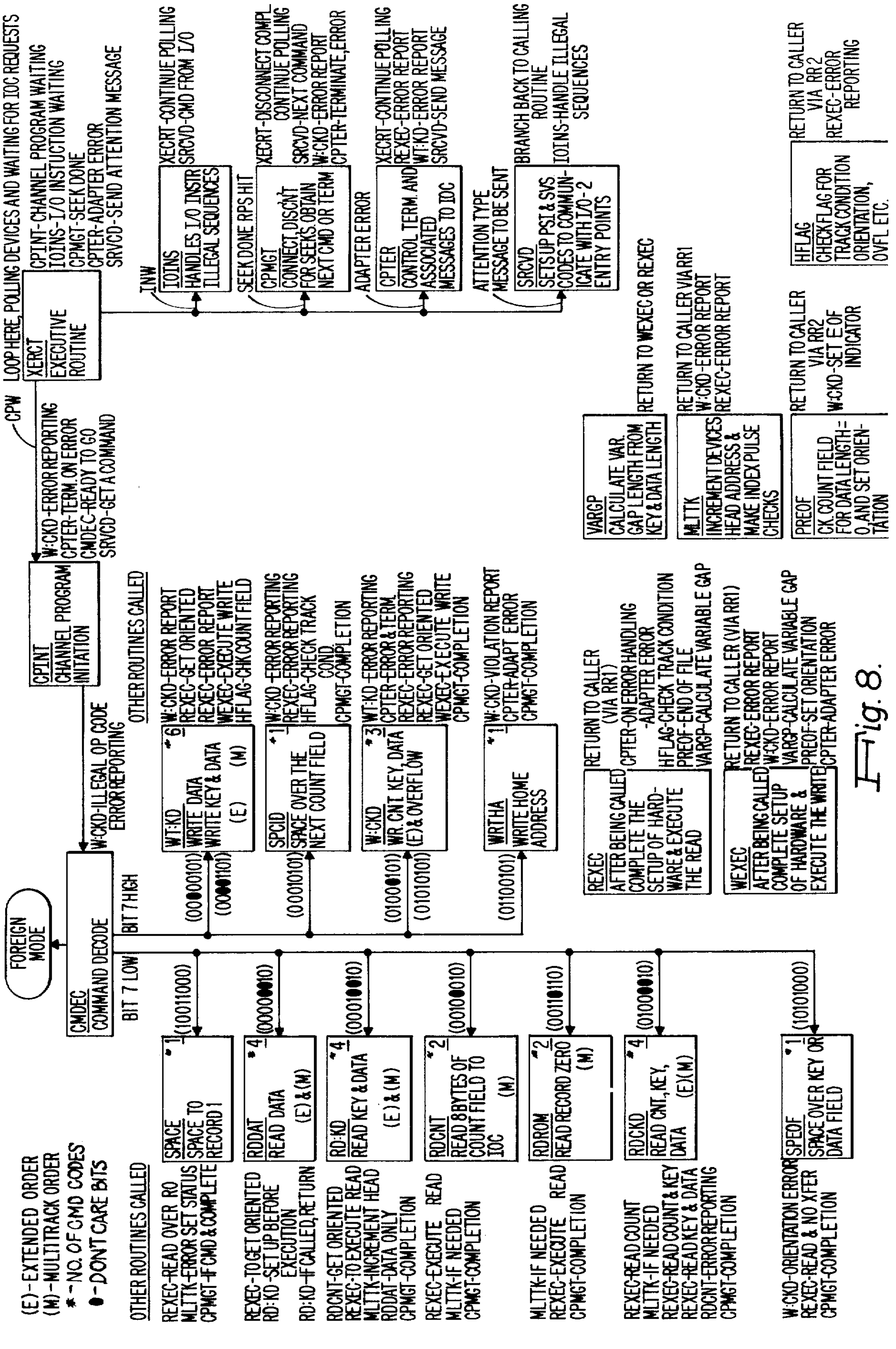
FIG. 8 illustrates the coding of command codes in accordance with the present invention.

The FIG. 8 illustrates the various microprogram routines and the command codes which are used to invoke these routines. That is, this figure illustrates the general relationship of certain routines as well as typical branching sequences. It will be appreciated that the major function of these routines is to interpret the occurrence of certain external events and react to these events in a logical manner. The source generally of these external events corresponds to the PSI and DLI interfaces. As channel program commands are received by processor 300 they are decoded and used to select an appropriate microprogram routine stored in the read only memory section which is in turn executed by the processor. At the completion of having executed the routine, the processor 300 either terminates the channel program and then returns to a polling routine or branches another routine to continue processing of the same channel program.

As mentioned previously, the read only memory section includes a pair of return address registers. During a branching operation, the address of a current routine incremented by one can be stored in return address register 1 (RAR1). This allows the processor to reenter the correct calling routine at the correct point or location. If the processor 300 executes an additional branch, the current routine address plus one can be stored in return address register 2 (RAR2). In this way, the processor is able to support a second level of branching as required. FIG. 8 designates the return register used by a particular routine and the routines called by the various director routines.

Because some of the routines of FIG. 8 are not particularly pertinent to the particular invention, they will only be discussed briefly herein. In general, executive routine (XERCT) operates to interrogate attached mass storage devices and waits for device requests from the IOC. When there is a channel program waiting (CPW), the executive routine sequences to a channel program initial (CPINT) routine, FIG. 6*a*, which initiates processing of a channel program as explained in greater detail herein. Having completed the operations indicated in FIG. 8, the channel initiation routine sequences to a command decode routine (i.e. see FIG. 6*b*) which decodes the command code received from the IOC, as explained in greater detail herein. The command code bits are decoded and the processor calls in appropriate director routines for execution of the specified command.

As seen from FIG. 8, the read microprogram routines are divided into execution and director routines as follows:

a. execution routines = read execution (serial) and read execution (parallel); and, b. director routines = read count (RDCNT), read key and data (RD:KD), read data (RDDAT), read record 0 (RDROM), and read count, key and data (RDCKD).

as explained in greater detail herein, the read execution routines perform the hardware set up and the execution of the particular read operation. The routines may be called by any of the read director routines and are provided with appropriate entry points. After completion, control is returned to the calling routine via return register 1.

In general, the director routines perform the following functions. The read count (RDCNT) director routine reads the bytes of the count field of a record and transfers them to the IOC. The read key and data (RD:KD) director routine reads the bytes of the key and data fields of a record for transfer to the IOC. The read data (DDAT) routine reads the bytes of the data field of a record for transfer to the IOC. The read record 0 (RDROM) director routine reads the bytes of the count key and data fields of record R0 and transfers them to the IOC. The read count key and data (RDCKD) director routine reads the bytes of the count, key and data fields of a record for transfer to the IOC (i.e., reads an entire record).

Similarly, the write routines are divided into execution and director routines as illustrated in FIG. 8 (i.e., write execution and write key and data, write count key and data director routines).

The space count (SPCI0) director routine is used to space over a defective count field and retrieve the bytes of the key and data fields of a record. The space to record 1 (SPACE) director routine is used to space over the home address (HA) and record 0 (Ro) of a track. The space to end of field (SPEOF) director routine is used to pass over defective key and data fields or over the interrecord gap of a record.

Additionally, FIG. 8 lists a number of the work or execution routines and their respective functions. These work routines include an end of file handling (PREOF) routine, a multitrack (MLTTK) routine, a variable gap (VARGAP) routine and header flag (HFLAG) routine. The end of file handling routine is called only by the read or write routines when the disk read/write head is oriented in the key data gap. There are two entries into the routine, a normal and a format write entry. When the data length of a record is zero and the normal entry is used, the channel program is terminated after modifying status information. If the data length is zero and the format write entry is used, the data counter is loaded with a count of 1 and followed by a branch to the caller routine. If the data length is not zero, a branch is executed to the caller routine via return address register 2 (RAR2). In all cases, ad indicated by FIG. 8, the key-data gap bit of work byte 1 is set to a binary ONE.

The multi-track (MLTTK) routine is used to switch the read/write heads to a succeeding track in a cylinder. The routine determines whether a multi-track operation is permitted and allows the processor 300 to branch to the common processing portion of a routine to perform read-write disk head switching. When the command specifies a non multi-track operation, the routine checks the index pulse count bit of work byte 2 and if an index pulse has been detected, the routine modifies the detailed status information and branches to the read execution routine for status storage and termination of the command. In other instances, the index pulse bit of work byte 2 is set to a binary ONE followed by an unconditional branch to the caller routine.

The variable length gap routine computes a variable gap length from taking a percentage of the sum of the key length and data length quantities of a record and then stores the result in a pair of general registers. At the completion of the variable gap computations, the routine returns to the caller routine via return address register 2. The read execution routine and write execution routine perform the hardware set up and execution of read and write operations.

DESCRIPTION OF OPERATION OF THE PREFERRED EMBODIMENT

Figure 9A:
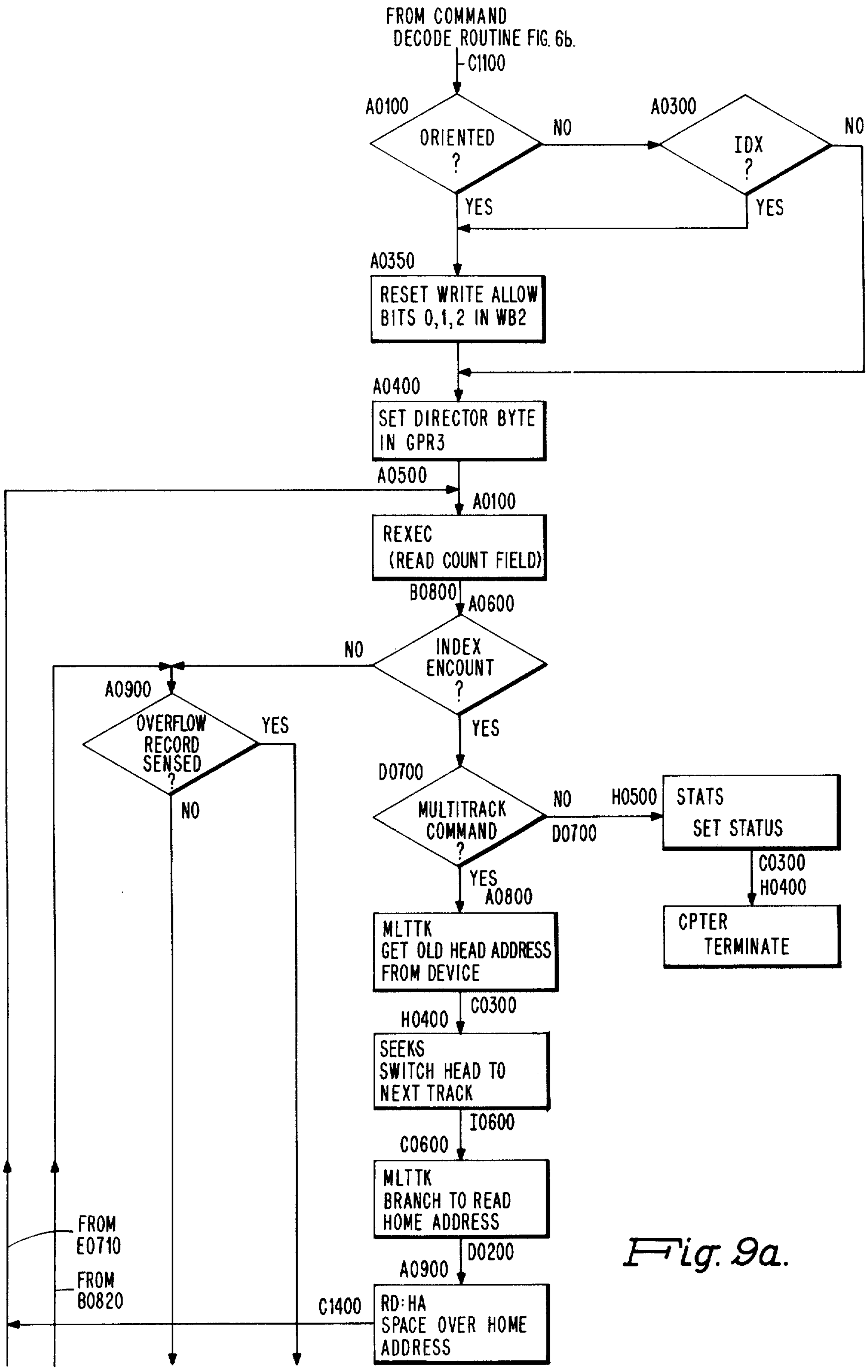
FIGS. 9*a* through 9*c* are flow charts of a read director routine used in describing the operation of the present invention.
Figure 9B:
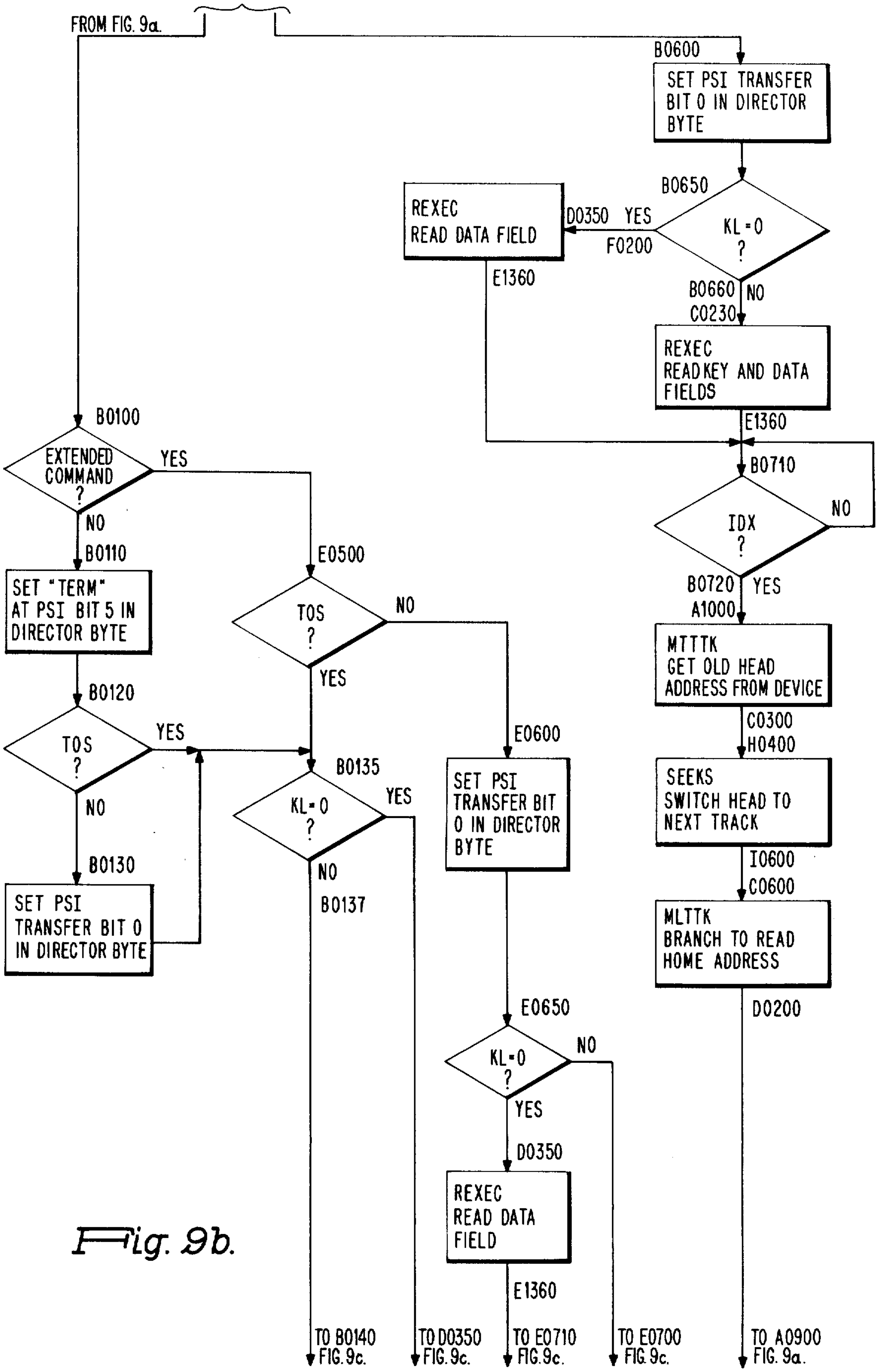
Figure 9C:
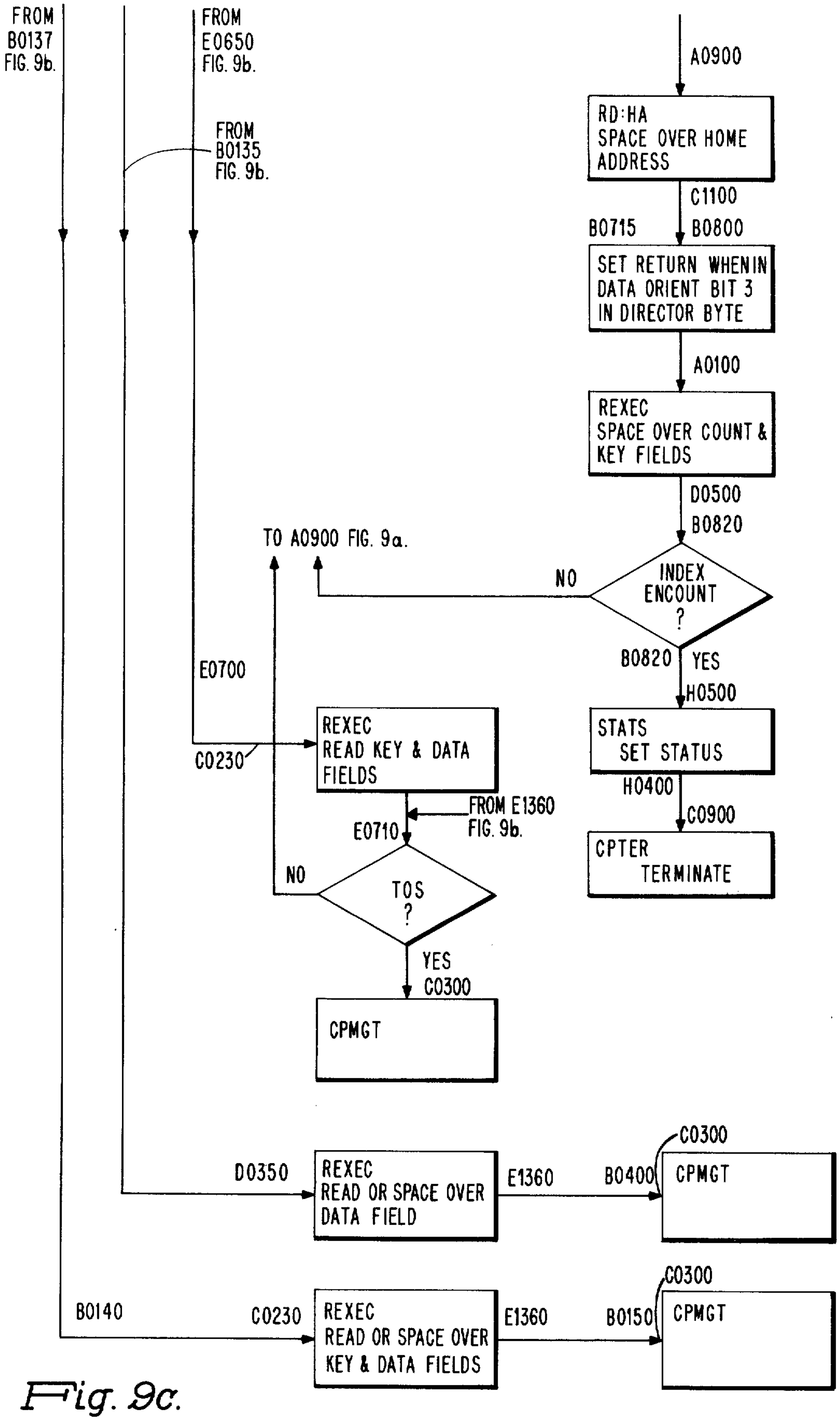
Figure 10:
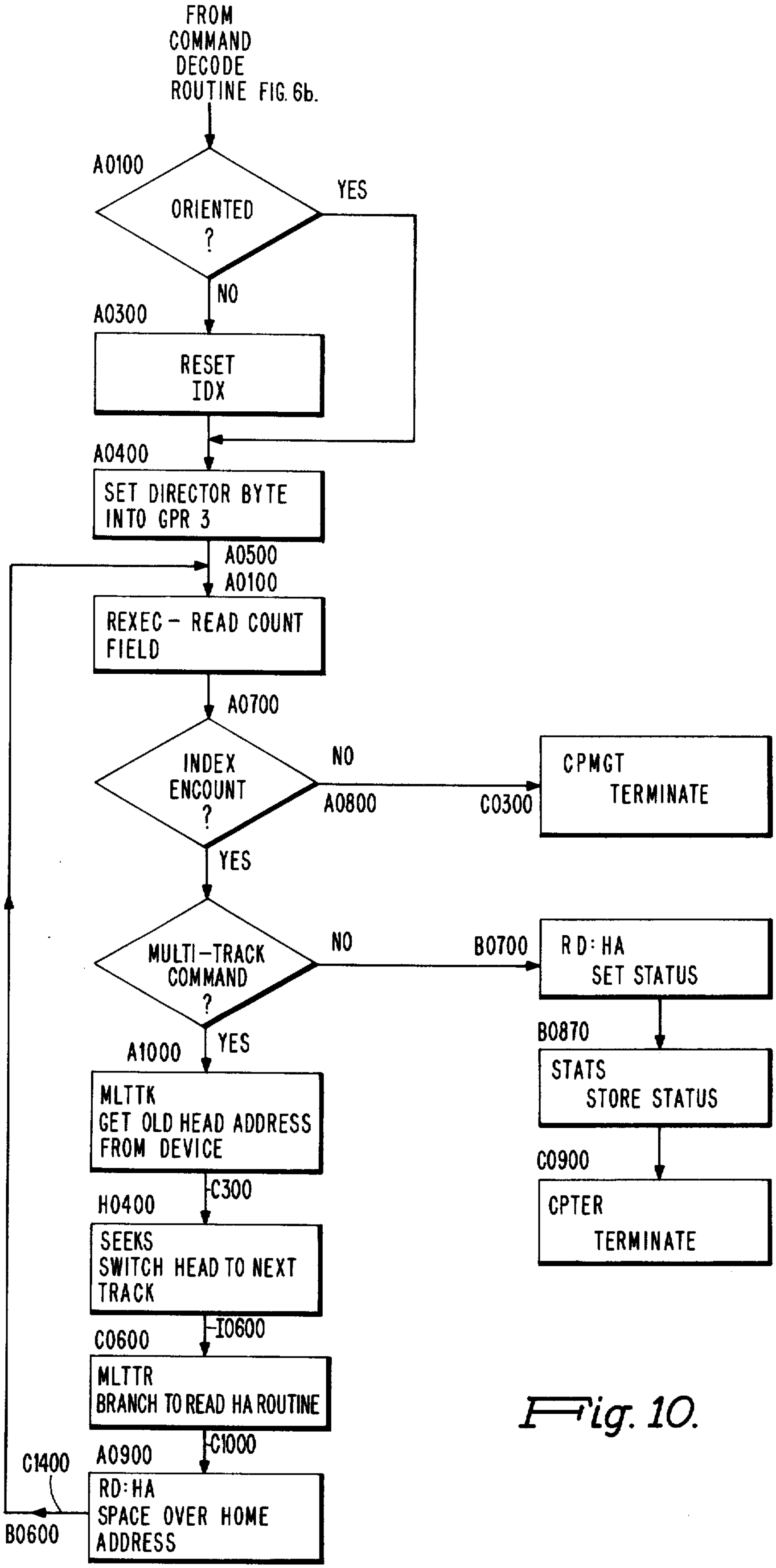
FIG. 10 is a flow chart of another director routine.
Figure 11A:
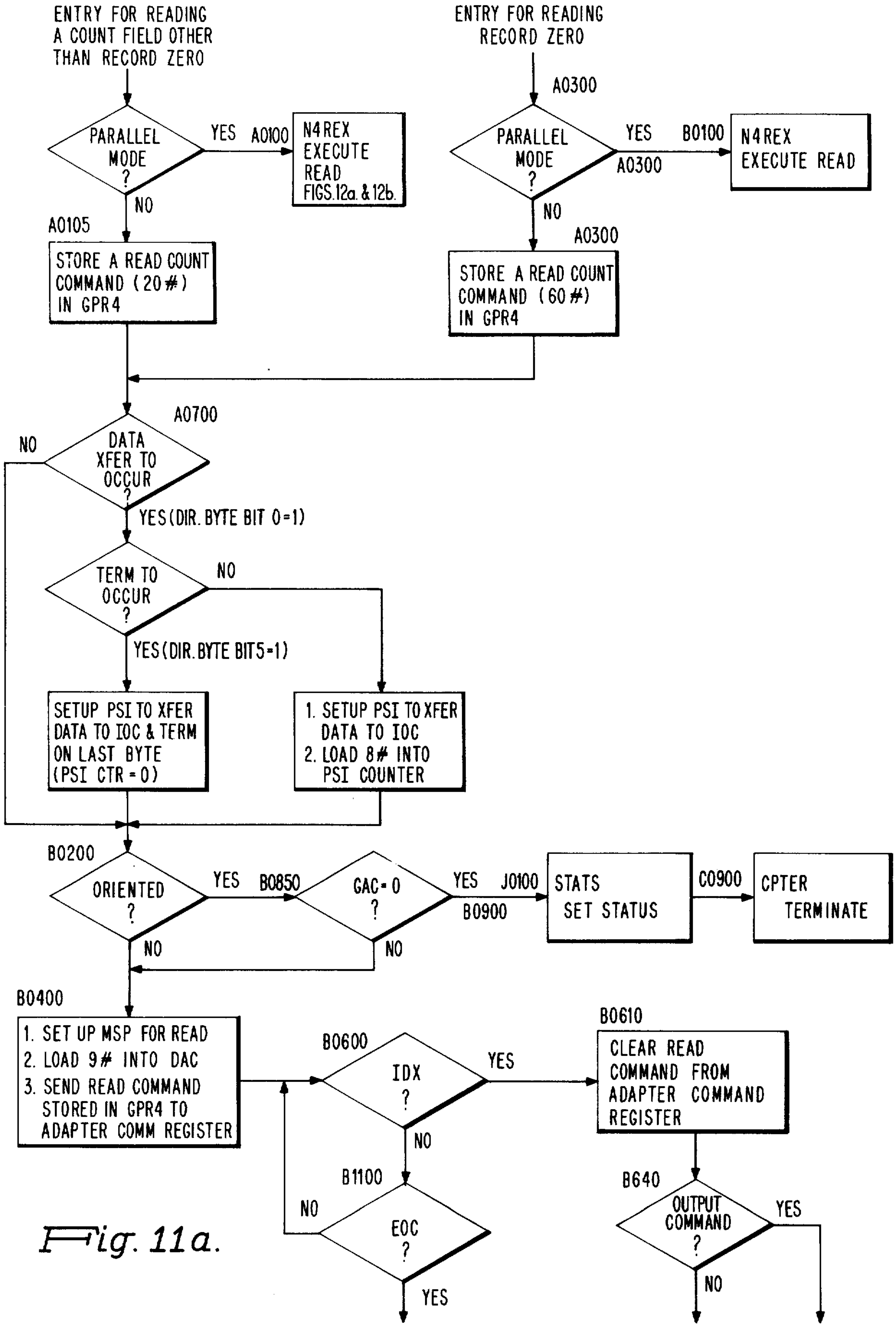

With reference to FIGS. 1, 2, 3*a* through 3*k*, 4*a* through 4*g*, 5*a* and 5*b*, 7 and 8, and the flow charts of FIGS. 6*a*, 6*b*, 9*a* through 9*c*, 10, 11*a* through 11*e*, and 12*a* and 12*b*, the operation of the microprogram peripheral processor of the present invention will now be described. FIGS. 10 and 12*a* and 12*b* have been included to illustrate differences in director and execution routines. FIG. 10 shows the flow of the read count director routine while FIGS. 12 and 12*b* show the flow of a read execution routine for processing data in a parallel type mode. Since both types of routines operate in a fashion similar to the read count key and data director routine of FIGS. 9*a* through 9*c* and the read execution routine of FIGS. 11 through 11*e*, they will not be described separately herein.

By way of example, it is assumed that the IOC 106-6 receives an input/output instruction specifying that the processor 300 is to execute a read count, key and data operation wherein it reads the count key and data fields of a record. The IOC is operative to decode the instruction and then transfers the number of I/O command bytes to the mass storage processor 300. The bytes include a logical channel number (LCN) byte and bytes of one or more channel command words. The LCN byte specifies the channel to be involved in the execution of the I/0 instruction. The command words include a command code byte specifying the type of operation, count bytes specifying the number of bytes to be transferred between main storage and the processor 300 and address bytes specifying a main storage starting address for the transfer.

Figure 6A:
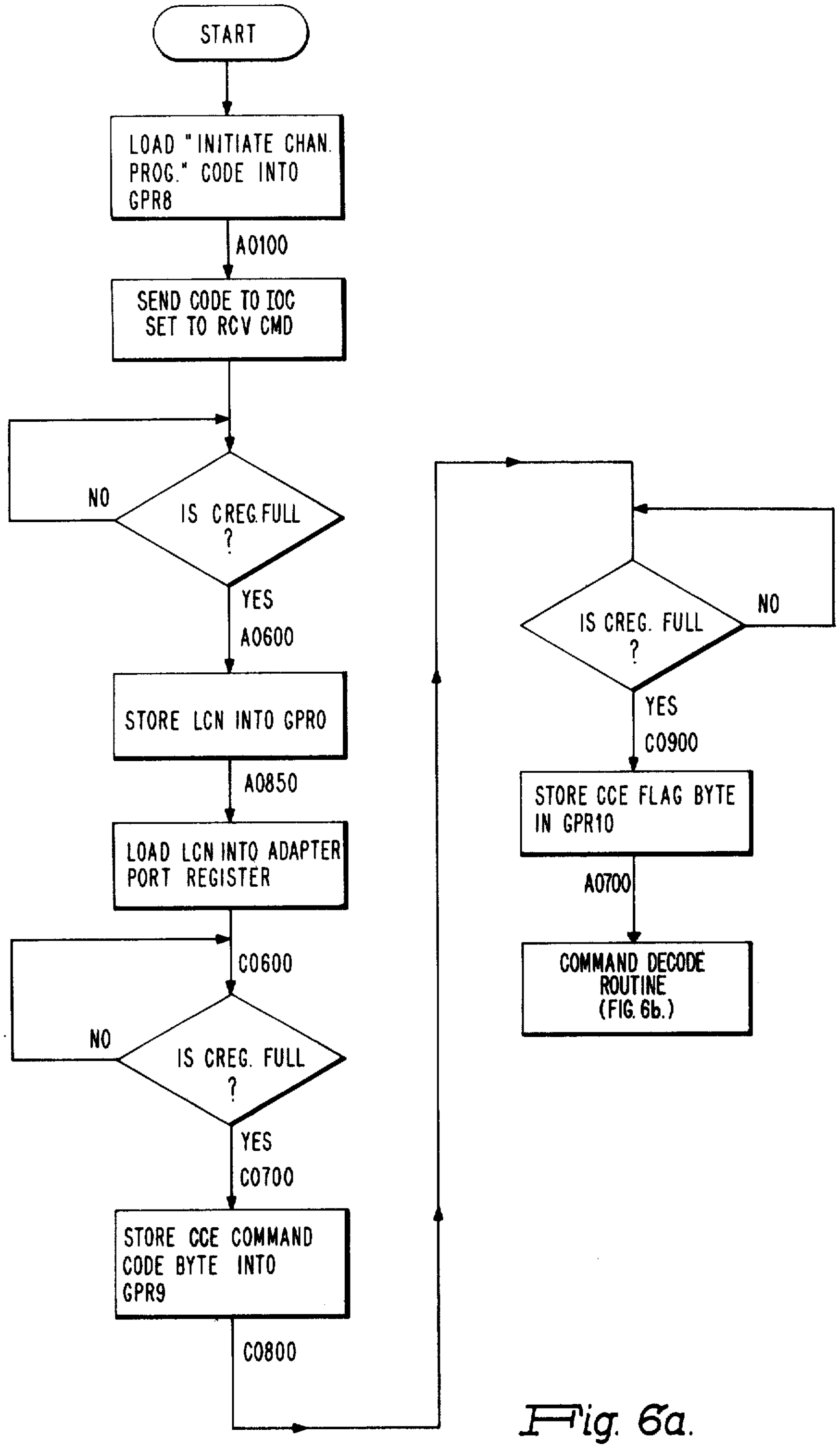
FIGS. 6*a* and 6*b* are flow diagrams illustrating initial microprogram routines used by the apparatus of the present invention.

After the IOC receives signals from the mass storage processor 300 indicating that it is ready to receive the command bytes, the IOC starts transferring the bytes starting with the LCN byte. FIG. 6*a* illustrates in simplified form a portion of the channel program routine for processing a next command. In FIG. 6*a*, as well as the other flow charts, the different microinstructions are designated by "relative" or logical addresses which include the name of the routine and a letter-number (e.g. A0700). The microinstructions of each routine are assigned sequential physical addresses in the read only store according to the alpha numerical ordering of their relative addresses.

The preliminary operations performed correspond to the two blocks of FIG. 6a. The processor 300 prepares for receipt of the command by executing an I/0 type microinstruction which generates subcommand signals which cause the setting of the TRM and ROD flip-flops and the loading of the PSI counter with the predetermined count of three (see FIG. 3*a*). The LCN byte is loaded into the PSI write buffer 302-12 in response to signal PAODV10 being forced to a binary ONE by the processor PSI circuits. The write buffer contents are loaded into the A register when signal CDPTA10 is forced high by the control circuits 302-70. Thereafter, the control circuits 302-70 force in succession signals CDATB10 and CDBTC10 to binary ONES.

As seen from FIG. 6*a*, during the transfer interval, the read only store tests the contents of the C register for the arrival of the LCN byte by continually executing a fast branch type microinstruction. When the C register is loaded with a byte, the store stops testing and advances to the next microinstruction A0600. This microinstruction when executed causes the processor 300 to store the LCN byte in one of the general purpose registers (i.e., GPR No. 0). Thereafter, processor 300 executes an arithmetic type microinstruction A0850 which transfers a representation of the LCN byte stored in general register No. 0 to the device adapter port register via the ALU. At the same time, the LCN byte is transferred via the ALU and stored in the RWS device port register.

It is assumed that the LCN byte pertains to a command for a channel program previously activated. Therefore, it is assumed that the mass storage device associated with the channel program will have been "seized" and bit status obtained therefrom. Accordingly, the flow chart of FIG. 6*a* omits such details. The processor hardware 300 decrements the PSI counter by one via signal STI each time it receives a byte. By executing a similar sequence of operations, the processor 300 stores the command code byte in another one of the general purpose registers (i.e. GPR No. 9). As seen from FIG. 6*a*, the processor terminates the routine upon receipt of a third byte which is a flag byte. This byte is loaded into another general purpose register (i.e. GPR No. 10).

Figure 6B:
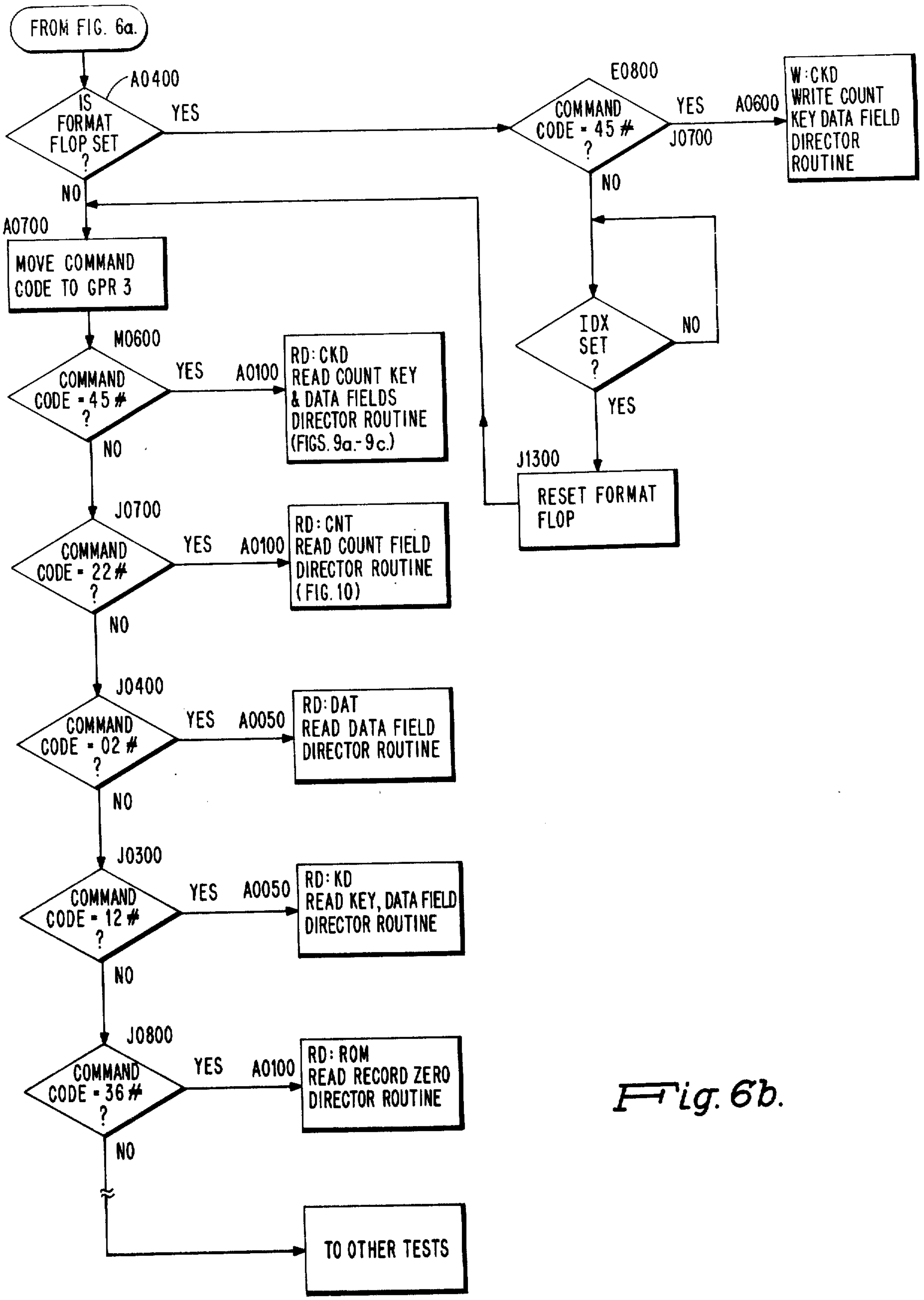

This completes the channel program initiation routine and the processor 300 then enters the command decode routine disclosed in greater detail in FIG. 6*b*. Referring to that Figure, it is seen that the command decode routine first executes microinstruction AO100 which tests the state of the format/first pass flip-flop. Since the processor was not previously executing a write command, the format flip-flop is set to a binary ZERO. The processor then executes microinstruction A0700 which moves the command code from general purpose register No. 9 to general register No. 3 whereupon it is tested in the ALU. The processor then executes a series of branch and logic type microinstructions which test the bits of the command code a bit or a number of bits at a time. The bits are tested sequentially so as to more easily detect the presence of so-called "don't care" bits (i.e. those not used in selecting a routine). As seen from FIG. 6*b*, the processor branches on the results of a test to the start of an appropriate microprogram routine for executing that command. More specifically, it is seen that the processor executes microinstructions which first test for command code 45. Each of the tests in the Figure actually represents a sequence of microinstructions. Since in this example it is assumed that the command code specifies a read count key and data field operation, the processor 300 enters the RD:CKD director routine which begins with branch type microinstruction A0100. Referring to FIG. 9*a*, it is seen that this microinstruction tests whether the processor is oriented with respect to the record being read. That is, the processor has previously stored orientation information included in and it is operative to fetch work byte 1 in general register No. 6 and test the state of bit 0. Assuming that the system is oriented, the processor 300 then executes microinstruction AO350. As indicated, this causes the processor to reset the write allow bits 0, 1 and 2 of work byte 2 which is stored in general purpose register No. 7.

Now the processor sequences to logic type microinstruction A0400. This microinstruction has a format which corresponds to the second microinstruction of FIG. 4*g*. This microinstruction loads a predetermined constant into general purpose register No. 3. This constant corresponds to the read/write director byte. It will be appreciated that because the processor has selected this particular sequence of microinstructions it is able to reference the microinstruction A0400. The primary condition for entering this sequence is that the processor has determined that the command code is one which specifies a read count, key and data field which in turn causes the selection of a read/write director byte bit pattern corresponding to the constant field of microinstruction A0400. Thus, it is seen that a selected director routine, here the read count, key and data director routine, sets up the appropriate director byte for subsequently selected read execution routines.

As seen from FIG. 9*a*, the director byte for the director routine has the configuration "101000XX" which corresponds to bits 0 through 7 of FIG. 7. For the purpose of the present invention bits 6 and 7 designated as "XX" are essentially don't care bits. As seen from FIG. 9*a*, the processor 300 executes a branch type microinstruction A500 which stores the return address of microinstruction AO500 plus one into return address register 1, enters the read execution routine (FIGS. 11*a* through 11*e*) and first executes a microinstruction A0100 which tests for whether the device involved in the execution of the read operation is a parallel or serial type device. It does this by testing the state of a bit of the code stored in the adapter parameter register 310-8 of FIG. 3*k* (i.e., tests state of signal BNNPMIO applied to MUX circuit 304-280 of FIG. 3*f*). This register will have been previously loaded with device parameter information obtained from RWS memory.

If it is a parallel type device, the processor calls another read execution routine for parallel type devices (i.e., routine N4REX of FIGS. 12*a* and 12*b*). If on the other hand the device is not a parallel type device, the processor begins execution of the entered read execution routine (i.e. routine REXEC) which conditions the processor hardware for serial devices.

The above test is done in the execution routine in order to reduce the number of branch microinstructions. From this it is seen that by means of a relatively simple test, a director routine via the initially entered execution routine can select different execution routines which will in turn set up the hardware appropriately as a function of the characteristics of the device.

Assuming that the device is a serial type device, the processor begins the REXEC routine. Referring to FIG. 11*a*, it is seen that there are two entry points into this routine. The first entry is used when reading the bytes of a count field other than record 0 while the second entry point is for reading the bytes of record 0 count field. Because the command code specifies reading a count, key and data field, the processor 300 executes a logic type microinstruction A0105. This causes the processor to store a read count command code in general purpose register 4 and then execute branch type microinstruction A0700. This microinstruction fetches the read/write director byte in general purpose register 3 and transfers it to the ALU latches for testing bit 0. It is seen from FIG. 7 that bit 0 when set to a binary ONE state indicates that the PSI circuits are to transfer data. In this type of operation since the processor is required to transfer data across the PSI interface, bit 0 of the director byte is set to a binary ONE.

As seen from FIG. 11*a*, the processor 300 then executes a further branch type microinstruction which tests the state of bit 5 of the director byte. As mentioned previously, this bit when set to a binary ONE indicates that the processor is going to set the termination line after transferring the last byte of a field to the IOC because no more bytes are to be transferred for execution of this command code. Thus, is this bit is set to a binary ONE, the processor 300 would terminate its transfer of bytes after having transferred all of the bytes of the count field. Since, in this example, the processor 300 is required to transfer the bytes of more than one field, this bit is set to a binary ZERO. The processor 300 then executes a microinstruction which sets up the PSI control circuits to transfer bytes to the IOC (e.g., set the PSI DDT flip-flop to a binary ONE) and loads the PSI counter with a predetermined count of 8.

Next, the processor 300 executes branch type microinstruction B0200 which fetches work byte 1 from general purpose register No. 6 and transfers it to the ALU latches. The processor tests the state of bit 0 to determine whether or not it is oriented with respect to the incoming data bytes. Assuming that this bit has been set to a binary ONE, the processor 300 then executes microinstruction B0850 which tests for a gap length of zero. Since this is a read count key and data command, the gap length is not zero which causes the processor to then execute an I/O type microinstruction B0400. This microinstruction sets up the processor for the read operation. This involves the setting of the states of the sequence control flip-flops in accordance with the fields of the input/output type microinstruction. Additionally, the processor loads a predetermined count of 9 into the data counter and sends the read command code stored in general purpose register 4 to the adapter command register.

Following the above operations, the read only store enters a two microinstruction loop including branch type microinstructions B0600 and B1100 while the transfer of bytes read from the count field of the record proceed under the control of the processor's hardware circuits. At the completion of the transfer, normally indicated by the end of command CBEOC flip-flop having been set to a binary ONE, the processor 300 executes microinstruction B1120 as shown in FIG. 11*b*.

Assuming no error had been sensed by the adapter, the processor then enters the HFLAG routine which checks for errors and sets up gap orientation. At the completion of this routine, the processor 300 then executes microinstruction CO120 to test for read errors. In the event that there was a read error the processor executes microinstruction CO400 which fetches the director byte in GPR No. 3 and tests the state of bit 1 of the director byte to determine whether or not read errors can be ignored. Since the command specifies reading a count, key and data fields, this bit is a binary ZERO. Therefore, if a read error were detected, the director byte would direct the read execution routine to terminate the operation by entering the status routine via microinstruction DO100 as indicated in FIG. 11*b*.

Figure 11B:
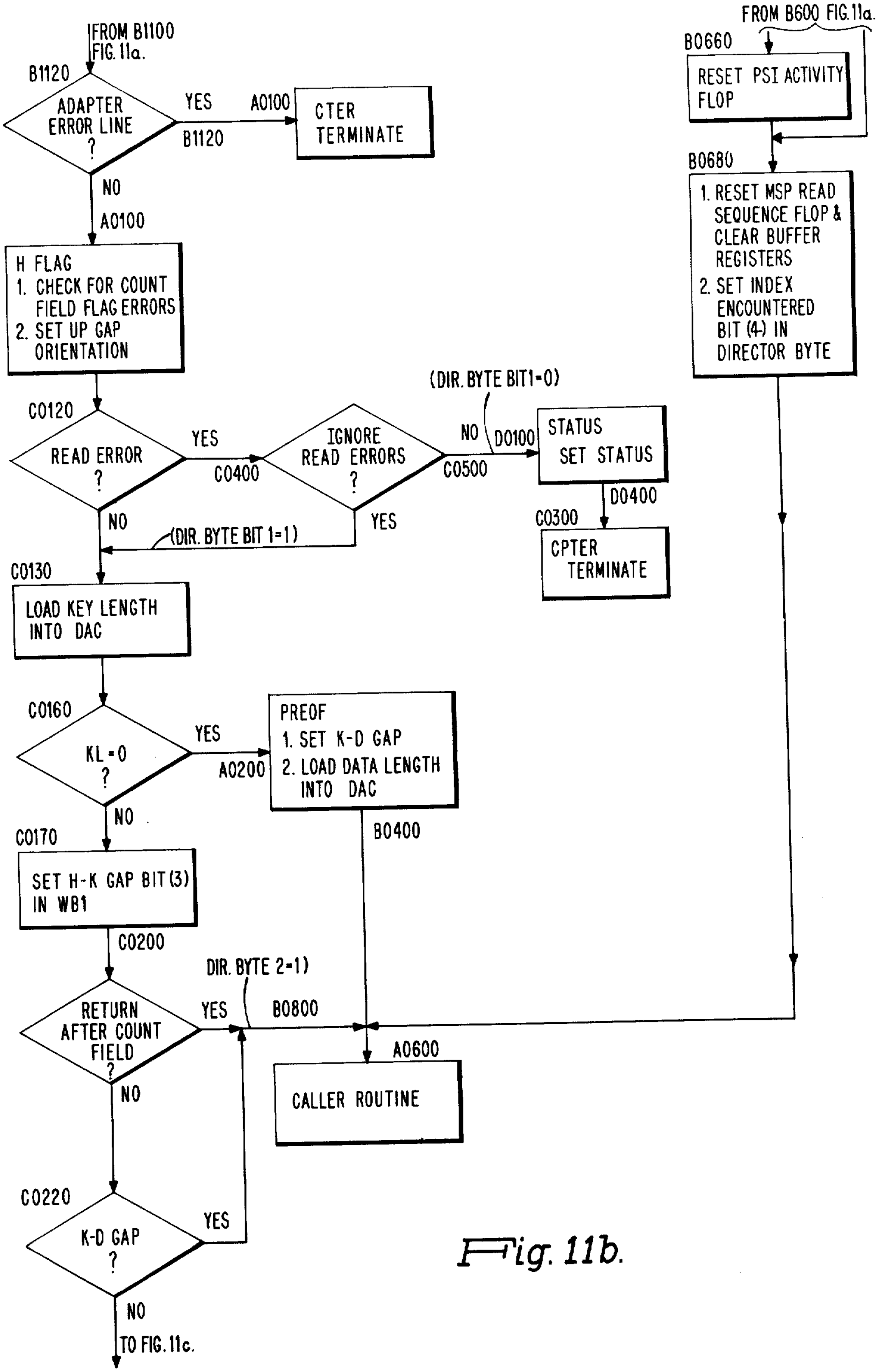
Figure 12A:
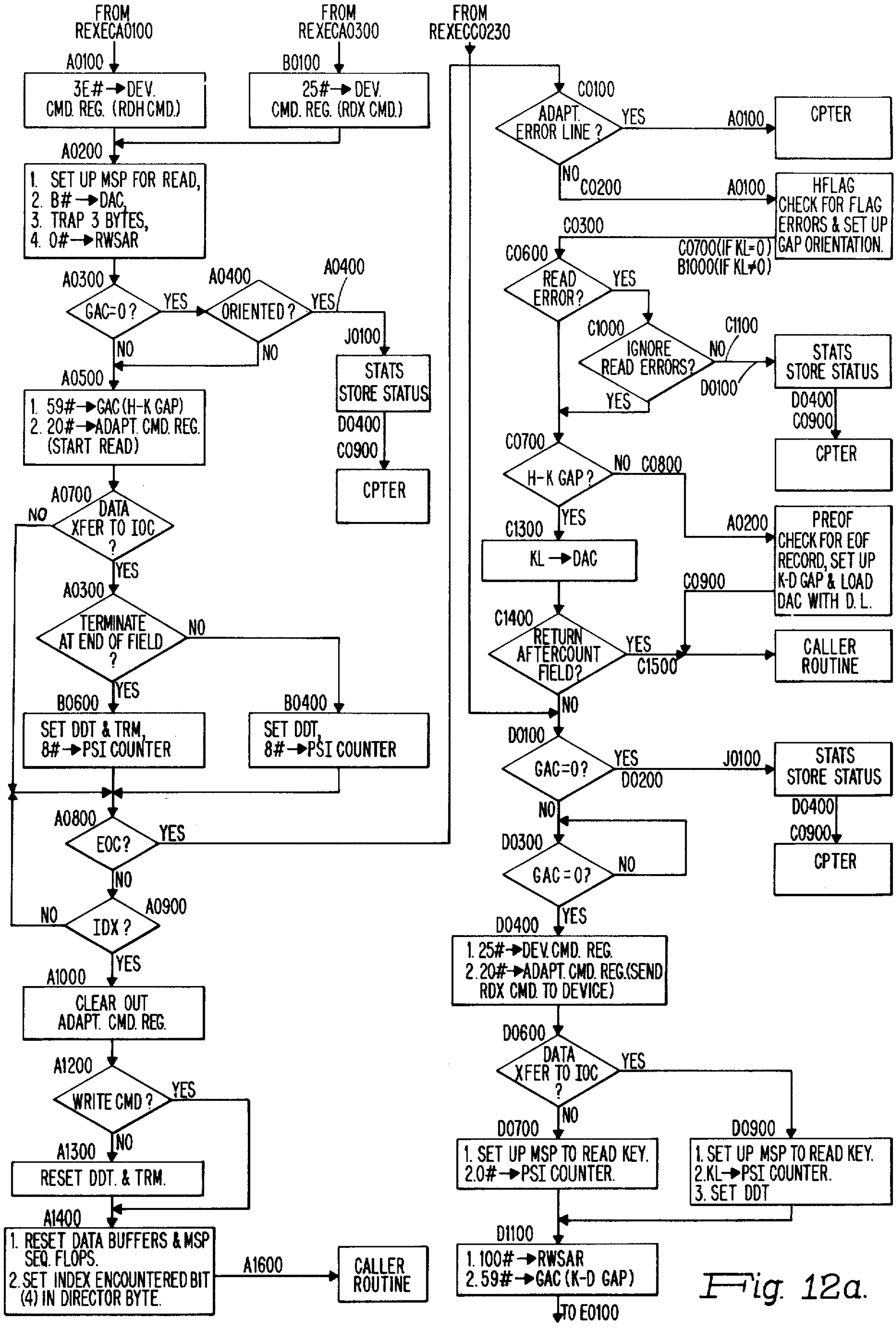
FIGS. 12*a* and 12*b* are flow diagrams of a second type of execution routine.
Figure 12B:
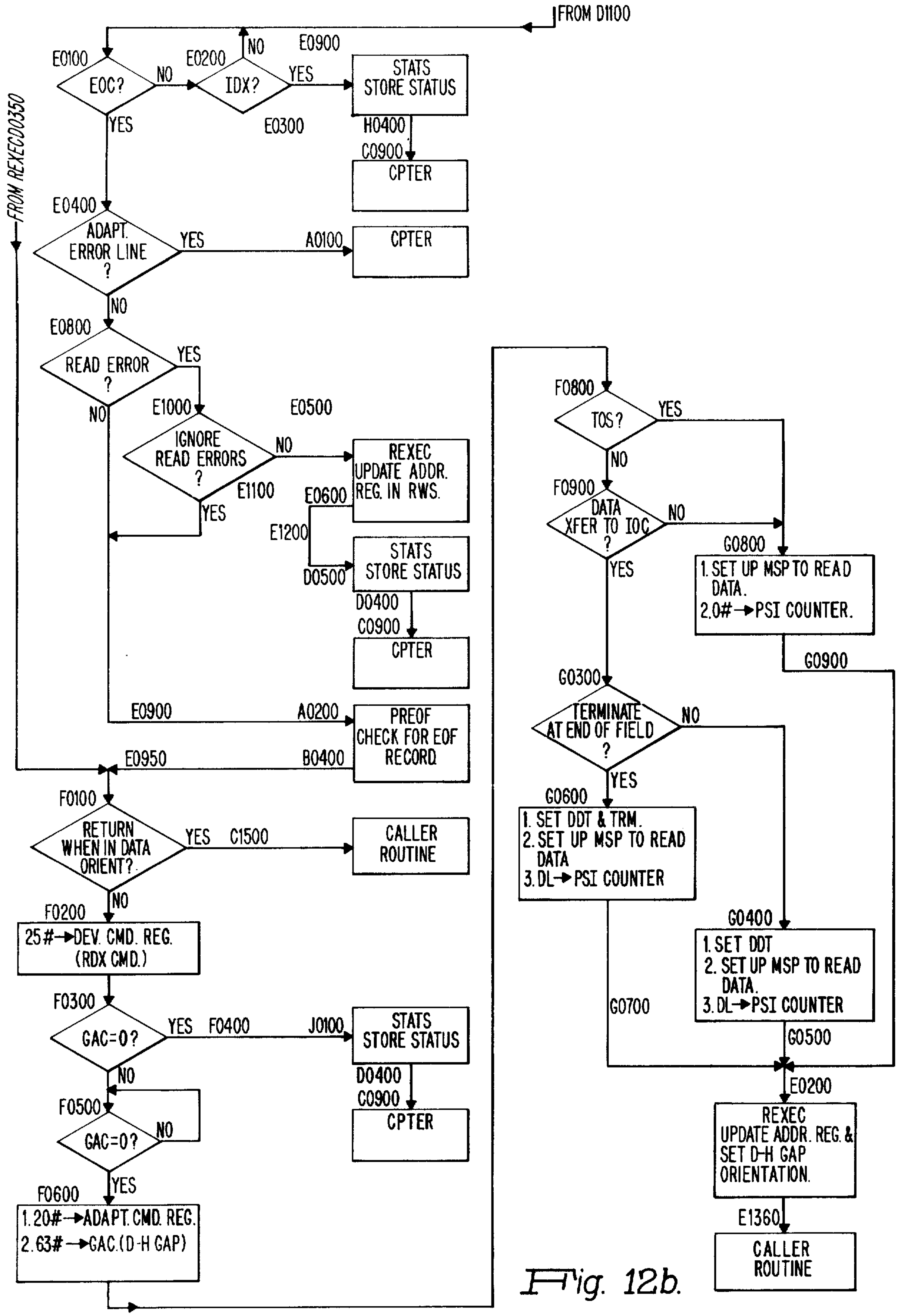

Assuming no read errors, the processor 300 then executes microinstruction C0130 as indicated by FIG. 11*b*. This causes the processor to load the key length of the record into the data counter and then execute microinstruction C0160 to determine whether this length is zero. Since it would not be a zero, the processor 300 then executes microinstruction C0170 which results in the setting of bit 3 of work byte 1 to a binary ONE. As seen from FIGS. 5*a* and 5*b*, the disk read/write head is now passing through the header to key gap portion of the record. At this time, the processor 300 executes microinstruction C0200. As indicated, the read execution routine determines whether it is required to return control back to the director routine after it has completed the reading of the count field. As mentioned above, this bit of the director byte is set to a binary ONE. This enables the RD:CKD director routine to check whether a complete record has been read by testing for receipt of an index pulse. Thus, the processor 300 after having executed the portion of the read execution routine indicated, returns to the director routine to execute microinstruction A0600 as shown in FIG. 9*a*. It can be seen from this part of the operation that the read execution routine by testing the state of a single bit within the director byte is able to quickly determine what it is required to do next. This obviates the need of having to perform multiple branches pursuant to the decoding of a command code.

Thus, the processor branches to the contents of the return address register plus one and enters the routine at A0600 as illustrated by FIG. 9*a*. The B0800 designation denotes a branch with return operation. By being able to branch to the contents of the return address register plus one, the processor is very quickly able to return control back to the correct director routine (i.e., the caller routine). By comparing the portion of the read count, key, data director routine just described with the director routine of FIG. 10, the similarities between the two will be noted.

As seen from FIG. 9*a*, the processor 300 now executes microinstruction A0700 which fetches the director byte from GPR No. 3 and tests the state of bit 4 to determine whether the index mark has been encountered by the read execution routine. Since it did not, this means that the read execution routine processed the count field of the record. Now, the director routine executes microinstruction A0900 to determine whether the record is continued in another next track (i.e. overflow record sensed). At this time, the processor fetches work byte 2 from general purpose register No. 7 and tests the state of bit 7. Since bit 7 is assumed to be a binary ZERO, the processor then executes a branch type microinstruction BO100, as shown in FIG. 9*b*, which tests whether the processor is going to process more than one record. Since it is not, the processor 300 executes microinstruction B0110 wherein it fetches the director byte from GPR No. 3 and sets bit 5 to a binary ONE. This means that the processor is to terminate operation upon transfer of the bytes of the next data field because the processor 300 is going to transfer the bytes of only one record to IOC.

Next, the processor 300 executes microinstruction B0135 which tests bit 6 of work byte 1. Since the record has a key field, this bit is a binary ZERO which causes the processor to enter again the read execution routine at microinstruction C0230, as illustrated by FIG. 9*c*. Before entering the routine, the processor executes a branch type microinstruction which stores the return address of microinstruction B0140 plus one into return address register 1. If, on the other hand, the key length was zero, then the processor 300 would have entered the portion of the read execution routine at microinstruction D0350 (see FIG. 9*b*) which only transfers the bytes read from the data field of the record.

Figure 11C:
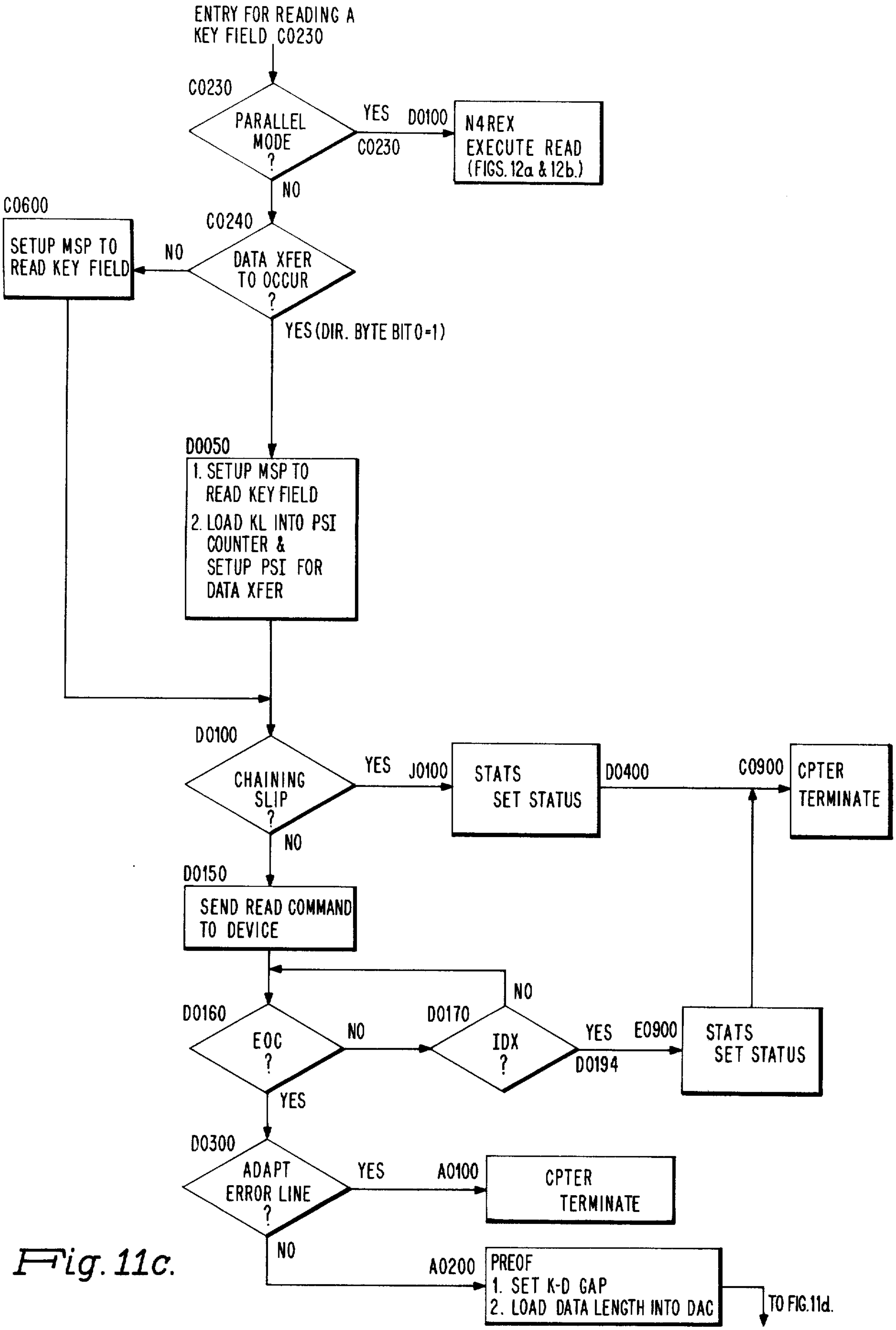

Referring to FIG. 11*c*, it is seen that the processor 300 first executes microinstruction C0230 to select the proper execution routine by testing the state of signal BNNPM10 (see FIG. 3*f*). It then executes microinstruction C0240 wherein it fetches the director byte from the general purpose register 3 and tests the state of bit 0. Since bit 0 is a binary ONE, the processor 300 executes an I/O type microinstruction which sets up the PSI to transfer data bytes. It will be noted that the director routine also sequences through the path just described under the two other conditions indicated in FIG. 9*b*. However, in both cases, the transfer bit 0 of the director byte is set to a binary ZERO prohibiting the transfer of key and data bytes to the IOC where the IOC only wants the bytes of the count field of the record or has terminated the transfer (i.e., a terminate out signal has been stored by the processor 300 − TOS = 1). In this manner, the director routine is able to modify the director byte bits in response to external events during the transfer thereby allowing the execution routine to be run efficiently.

Continuing on with the processing of the record, it is seen from FIG. 11*c* that the processor 300 then executes branch microinstruction D0100 which determines whether or not the command has arrived on time by testing the state of the gap counter to make certain that it is not ZERO. Assuming it is not zero, the processor 300 then executes microinstruction D0150 which causes the read command code to be transferred to the device command register and then to the device. Thereafter, in the manner described above, the processor 300 idles through a two microinstruction loop waiting for the completion of the byte transfer signaled by the sensing of either an end of command condition or an index mark. Assuming that no index mark has been sensed but that the end of command has been sensed, the processor 300 then executes microinstruction D0300 which tests the adapter for errors. Assuming no errors, the processor 300 then enters the process end of file routine which causes the processor to set bit 4 of work byte 1 to a binary ONE state and load the data length of the record into the data counter to begin the processing of the data field.

Figure 11D:
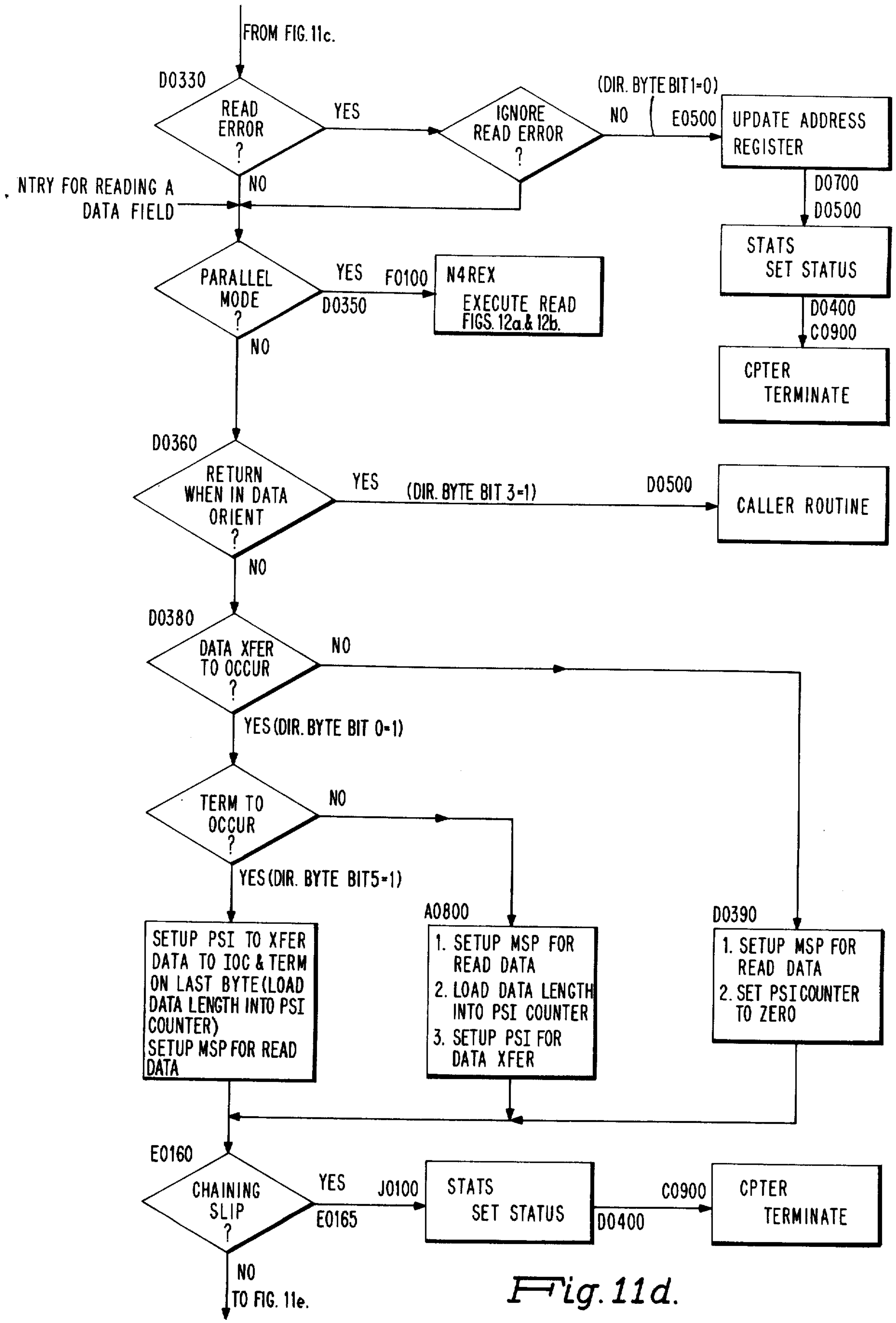
Figure 11A:
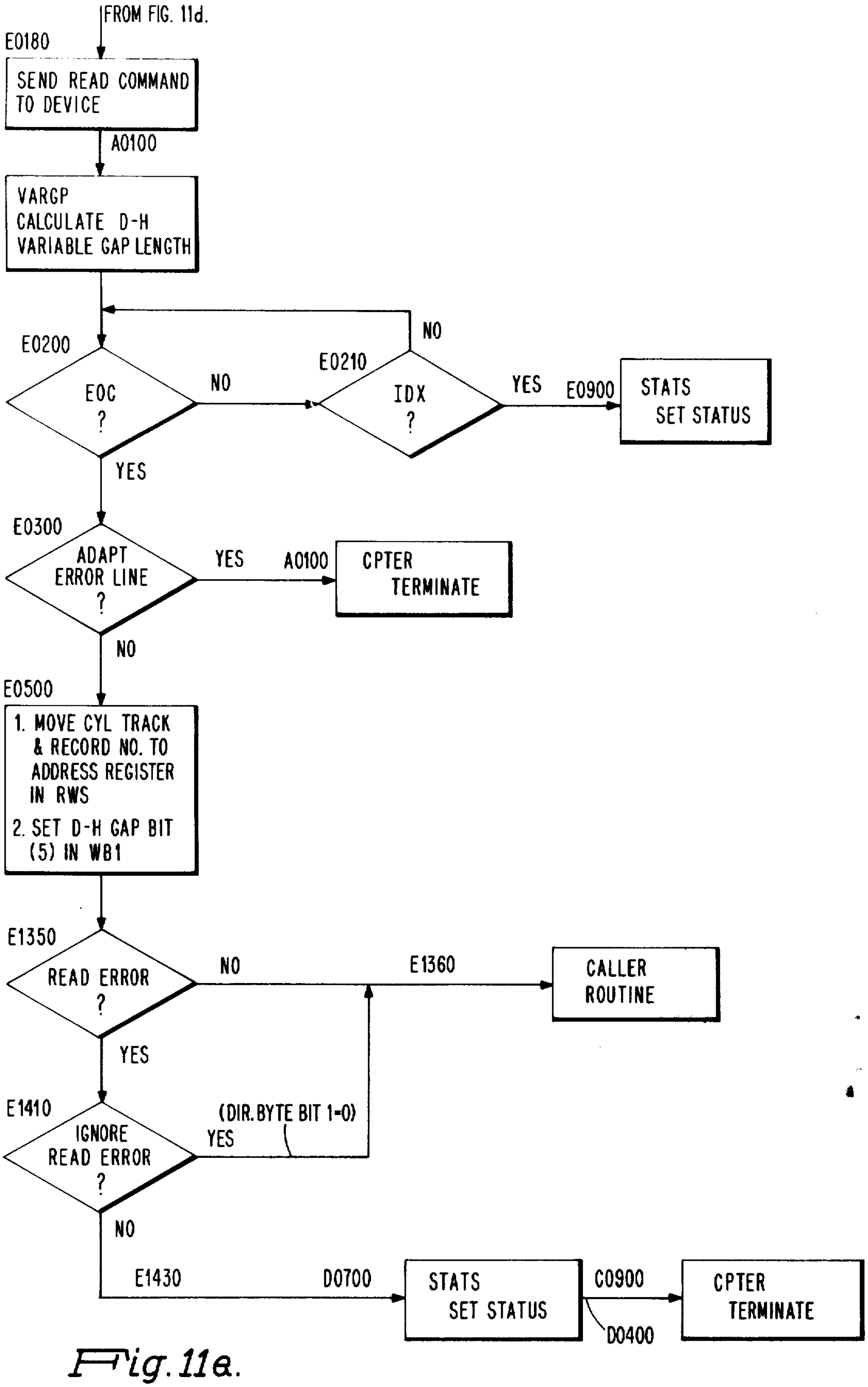

As seen from FIG. 11*d*, the processor 300 then executes microinstruction D0330 to test for the presence of a read error. Assuming no read error, the processor 300 then executes microinstruction which tests the state of signal BNNPM10 to select the proper execution routine. Since it is the same device involved in the transfer, the processor executes microinstruction D0360 which tests the state of bit 3 of the read/write director byte stored in general purpose register No. 3. If this bit is set to a binary ONE, then the read execution routine returns to the caller routine (i.e., read count, key and data director routine) upon the execution of the branch instruction D0500. Since the command code specified the transfer of a count, key and data field of a record, this bit, as indicated previously, is a binary ZERO. Therefore, the processor 300 executes microinstruction D0380 which tests the state of bit 0 of the director byte. Since this bit is a binary ONE, the processor 300 then executes a branch type microinstruction to test the state of bit 5. Since this bit is a binary ONE, the processor 300 then executes the I/O microinstruction which conditions the PSI to transfer data bytes of the data field and terminate on the last byte.

Next, the processor 300 executes the microinstruction E0160 which again tests to make certain that the command has arrived on time. Since it arrived previously, the processor 300 then executes microinstruction EO180 as indicated by FIG. 11*e*. This microinstruction sends the read command to the device whereafter the processor 300 then enters the variable gap routine to calculate the data to header variable gap length in the manner mentioned previously. Concurrent with that, the processor 300 again turns control over to the hardware for the transfer. Following the calculation, the read only store will then enter the two microinstruction idle loop described previously.

At the end of the transfer sensed by the end of command, the processor 300 executes microinstruction EO300 which is followed by microinstruction E0500 when there are no errors. By executing microinstruction E0500, the processor 300 moves the cylinder, track and record number to the address register in the read/write store and sets bit 5 of work byte 1 to a binary ONE state indicating that the disk read/write head is now passing through the data to header gap of a next record. The processor 300 then executes microinstruction E1350 to test for read errors and assuming no errors returns to the read count key and data director routine as shown in FIG. 11*e*. It does this by executing a branch type microinstruction E1360 which loads the contents of return address register 1 into the read only store address register. As seen from FIG. 9*c*, the processor 300 returns to microinstruction B0150 which then causes the processor 300 to enter the CPMGT routine completing the operation.

From the above, it is seen that the execution routines can be executed very efficiently under the control of the director bytes. Through the utilization of different director routines, the same execution routines can be used efficiently. Moreover, the same director routines can share different execution routines. All the director routines share both types of execution routines. The flow of the N4REX execution routine used to process data in parallel form is as shown in FIGS. 12*a* and 12*b*.

The foregoing description has illustrated a peripheral system which facilitates the processing of commands involving devices having different operational characteristics. According to the present invention, the subsystem includes a microprogrammable peripheral processor which includes general register storage and a control store for storing at least two classes or types of microprogram routines. The first class includes director microprogram routines for each of the commands. The second class includes execution microprogram routines for each of the devices having different characteristics.

The peripheral processor operating under the direction of the director routines by executing tests upon various bits contained within director bytes stored in the general register storage selects the appropriate execution routines. This arrangement has the advantage of increasing speed by simplifying and reducing the number of testing operations required to be executed by the peripheral processor of the present invention. Moreover, the arrangement obviates the need for special branch type or other type microinstructions and complex branching circuits.

Further advantages of the system of the present invention is that system facilitates the addition of new device types and the addition of new commands. In the case of adding a new device type (i.e. a device having characteristics different from those already attached to the processor - e.g. different data formats), only a new device specific execution routine tailored for that device is required to be included in the control store. The new execution routine will share the various director routines. When adding a new command, this requires a new director routine to be included in the control store. Other advantages of the present invention will occur to those skilled in the art.

To prevent undue burdening the description with matter within the ken of those skilled in the art, a block diagram approach has been followed, with a detailed functional description of each block and specific identification of the circuits it represents. The individual engineer is free to select elements and components such as flip-flop circuits, shift registers, etc. from the individual's own background or available standard references as given herein.

It will also be noted that the exact coding patterns for all microinstructions were not disclosed herein since the engineer is free to select alternate forms of coding. For further details and insight into techniques and deriving such coding and for additional background information concerning the system, reference may be made to the text titled "Computer Design Fundamentals" by Chu, McGraw-Hill Book Company, Inc., Copyright 1962 and the test titled "Microprogramming Principles and Practice" by S. S. Husson, Prentice-Hall, Inc., Copyright 1970. For convenient reference, the following appendix is included which defines certain terms which have been used in describing a preferred embodiment of the present invention.

APPENDIX

Glossary of Terms

| TERM | DEFINITION |
|---|---|
| Alternate Track | An alternate track is one which contains data that has been repositioned from a defective primary track. |
| Byte | The basic unit of information handled by the Mass Storage Subsystem (MSS). A byte is made up of 8 information bits each of which can be set to logical ONE (ON) or to logical ZERO (OFF), to represent any one of 256 combinations. Bit 0 is defined as the leftmost or most significant bit and bit 7 as the rightmost or least significant bit. |
| Byte Wide Path | Bytes of information transferred across the interface consist of eight information bits plus one odd parity bit. The information is arranged so that bit 0 is always the most significant bit. The parity bit is ONE if the number of ONE bits in the corresponding eight information bits is even, ZERO if the number of ONE bits is odd, i.e. odd parity is generated on the eight information bits. |
| Central Processor Complex (CPC) | The Central Processor Complex consists of those units used for addressing main storage, for retrieving or storing information, for arithmetic and logic processing of data, for sequencing instructions in the desired order, and for initiating the communication between storage and external devices. The main units of the CPC are the Central processor unit (CPU), the main store and the Input/Output controller (IOC). |
| Channel Command Entry (CCE) | The Channel Command Entry is the elementary building block of channel programs. It consists of two CCWs and may contain a command, flag, count information, branching information, key or buffer addresses and a command extension field. The address of a CCE is the address of its first CCW. |
| Channel Control Word (CCW) | A CCW is a 32-bit (4 byte) word that is a subdivision of a CCE. |
| Channel Program (CP) | A CP is a complete set of instructions and addressing information to carry out an I/O operation. It is composed of CCEs which are made up of CCWs. |
| Count Field | The first field of each record. The Count field describes the Key and Data fields of the same record. |
| Cyclic Check Code | A Cyclic check code is used for error detection when information is stored into and retrieved from a field. When data is recorded, a cyclic check code is arithmetically coded from the information to be placed in the field and is recorded as part of the field. When a field is read from the storage medium, the cyclic check code is recomputed and compared to the cyclic check code recorded as part of the field. If the comparison is unsuccessful an error condition is indicated. On certain devices, the cyclic check code is replaced by an error detection and correction code. |
| Cylinder | All tracks which are available for data transfer without additional movement of the access mechanism. Each cylinder in a storage device is identified by a unique cylinder address and designates a specific position of the set of Read/Write heads on each surface of the device. |
| Data Field | The field which contains the information identified by the Count and Key fields of the record. The Data field is recorded on the storage media immediately following the Key field; if a Key field does not exist, the Data field follows the Count field. |
| Defective Track | A defective track is a track from which recorded information cannot be reliably recovered. This condition is normally |

APPENDIX-Continued

Glossary of Terms

| TERM | DEFINITION |
|---|---|
| | a result of a surface imperfection and localized to a small portion of the track surface. |
| Field | A group of related contiguous bytes. Four types of fields are defined within the MSP: a Home Address field, a Count field, a Key field and a Data field (definitions follow). |
| Home Address Field | One Home Address field on each track follows the Index Mark, identifies the physical location of the track within the storage device, and contains information describing the condition of the track. The first record recorded on the track starts at Index Mark when a Home Address field does not exist. |
| Index Mark | A mark which signals the beginning of a track. All tracks in a cylinder are synchronized by the same Index Mark. |
| Input/Output Controller (IOC) | An IOC is the mainframe hardware/firmware involved during the execution of a channel program. It may control several physical channels. In this document the unit which connects to the mainframe side of the PSI is referred to as the IOC. Other terms that have been used with the same meaning are Central Processor Unit, Channel Control Unit, Channel, I/O Processor, etc. |
| IOC Instruction | An IOC instruction is an instruction sent from the IOC to the PCU. This instruction is not part of the channel program, but may be related to channel program activity (e.g., disconnect). |
| Key Field | The Key field allows searching of identifying information about a record. The identifying information is stored within the Key field. If present, the Key field immediately follows the record Count field. |
| Line States | An interface signal line in the ONE state, or high, is understood to be in the logical TRUE state; a line in the ZERO state, or low, is understood to be in the logical FALSE state. The rise of a line will imply a transition from the FALSE to the TRUE state while the fall of a line will imply the transition from the TRUE to the FALSE state. |
| Logical Channel (LC) | The input/output system is based on the concept of logical channels. The access path from the CPU to the device for the purpose of executing an I/O operation is termed a channel. The channel consists of IOC facilities, a hardware link between the IOC and PCU identified as the physical channel, and a logical channel. The logical channel in its most elementary form is the collection of facilities in a peripheral control unit subsystem required to execute an I/O operation such as a read, write, etc. An I/O operation is defined by a channel program. A logical channel can only have one channel program active on it at one time. Logical channel numbers are used by the channel for ordering the storage of parameters required to maintain a number of channel programs operating simultaneously. As such, software visibility of an I/O operation is through a logical channel. (From a software point-of-view, devices are allocated an IOC number, a physical channel number and a logical channel number for selection purposes). A logical channel number explicitly identifies a device. A channel program is restricted to one device. Devices are assigned logical channel numbers at system configuration time or when the device is added to the system. There may be more than one logical channel per device. A logical channel is considered active from the time an Initiate New Channel Program service code is received by the IOC until it is terminated by an event notification |

APPENDIX-Continued

| TERM | Glossary of Terms DEFINITION |
|---|---|
| | to software. |
| Magazine | A group of tracks and/or cylinders which may be individually removable. If several magazines exist in a device, only one magazine at a time may be positioned with the read/write erase mechanism. |
| Multiple Track Operation | The ability of the MSS, when provided with certain I/O commands in certain modes, to automatically switch to successive tracks in the same cylinder and to continue the operation on the new track. |
| Peripheral Device | A peripheral device is a single addressable data source or sink. The peripheral device may be a unit controlling a physical medium (e.g. disk drive, tape drive) or an electronic medium (e.g., communications channel). |
| Peripheral Processor | A PP (e.g. mass storage processor (MSP) is the unit connected on the peripheral side of the PSI which controls and operates the peripheral device. Other names with similar meanings are Peripheral Control Unit, Peripheral Controller, Microprogrammed Peripheral Controller (MPC), Multi-Line Controller (MLC), etc. |
| Peripheral Subsystem | A Peripheral subsystem (e.g. mass storage subsystem MSS) is comprised of those functional units existing outside of the central processing and main store facilities which are required to operate and control the peripheral devices in a system. A peripheral subsystem may include one or more PSIs, one or more peripheral control units, and one or more peripheral devices. |
| Physical Channel | A physical channel is the hardware link between the IOC and the peripheral control unit. This hardware link consists of one PSI and the facilities at each end of the PSI dedicated to the PSI. |
| Primary Track | A primary track is the original track on which data was stored. |
| Read | Read indicates the direction of dialog flow (from the PCU to the IOC), i.e. an input operation. |
| Record | A group of related fields. A record consists of a Count field, a Key field which immediately follows its related Count field on the storage media, and a Data field which immediately follows its related Count and Key field. The length of the Key field may be specified as zero, in which case a record consists of only a Count and Data field. |
| Record Overflow | Record overflow is a capability which allows a logical record to be recorded on more than one track. Such a record is known as an overflow record. A portion of an overflow record that is written on one track is called a record segment. Most functions defined in the MSS treat the entire logical record as if it was a single physical record. |
| Record Segment | A segment of an overflow record - see Record Overflow. |
| Service Code | A service code is an eight-bit instruction (plus parity) transferred over the PSI from the PP to the IOC and used for defining subsequent information transfer over the interface as well as initiating activity in the IOC. |
| Track | One of the concentric recording areas on a disk surface. Each track in a cylinder is identified by a unique track address which defines the particular Read/Write head to be used in referencing the device. |
| Write | Write indicates the direction of dialog flow (from the IOC to the PP), i.e., an output operation. |

While in accordance with the provisions and statutes there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. A data processing system comprising a central processing system, at least one storage device having predetermined operational characteristics and a peripheral processor coupled to said central processing system and to said device, said peripheral processor including hardware facilities for transferring data between said central processing system and said device in response to different types of commands specified by command bytes received from said central processing system, said processor further comprising:

an addressable control memory means having a plurality of memory storage locations, at least one group of said plurality of memory storage locations for storing microinstructions of a first type of routine for directing said processor in performing control operations related to one type of said commands, said one group of said locations of said first routine storing at least one microinstruction containing a coded control byte in a predetermined one of said first group of locations and a second group of said plurality of memory storage locations storing microinstructions of a second type of routine for conditioning said processor hardware facilities for executing only those operations dependent upon said specific operational characteristics of said one peripheral device for transferring data;

register storage means operatively coupled to said memory means for storing at least a control byte of information and signals representative of said command byte; and, branch control means coupled to said memory means, said branch control means being responsive to said command byte signals to cause said memory means to branch to said microinstructions of said first routine including said one type of microinstruction, said processor during execution of said first routine conditioning said storage means to store a bit representation of said control byte, said branch control means including circuit means responsive to control type microinstructions included in said second routine of microinstructions to test said control byte to determine those transfer operations to be performed by said hardware facilities for the successful execution of said one type of command.

2. The system of claim 1 wherein said addressable control memory means further includes address register means for storing a current address used to address one of said plurality of locations and increment means coupled to said address register means and wherein said branch control means further includes:

return register means coupled to said address register means and to said increment means; and, branch circuit means coupled to said control memory means, said increment means and to said return register storage means, said circuit means including first gating means responsive to another type microinstruction in said first type of routine to condition said increment means to increment said current address by one and second gating means responsive to said another type of microinstruction to condition said return register means to store said incremented address and third gating means responsive to said another type of microinstruction to condition said address register means to cause said control memory means to branch to a first one of the microinstructions of said second type of routine stored in a starting location specified by said another type of microinstruction.

3. The system of claim 2 wherein said branch control means includes control means coupled to said memory address register means and to said return register means, said control means being operative at successful completion of the transfer operation performed during execution of said microinstructions of said second type of routine to reference said another type microinstruction stored at a next location of said second type of routine, said control means including means responsive to said another type of microinstruction for conditioning said address register means to receive the address contents of said return register means to reference additional microinstructions of said first routine for determining whether further groups of microinstructions of other second types of routines are to be executed by said processor for said successful completion of the operation specified by said one type of command.

4. The system of claim 2 wherein said another type of microinstruction is a branch microinstruction coded to include:

an op code field portion coded to specify an unconditional branch operation;

a branch address field portion coded to designate said starting memory location corresponding to the start of said second type routine microinstructions;

a prebranch field portion coded to specify storing of a return address corresponding to said incremented current address; and, a branch to address condition field portion coded to specify selection of a memory location corresponding to said branch address field portion.

5. The system of claim 1 wherein said one peripheral device is a cyclical storage device and wherein said microinstructions of said first type of routine define one of a number of director routines for conditioning said processor in performing said control operations relating to interpreting said different types of commands for reading and writing information respectively from and to said one peripheral device and wherein said microinstructions of said second type of routine define one of two classes of execution routines for conditioning said hardware facilities as to the format of information stored, the type of transfer and the transfer rate of said one device as defined by said specific operational characteristics.

6. The system of claim 1 wherein said one microinstruction is a logic type microinstruction having at least an op code field portion and a constant field portion corresponding to said control byte coded to include a predetermined bit pattern special to said one type of command and wherein said processor includes decoder means coupled to said control memory means to generate signals in response to microinstructions read from said plurality of memory locations during execution of said routines, said decoder means being operative in response to said op code field portion of said one logic type microinstruction to generate said signals for loading a bit representation corresponding to said predetermined bit pattern into said register storage means.

7. The system of claim 6 wherein said control type microinstructions correspond to branch type microinstructions, each specifying a branch on condition based upon the state of a predetermined one of bits of said control byte and said circuit means being conditioned by said branch on condition microinstructions to determine said transfer operations required to be executed by said hardware facilities for successful completion of the operation specified by said one type of command.

8. The system of claim 6 wherein said predetermined bit pattern corresponds to a director byte having a plurality of bits coded as follows:

a first bit coded to condition selectively first means in said processor hardware facilities to transfer said data between said one peripheral device and said central processing system;

a second bit coded to condition selectively second means in said processor hardware facilities to ignore errors in said data information being read from said one device;

third and fourth bits coded to condition selectively third means included in said processor hardware facilities during execution of one of said execution routines to return to said first type of routine upon completing processing of different predetermined portions of said data;

a fifth bit coded to condition selectively fourth means included in said hardware facilities to store signal indications for use by said processor during execution of said first routine of the status resulting from the operations performed by said hardware facilities during the performance of said second routine; and a sixth bit coded to condition selectively fifth means included in said processor hardware facilities to terminate transferring said data.

9. The system of claim 8 wherein said third bit when in a predetermined state conditions said third means during execution of said type of second routine to cause said branch control means to return control to said first type of routine after said facilities have completed processing a first one of said predetermined portions of said data and wherein said fourth bit when in a predetermined state conditions said third means during execution of said second type of routine to cause said branch control means to return control to said first type of routine when ready to begin processing a second one of said predetermined portions of said data.

10. The processor of claim 9 wherein said one peripheral device is a rotating magnetic storage unit for storing a plurality of data records along a plurality of circular tracks, each record normally having a count field portion, a key field portion and data field portion, and wherein said first one of predetermined portions of said information corresponds to a count field portion of one of said plurality of data records and said second one of said predetermined portions of said information corresponds to a data field portion of said one of said plurality of data records.

11. The processor of claim 10 wherein said one type of command is a read type of command which specifies reading said count key and data portions of one of said data records and wherein said first bit through said sixth bit of said director byte are coded initially as 101000.

12. The system of claim 10 wherein said one type of command includes a command code byte coded to condition said branch control means to have said control memory means a branch to said first type routine which selects said predetermined pattern of said director byte containing bits coded to condition said processor hardware facilities for transferring those portions of said one data record specified for said successful execution of said one type of command.

13. The system of claim 9 wherein said processor couples to a plurality of rotating, storage devices each having different media format characteristics, and wherein said processor further includes parameter storage means for storing information specifying the characteristics of a device selected to transfer said data, said addressable control memory means further including a third group of storage locations for storing at least another one of second type of microinstruction routines, each one of said second type of routines having microinstructions for conditioning said hardware facilities for executing said one type of command involving a predetermined one of said devices having different specified media format characteristics and one of said second type of routines including a control type of microinstruction, said circuit means of branch control means including means coupled to said parameter register storage means, said means being conditioned by said control type of microinstruction of said first one of said second type of routines to branch to one of said second type of routines when specified by the contents of said parameter storage means.

14. The system of claim 9 wherein said addressable control memory means includes storage locations for storage of a plurality of first and second types of routines, each of said first type of microinstruction routines coded for executing a particular type of command and including at least one microinstruction coded to contain a predetermined director byte bit pattern for indicating to an appropriate one of said second type of microinstruction routines which specific transfer operations are to be performed for said particular type of command being executed by a designated one of said first type of microinstruction routines.

15. The system of claim 14 wherein said first type of routines includes a number of read director routines and write director routines for conditioning said processor to transfer data from said device to said central processing system and transfer data from said central processing system to said device respectively, said branch control means being conditioned by command byte signals to cause said control memory means to reference a corresponding one of said read and write director routines and wherein said second type of microinstruction routines include at least one common read execution routine and one common write execution routine operative to condition said hardware facilities to execute only those read operations and write transfer operations respectively defined by the director byte bit pattern referenced by said processor during execution of corresponding one of said director routines.

16. In a data processing system including a central processing unit and a peripheral processing system coupled to said central processing unit, said peripheral processing system including a microprogrammable input/output processor and a plurality of cyclic input/output storage devices, each having different media format characteristics, said peripheral processor having hardware facilities for executing a plurality of different types of commands received from said central processing unit for controlling the operation of said plurality of input/output storage devices during the transfer of data between said central processing unit and said devices, said processor further comprising:

an addressable control store having a plurality of memory storage locations, groups of said locations storing at least two first and second classes of microprogram routines, each of said microprogram routines of said first class including at least a first type of microinstruction having an op code field and a constant field coded to include a predetermined bit pattern establishing those transfer operations to be performed during the execution of one of said types of said commands and each of said second classes of microprogram routines including microinstructions specifying transfer operations which condition said processor for execution of first and second categories of said different types of said commands involving one of said plurality of input/output storage devices having a predetermined one of said different media format characteristics;

decoder means coupled to said control store, said decoder means being operative to generate control signals in response to different ones of said microinstructions read out from said control stores during execution of said routines;

general register storage means for storing information required during execution of said commands and being coupled to said control store and to said decoder means;

arithmetic and logic means for performing arithmetic and logic operations upon bytes applied thereto, said arithmetic and logic means being coupled to said general register means and coupled to receive a command control byte from said central processing unit coded to designate one of said plurality of different types of said commands to be executed by said processor; and, branch control means for controlling the microinstruction sequencing of said peripheral processor during execution of said routines, said branch control means being coupled to said control store and to said arithmetic and logic means, said branch control means including circuit means conditioned by signals representative of results of performing operations upon said command control byte applied from said arithmetic and logic means to branch to a corresponding one of said first classes of microprogram routines and said decoding means during the sequencing through said corresponding one of said first routines being conditioned by said op code field portion of said first type of microinstruction to generate signals for conditioning said general register storage means for storing a signal representation of said predetermined bit pattern for controlling the transfer operations performed by one of said second classes of microprogram routines selected by said processor during execution of said corresponding one of said first routines.

17. The processing system of claim 16 wherein said addressable control store further includes address register means for storing a current address used to address one of said plurality of locations and increment means coupled to said address register means and wherein said branch control means further includes:

return register means coupled to said control store address register means and to said increment means; and, branch circuit means coupled to said control store, said increment means and to said return register storage means, said circuit means including first gating means responsive to an another type microinstruction in said first type of routine to condition said increment means to increment said current address by one and second gating means responsive to said another type of microinstruction to condition said return register means to store said incremented address and third gating means responsive to said another type of microinstruction to condition said address register means to cause said control store to branch to said first one of the microinstructions of said second type of routine stored in a starting location specified by said another type of microinstruction.

18. The system of claim 17 wherein said branch control means includes control means coupled to said control store address register means and to said return register means, said control means being operative at successful completion of the transfer operation performance during execution of said microinstructions of said second type of routine to reference said another type microinstruction stored at a next location of said second type of routine, said control means including means responsive to said another type of microinstruction for conditioning said address register means to receive the address contents of said return register means to reference additional microinstructions of said first routine for determining whether further groups of microinstructions of other second types of routines are to be executed by said processor for said successful completion of the operation specified by said one type of command.

19. The system of claim 17 wherein said another type of microinstruction is a branch microinstruction coded to include:

an op code field portion coded to specify an unconditional branch operation;

a branch address field portion coded to designate said starting memory location corresponding to the start of said second type routine microinstructions;

a prebranch field portion coded to specify storing of a return address corresponding to said incremented current address; and, a branch to address condition field portion coded to specify selection of a memory location correspnding to said branch address field portion.

20. The system of claim 16 wherein said one microinstruction is a logic type microinstruction having at least an op code field portion and a constant field portion corresponding to said control byte coded to include a predetermined bit pattern special to said one type of command and wherein said decoder means coupled to said control store to generate signals in response to microinstructions read from said plurality of memory locations during execution of said routines and includes circuit means operative in response to said op code field portion of said one logic type microinstruction to generate said signals for loading a bit representation corresponding to said predetermined bit pattern into said register storage means.

21. The system of claim 20 wherein said control type microinstructions correspond to branch type microinstructions, each specifying a branch on condition based upon the state of a predetermined one of bits of said control byte and said circuit means being conditioned by said branch on condition microinstructions to determine said transfer operations required to be executed by said hardware facilities for successful completion of the operation specified by said one type of command.

22. The system of claim 20 wherein said predetermined bit pattern corresponds to a director byte having a plurality of bits coded as follows:

a first bit coded to condition selectively first means in said processor hardware facilities to transfer said data between said one peripheral device and said central processing unit;

a second bit coded to condition selectively second means in said processor hardware facilities to ignore errors in said data information being read from said one device;

third and fourth bits coded to condition selectively third means included in said processor hardware facilities during execution of one of said execution routines to return to said first type of routine upon completing processing of different predetermined portions of said data;

a fifth bit coded to condition selectively fourth means included in said hardware facilities to store signal indications for use by said processor during execution of said first routine of the status resulting from the operations performed by said hardware facilities during the performance of said second routine; and a sixth bit coded to condition selectively fifth means included in said processor hardware facilities to terminate transferring said data.

23. The system of claim 22 wherein said third bit when in a predetermined state conditions said third means during execution of said type of second routine to cause said branch control means to return control to said first type of routine after said facilities have completed processing a first one of said predetermined portions of said data and wherein said fourth bit when in a predetermined state conditions said third means during execution of said second type of routine to cause said branch control means to return control to said first type of routine when ready to begin processing a second one of said predetermined portions of said data.

24. The system of claim 23 wherein each of said plurality of storage devices is a rotating magnetic storage unit for storing a plurality of data records along a plurality of circular tracks, each record normally having a count field portion, a key field portion and data field portion, and wherein said first one of predetermined portions of said information corresponds to a count field portion of one of said plurality of data records and said second one of said predetermined portions of said information corresponds to a data field portion of said one of said plurality of data records.

25. The system of claim 23 wherein said addressable control store further includes storage locations for storage of a plurality of first and second types of routines, each of said first type of microinstruction routines coded for executing a particular type of command and including at least one microinstruction coded to contain a predetermined director byte bit pattern for indicating to an appropriate one of said second type of microinstruction routines which specific transfer operations are to be performed for said particular type of command being executed by a designated one of said first type of microinstruction routines.

26. The system of claim 25 wherein said first type of routines includes a number of read director routines and write director routines for conditioning said processor to transfer data from said device to said central processing system and transfer data from said central processing system to said device respectively, said branch control means being conditioned by command byte signals to cause said control memory means to reference a corresponding one of said read and write director routines and wherein said second type of microinstruction routines include at least one common read execution routine and one common write execution routine operative to condition said hardware facilities to execute only those read operations and write transfer operations respectively defined by the director byte bit pattern referenced by said processor during execution of corresponding one of said director routines.

27. The method of organizing a microprogrammable peripheral processor coupled to a central processing system and to a number of input/output rotatable storage devices, said microprogrammable processor including hardware facilities and a control store having a plurality of storage locations for storing microinstruction routines used to execute a given set of commands, so as to facilitate addition of devices to the number of input/output storage devices having different physical characteristics which can be operated under the control of said processor, said method including the steps of:

initially storing in said control store at least first and second classes of microprogram routines in first and second groups of said plurality of storage locations respectively, each of said first class of routines for conditioning said processor in performing control operations for executing commands of said set specified by command control bytes received from said central processing system for transfer of data to and from any one of said storage devices and each one of said second class of routines for conditioning said processor hardware facilities to execute transfer operations of first and second categories of said set of commands involving a predetermined one of said number of said devices;

storing a pair of routines of said second class in other ones of said plurality of storage locations for an additional input/output storage device having different physical characteristics from said number of input/output storage devices coupled to said peripheral processor to condition said hardware facilities to execute transfer operations of said first and second categories of said set of commands;

storing a branch microinstruction at the beginning of each one of a predetermined pair of said initially provided routines of said second class for specifying as a branch test condition a distinguishing physical difference between said another input/output storage device and an originally attached device;

generating signals for indicating said physical difference for the device selected to transfer data during execution of said commands; and, providing branch control means responsive to the results of testing said condition in response to said signals to select between said routines of said second class in the same categories for successful execution of corresponding ones of said set of commands.

28. The method of organizing a microprogrammable peripheral processor coupled to a central processing system and to a plurality of input/output rotatable storage devices, said peripheral processor including hardware facilities and a control store having a plurality of storage locations for storing microinstruction routines to execute a given set of commands, so as to facilitate adding to the number of commands in a given set of commands for controlling the operation of said plurality of input/output storage devices having different physical characteristics, each command being specified by a command control byte having a predetermined bit pattern transferred to said peripheral processor by said central processing system, said method including the steps of:

initially storing in said control store at least first and second classes of microprogram routines in first and second groups of said plurality of storage locations respectively, each of said first class of routines arranged to be selected from said predetermined pattern of said command control byte and for conditioning said processor in performing control operations for executing said commands specified by said bytes for transfer of data to and from any one of said storage devices and each of said second class of routines for conditioning said processor hardware facilities to execute data transfer operations of first and second categories of said set of commands for a predetermined one of said plurality of storage devices in accordance with at least one director byte bit pattern included in a microinstruction word stored within each of said first class of microprogram routines;

storing an additional routine of said first class in another group of said plurality of storage locations for conditioning said processor to execute control operations for a type of data transfer operation specified by a new command added to said given set and designated by a command control byte having a particular predetermined bit pattern, said additional routine including at least one microinstruction coded to specify a director byte bit pattern different from the director byte bit patterns included in said initially provided routines of said first class and a branch with return microinstruction coded for referencing at least a predetermined one of said initially provided second class of routines; and, providing branch control means responsive to said command control byte from said central processing system indicative of said new command to branch to said additional routine for selection of said different director bytes to condition said hardware facilities during the execution of said predetermined one of said second class of routines for performing only those transfer operations specified by said different director byte bit pattern for successful execution of said new command by said routines of said second class.

* * * * *